(12) United States Patent
Javadi

(10) Patent No.: US 12,480,939 B1
(45) Date of Patent: Nov. 25, 2025

(54) MULTIPLATE CONDUCTOR

(71) Applicant: Stratedigm, Inc., San Jose, CA (US)

(72) Inventor: Shervin Javadi, San Jose, CA (US)

(73) Assignee: STRATEDIGM, INC., San Jose, CA (US)

( * ) Notice: Subject to any disclaimer, the term of this patent is extended or adjusted under 35 U.S.C. 154(b) by 595 days.

(21) Appl. No.: 17/980,706

(22) Filed: Nov. 4, 2022

(51) Int. Cl.
*G01N 33/50* (2006.01)
*G16B 5/20* (2019.01)

(52) U.S. Cl.
CPC ........... *G01N 33/5023* (2013.01); *G16B 5/20* (2019.02)

(58) Field of Classification Search
CPC .............................. G01N 33/5023; G16B 5/20
USPC ......................................................... 706/23
See application file for complete search history.

(56) References Cited

U.S. PATENT DOCUMENTS

| | | | | |
|---|---|---|---|---|
| 5,623,592 | A * | 4/1997 | Carlson | G06F 8/34 700/83 |
| 7,886,264 | B1 * | 2/2011 | Peyton | G06F 8/34 709/201 |
| 2006/0178862 | A1 * | 8/2006 | Chan | G06F 30/00 703/11 |
| 2008/0006535 | A1 * | 1/2008 | Paik | B01L 3/502792 204/600 |

OTHER PUBLICATIONS

Cheung, et al., "Current trends in flow cytometry automated data analysis software", Cytometry, 2021:99:1007-1021, 2021 (Year: 2021).*
O'Neill, et al., "Flow cytometry bioinformatics", PLOS Computational Biology, Dec. 2013, Issue 12, 2013 (Year: 2013).*

* cited by examiner

*Primary Examiner* — Tsu-Chang Lee
(74) *Attorney, Agent, or Firm* — Kilpatrick Townsend & Stockton LLP

(57) ABSTRACT

Disclosed is a system and method providing a graphical user interface that allows a user to quickly build a graphical representation defining the set of instructions in a protocol without the user needing the programming knowledge to encapsulate those instructions in executable code. The graphical model may include graphical elements corresponding to instructions or program logic. Once the graphical model designed for a single plate is finalized, the system generates a first execution sequence for executing the graphical model on multiple plates. The system then generates a second execution sequence that will require less time and/or computing resources than the first execution sequence. The system generates an executable code for the second execution sequence, and executes the code representing the second execution sequence instead of the first execution sequence using various flow cytometry machines.

23 Claims, 46 Drawing Sheets

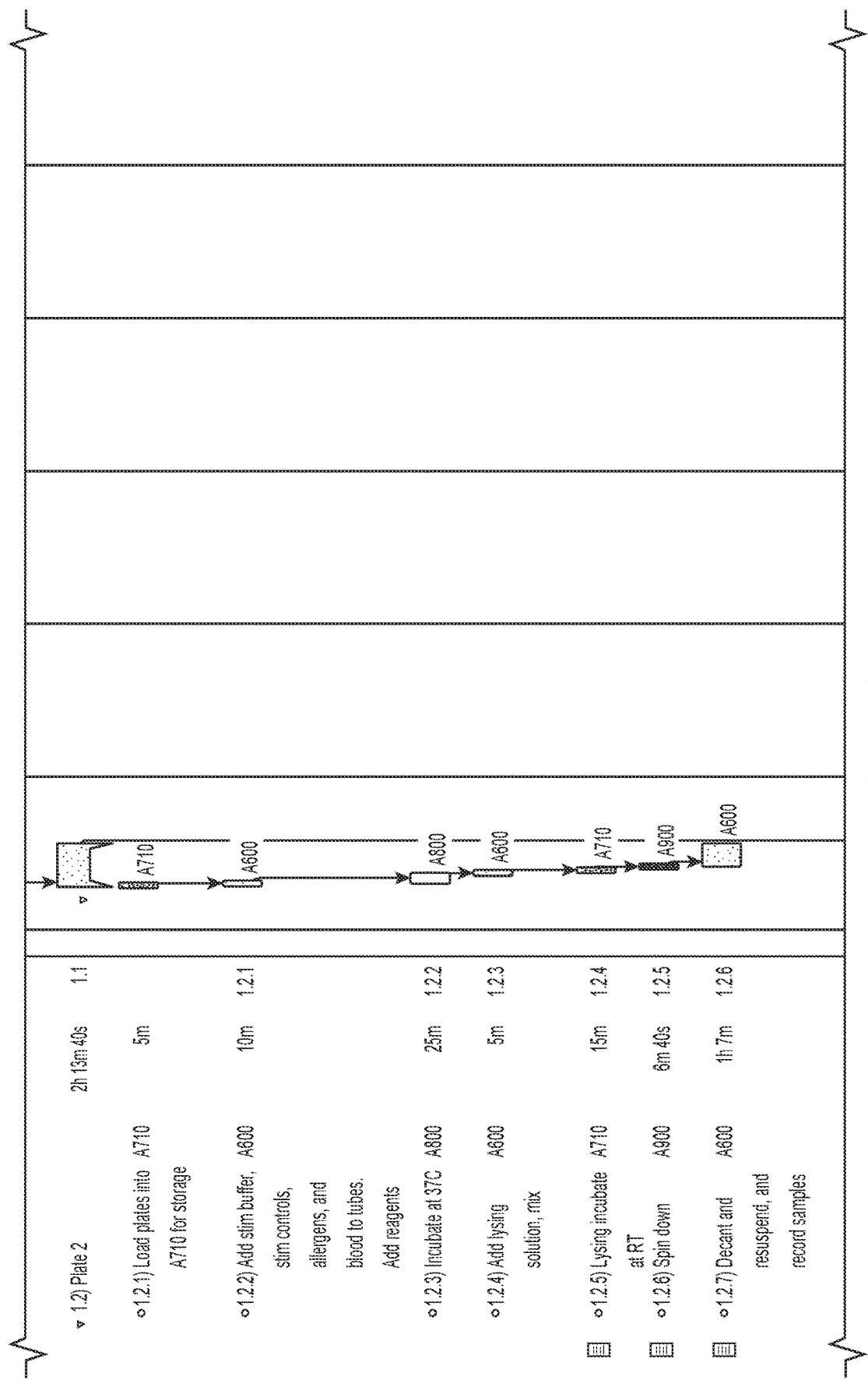
FIG. 7 (Cont. 1)

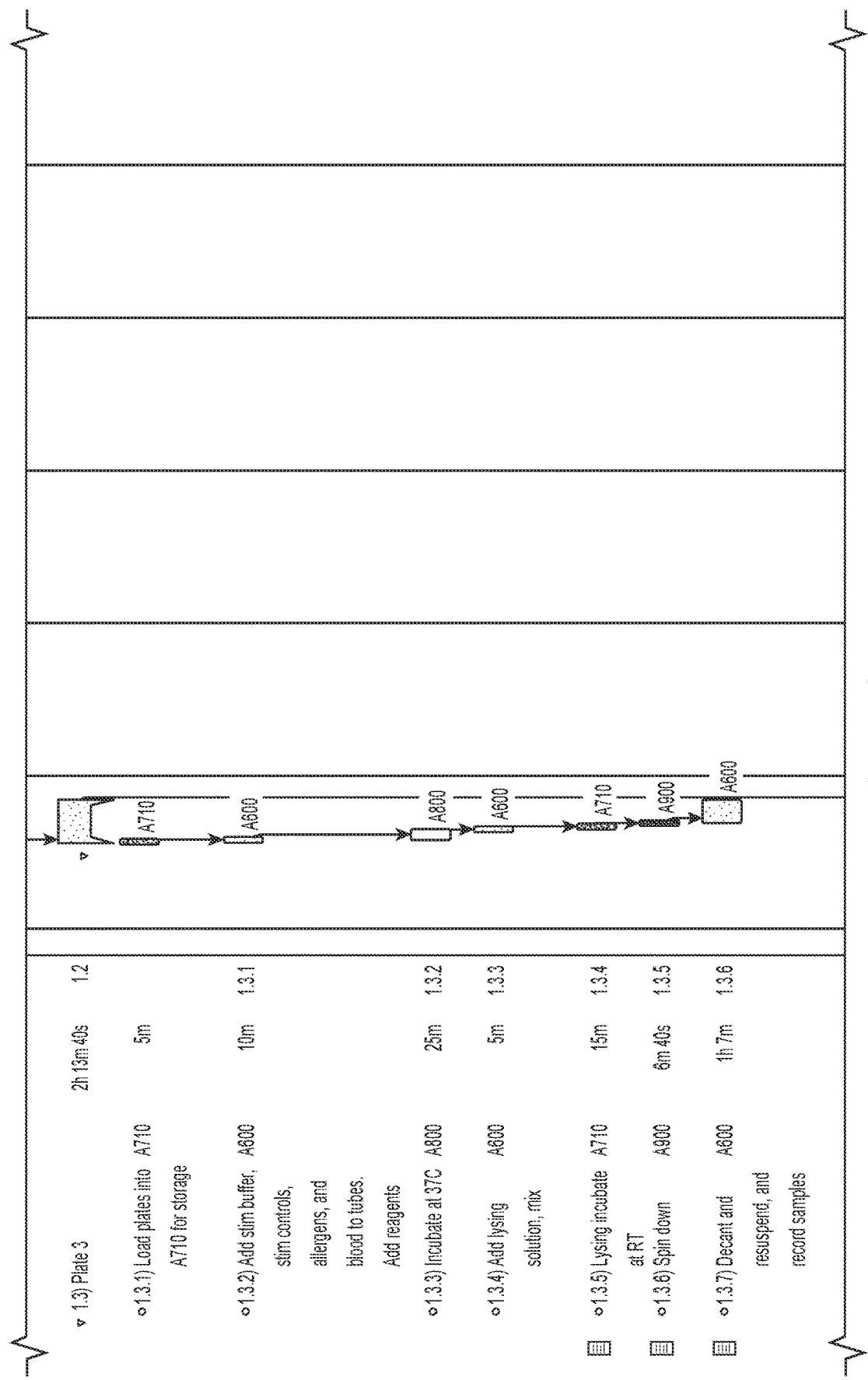
FIG. 7 (Cont. 2)

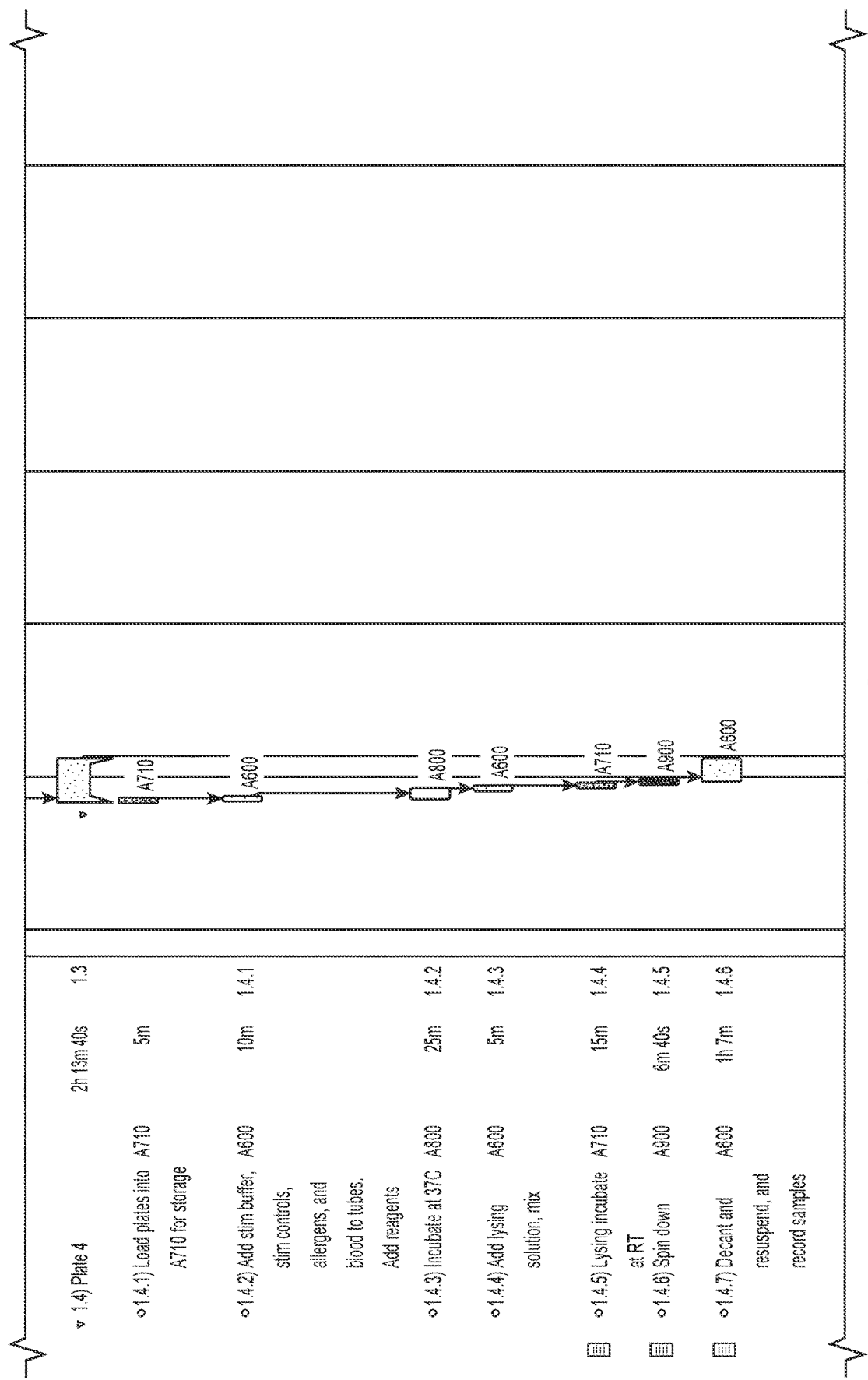
FIG. 7 (Cont. 3)

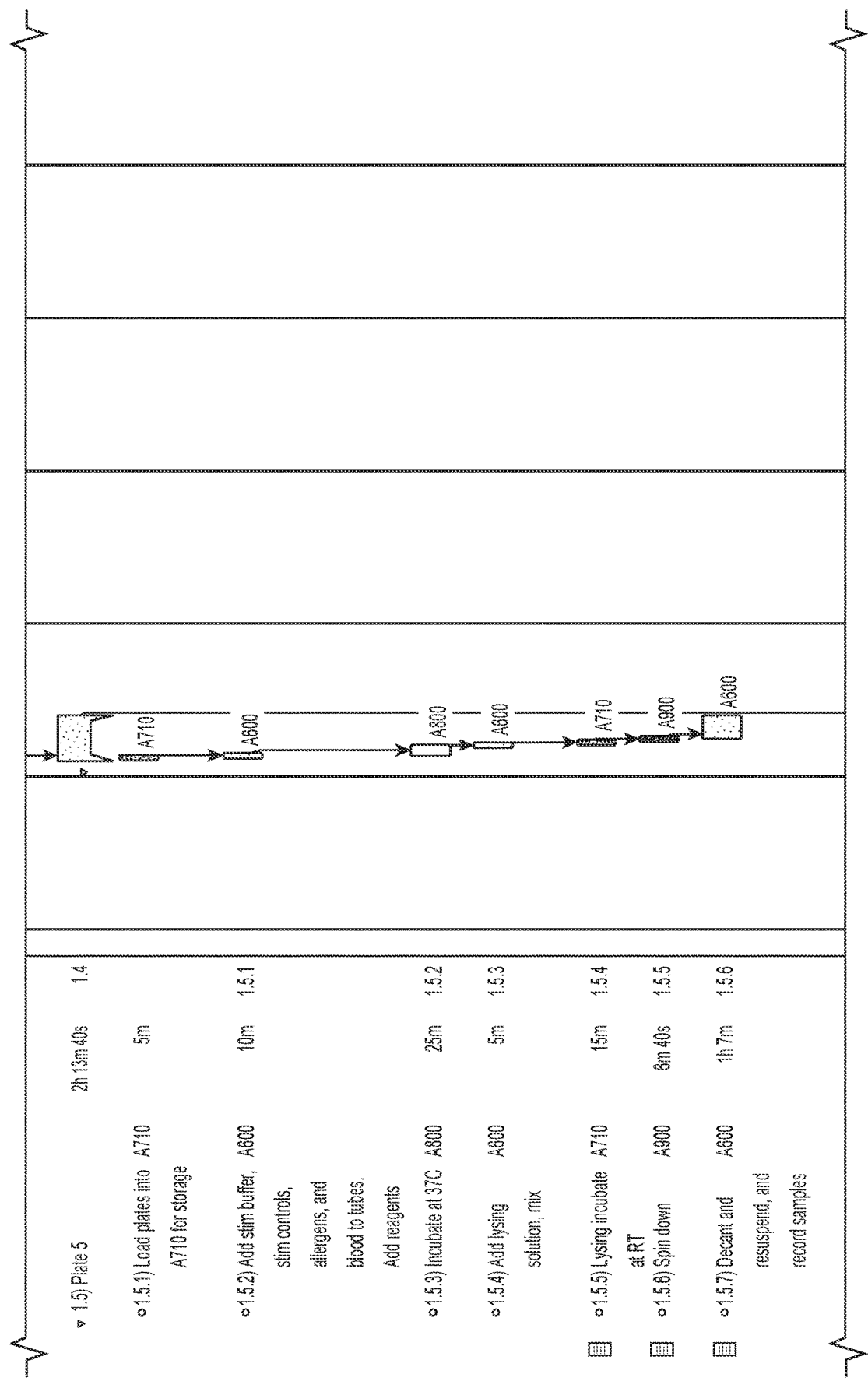
FIG. 7 (Cont. 4)

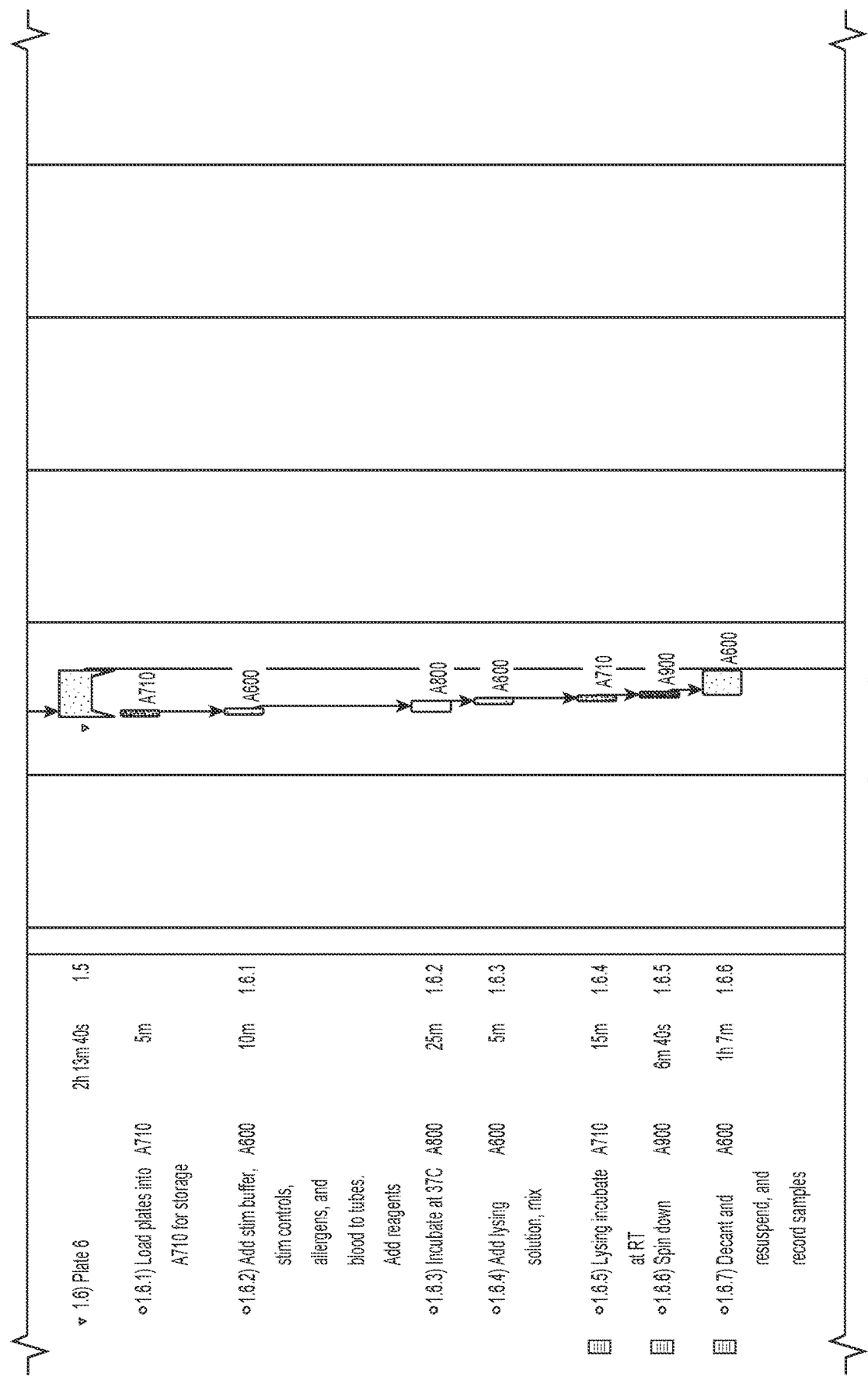
FIG. 7 (Cont. 5)

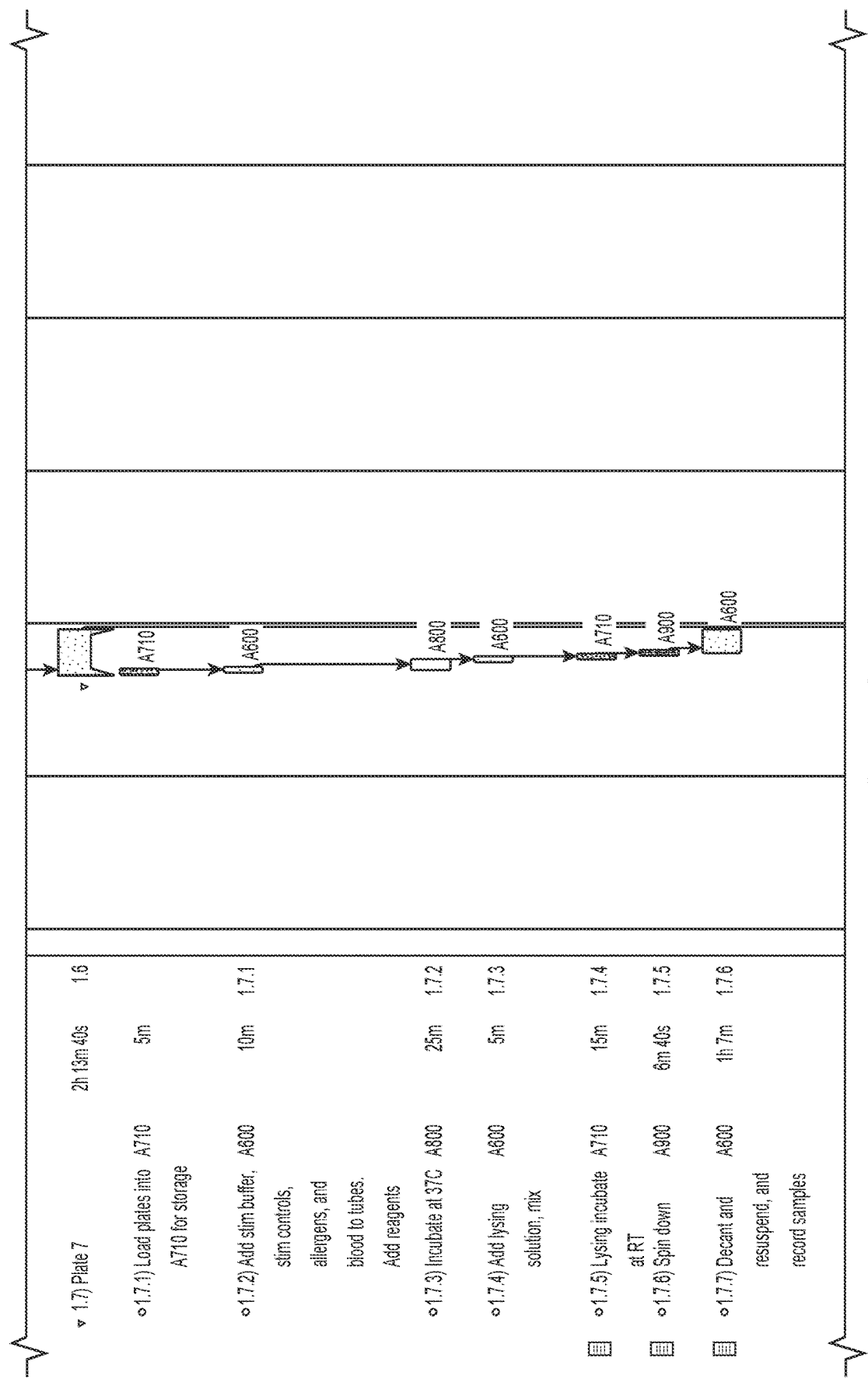
FIG. 7 (Cont. 6)

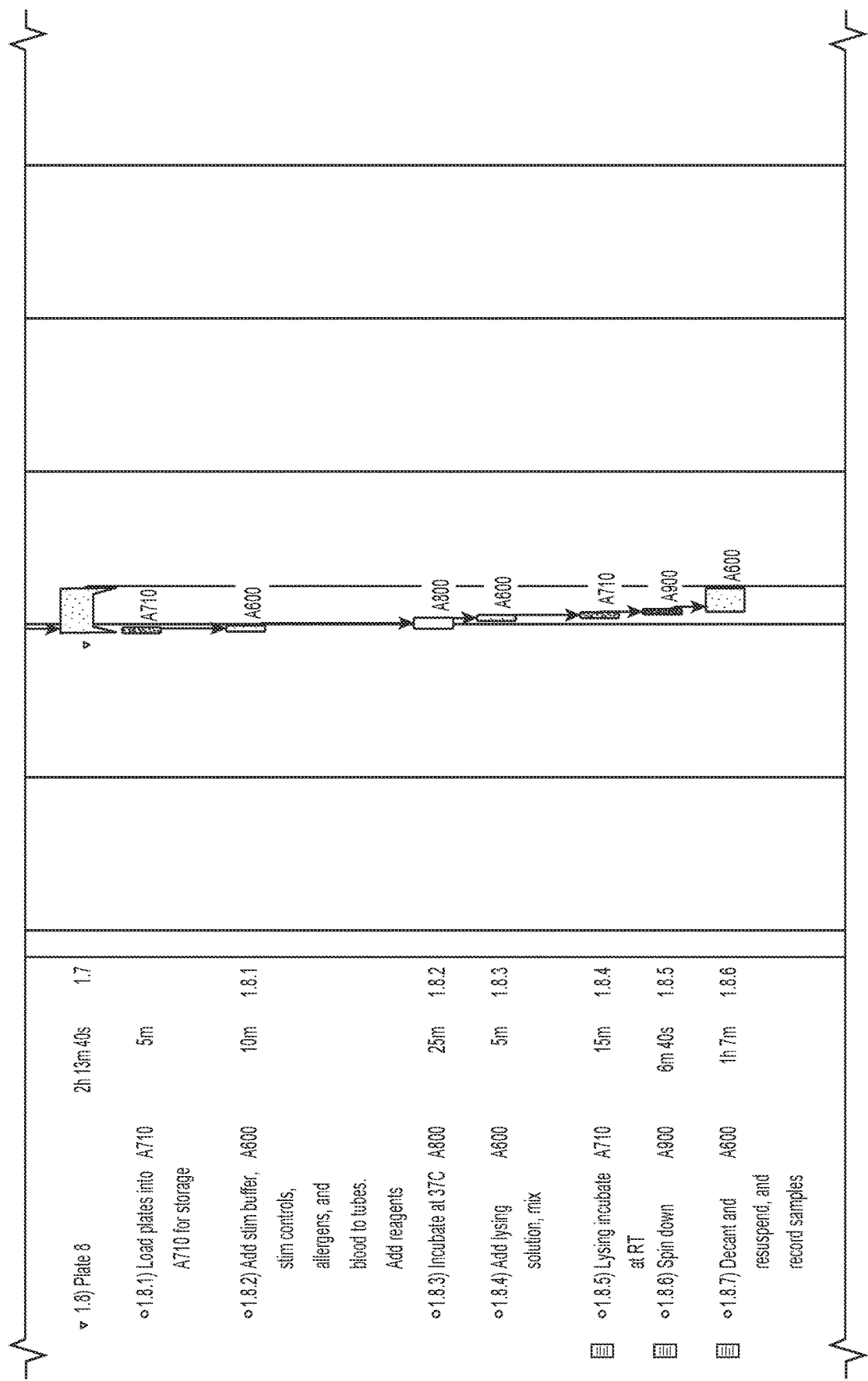
FIG. 7 (Cont. 7)

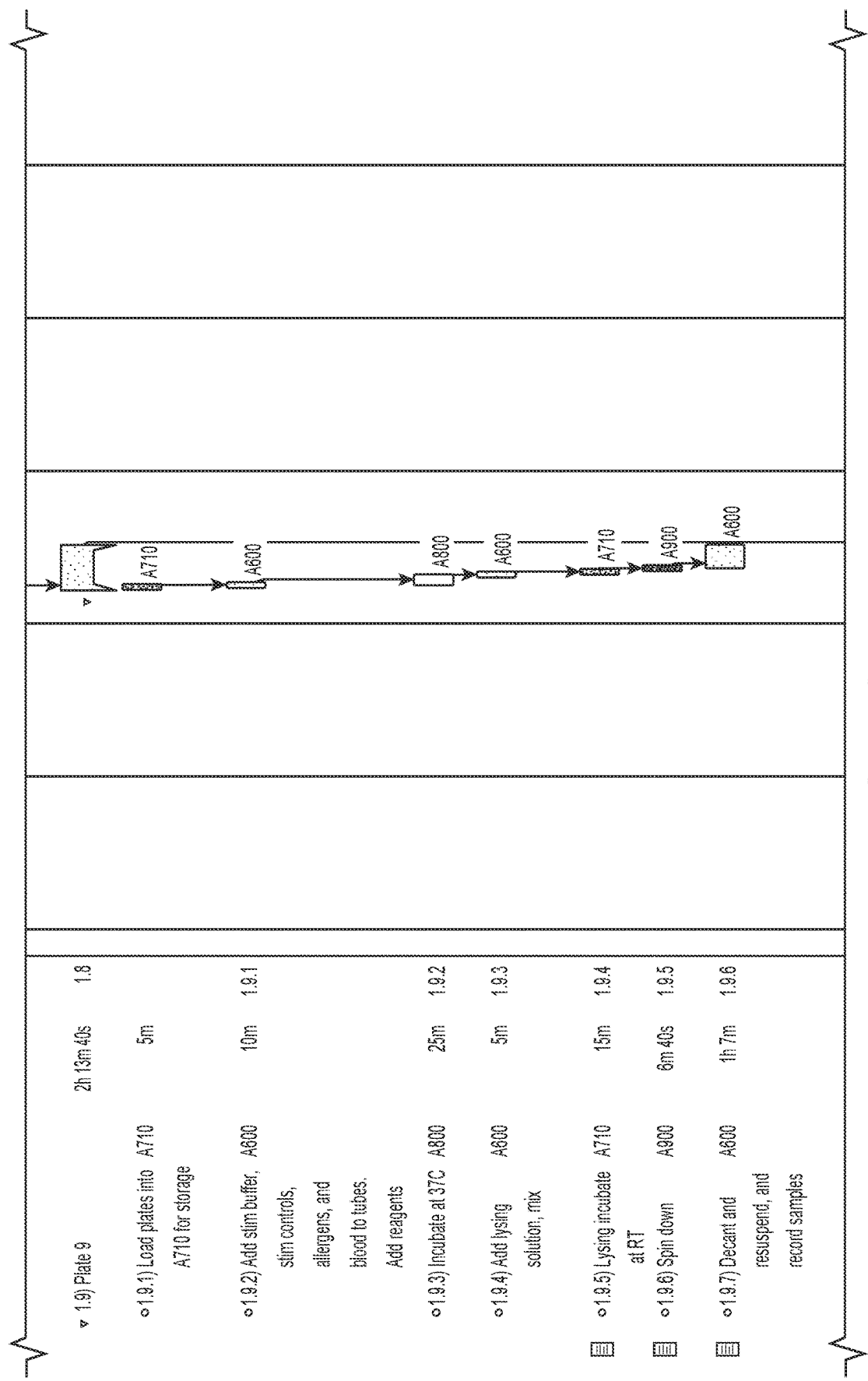
FIG. 7 (Cont. 8)

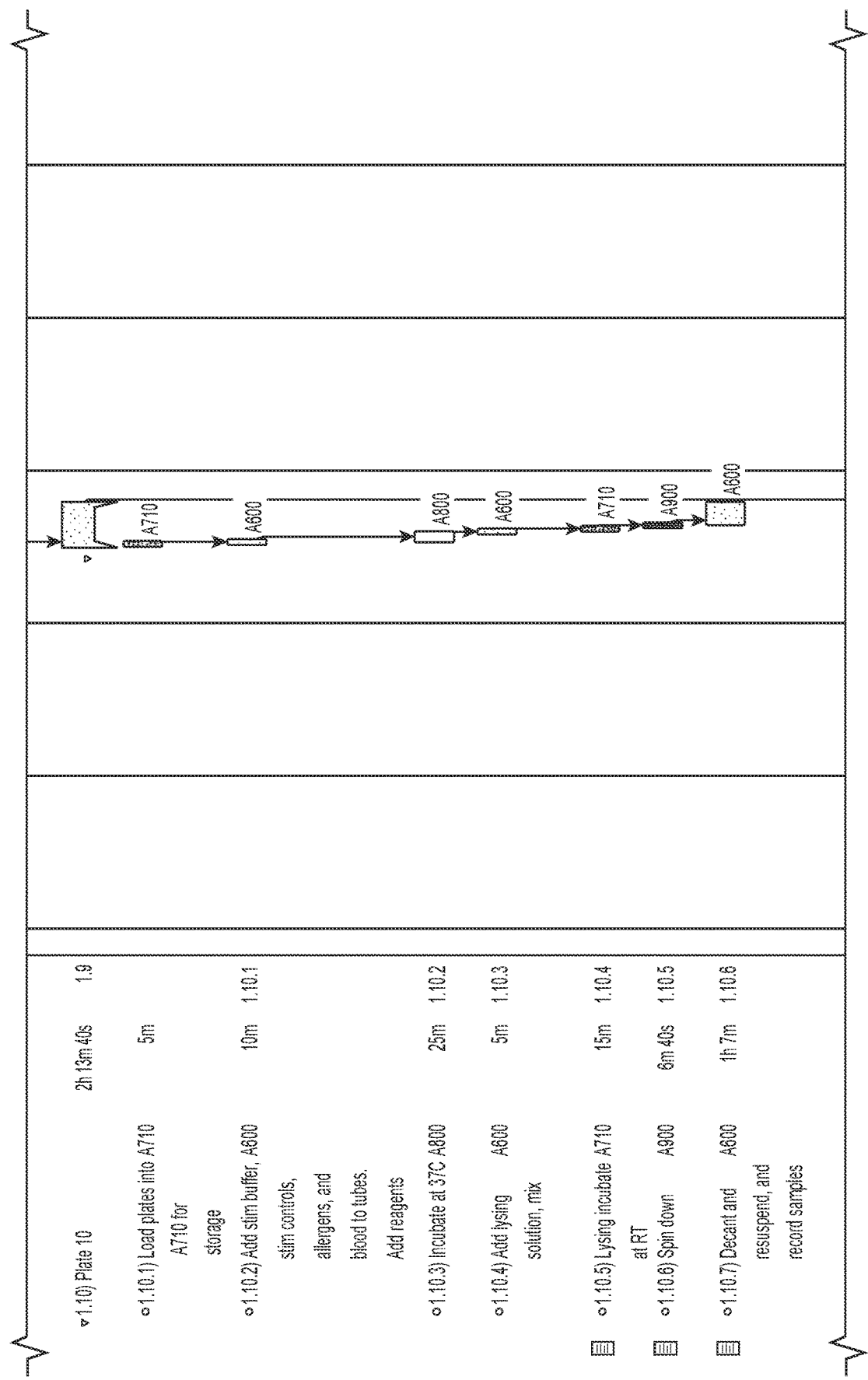
FIG. 7 (Cont. 9)

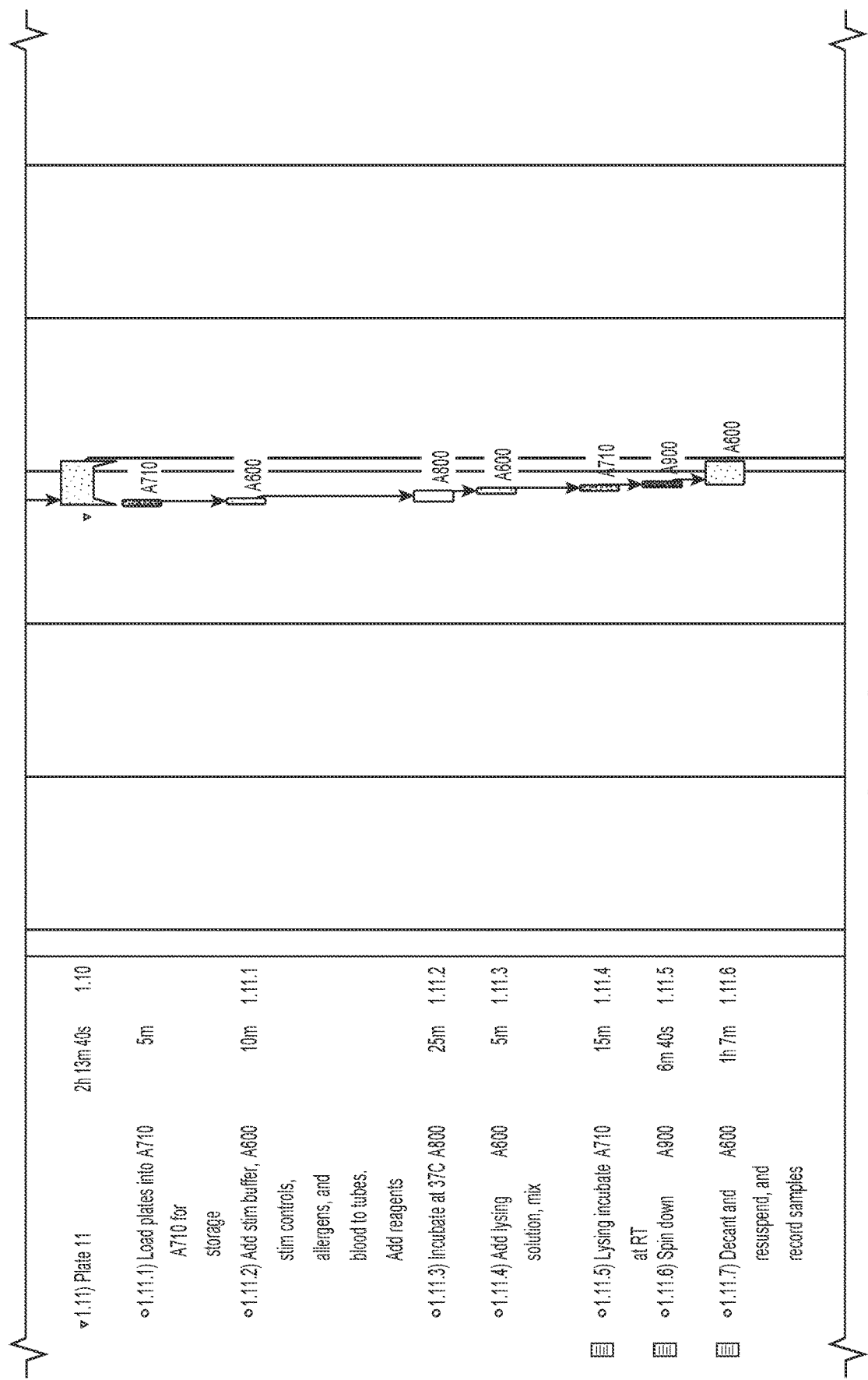
FIG. 7 (Cont. 10)

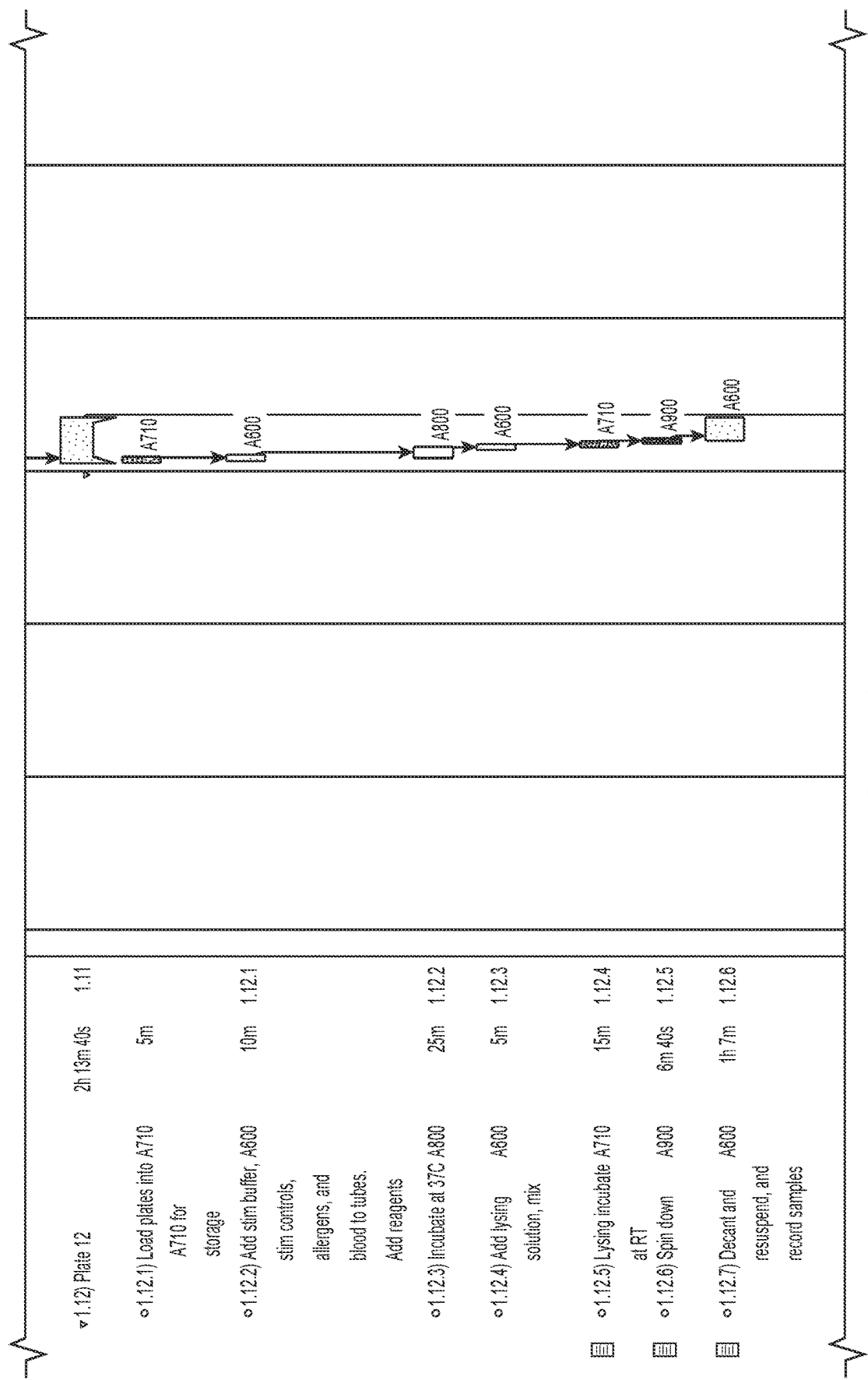
FIG. 7 (Cont. 11)

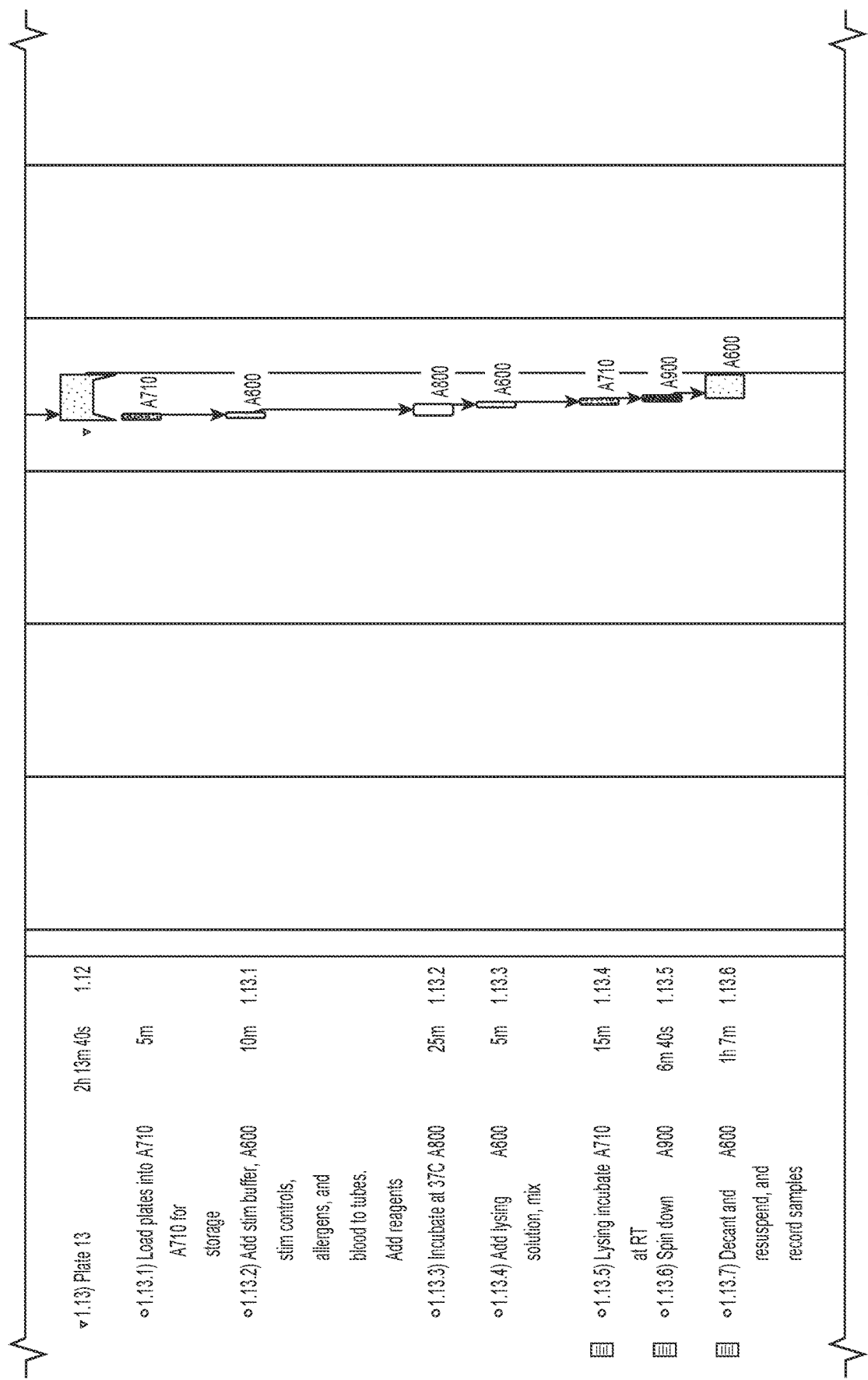
FIG. 7 (Cont. 12)

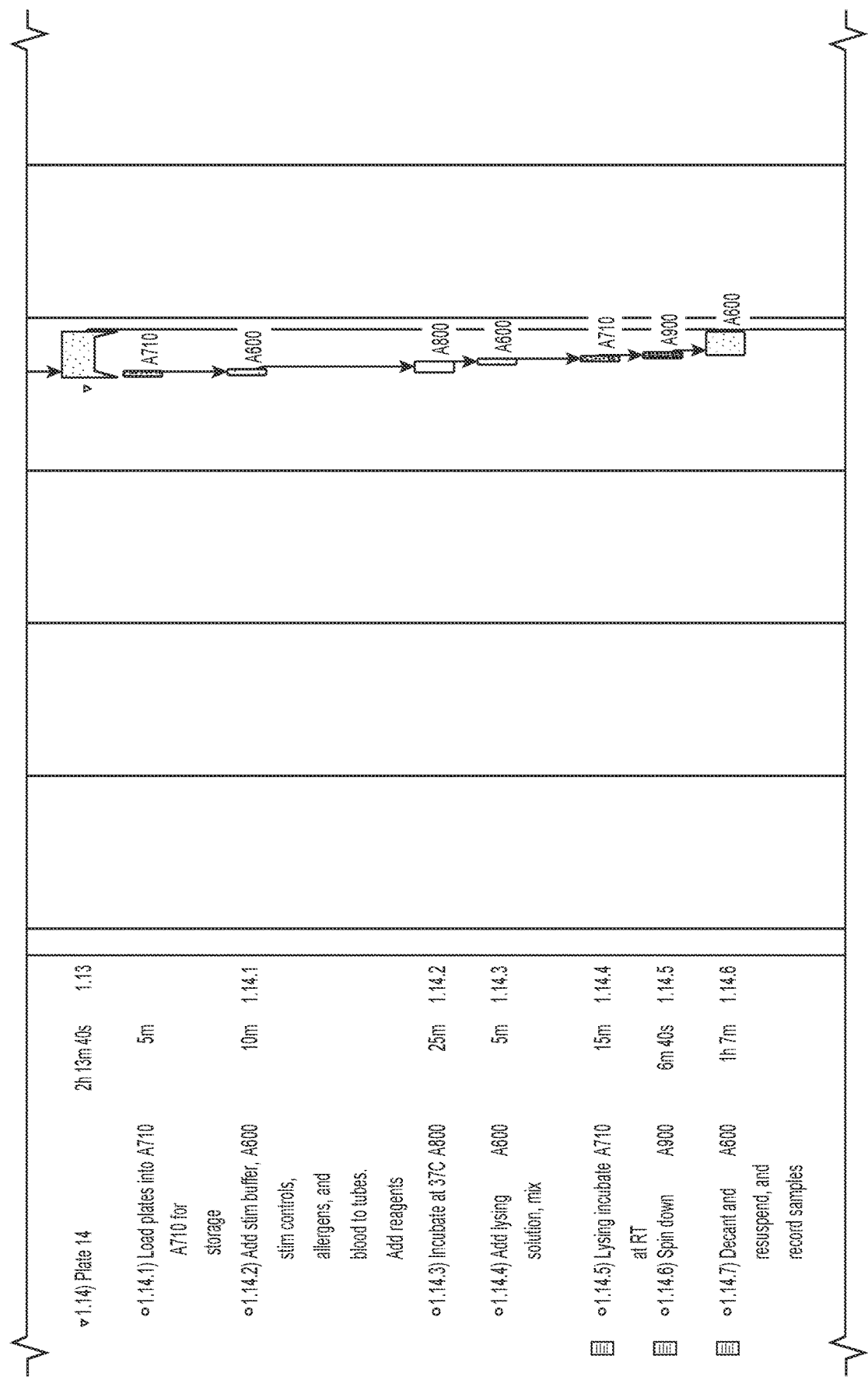
FIG. 7 (Cont. 13)

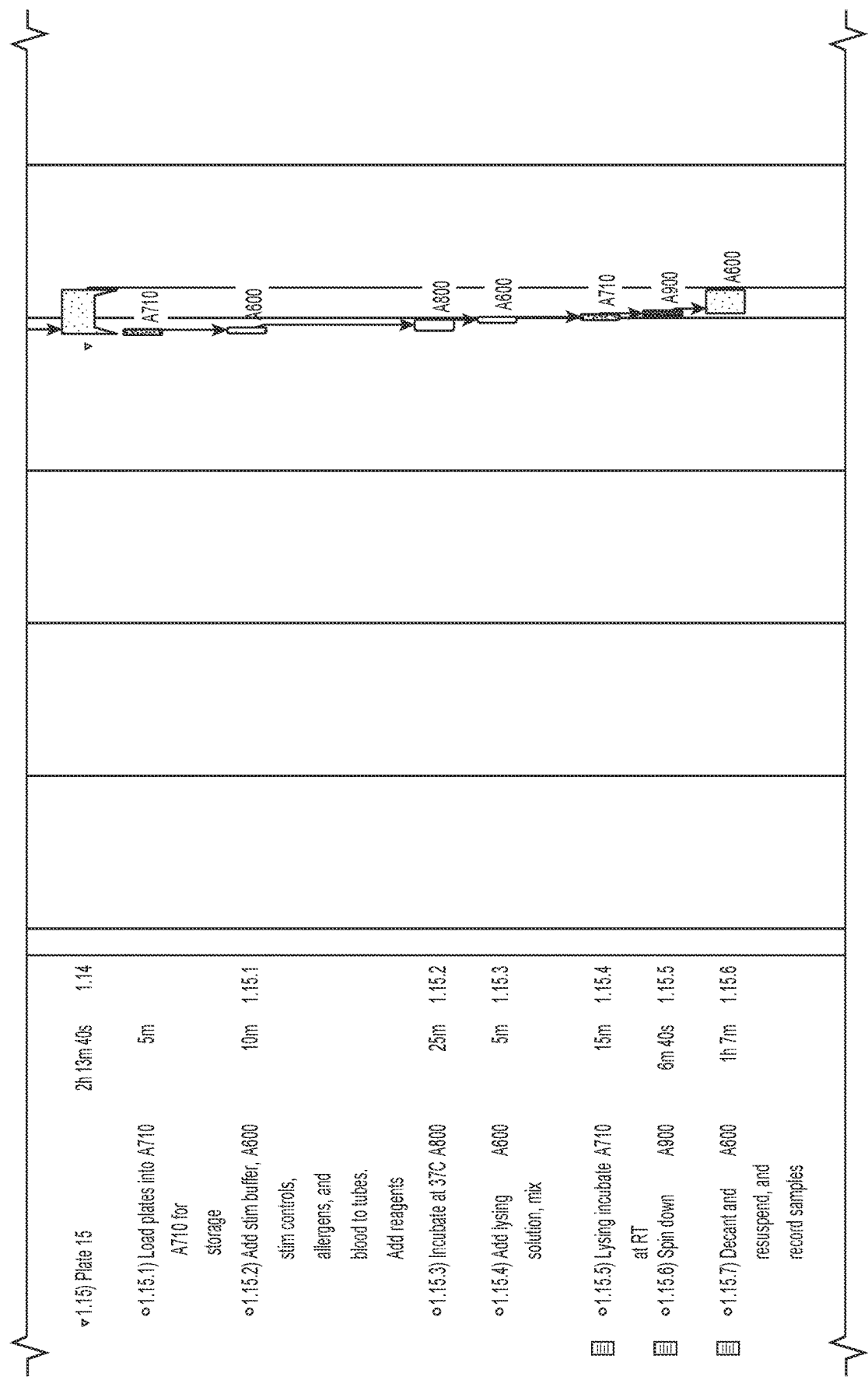
FIG. 7 (Cont. 14)

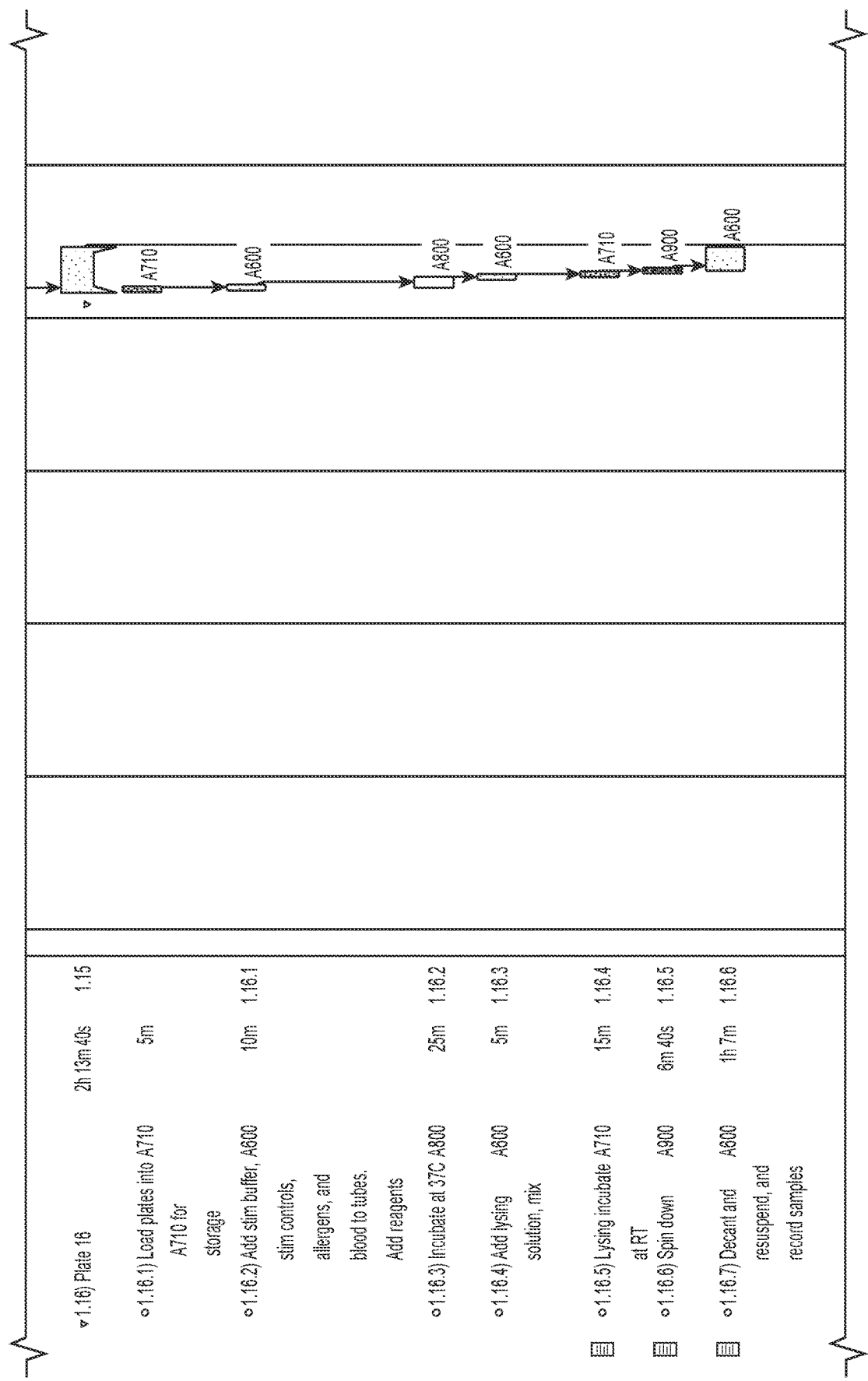
FIG. 7 (Cont. 15)

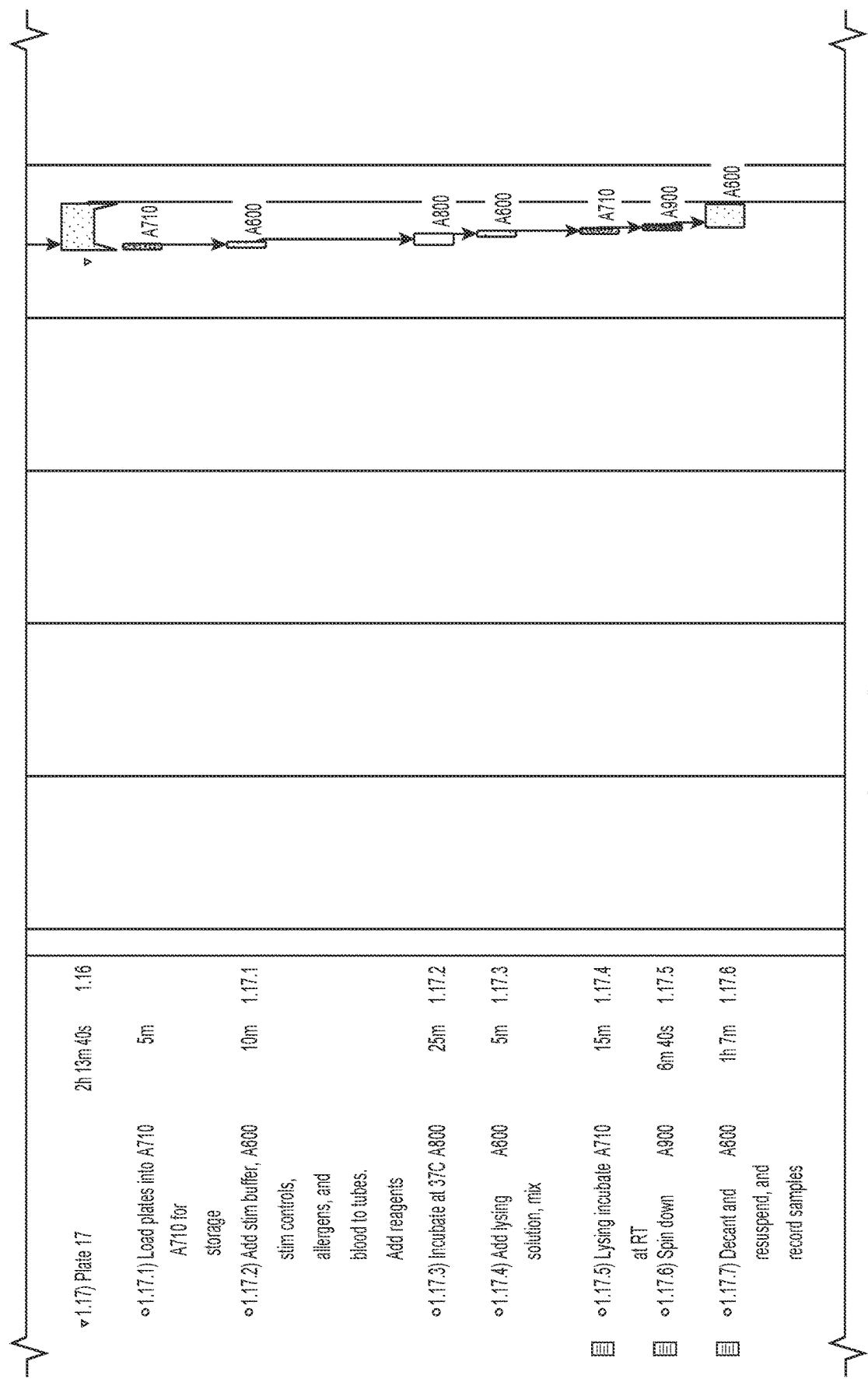
FIG. 7 (Cont. 16)

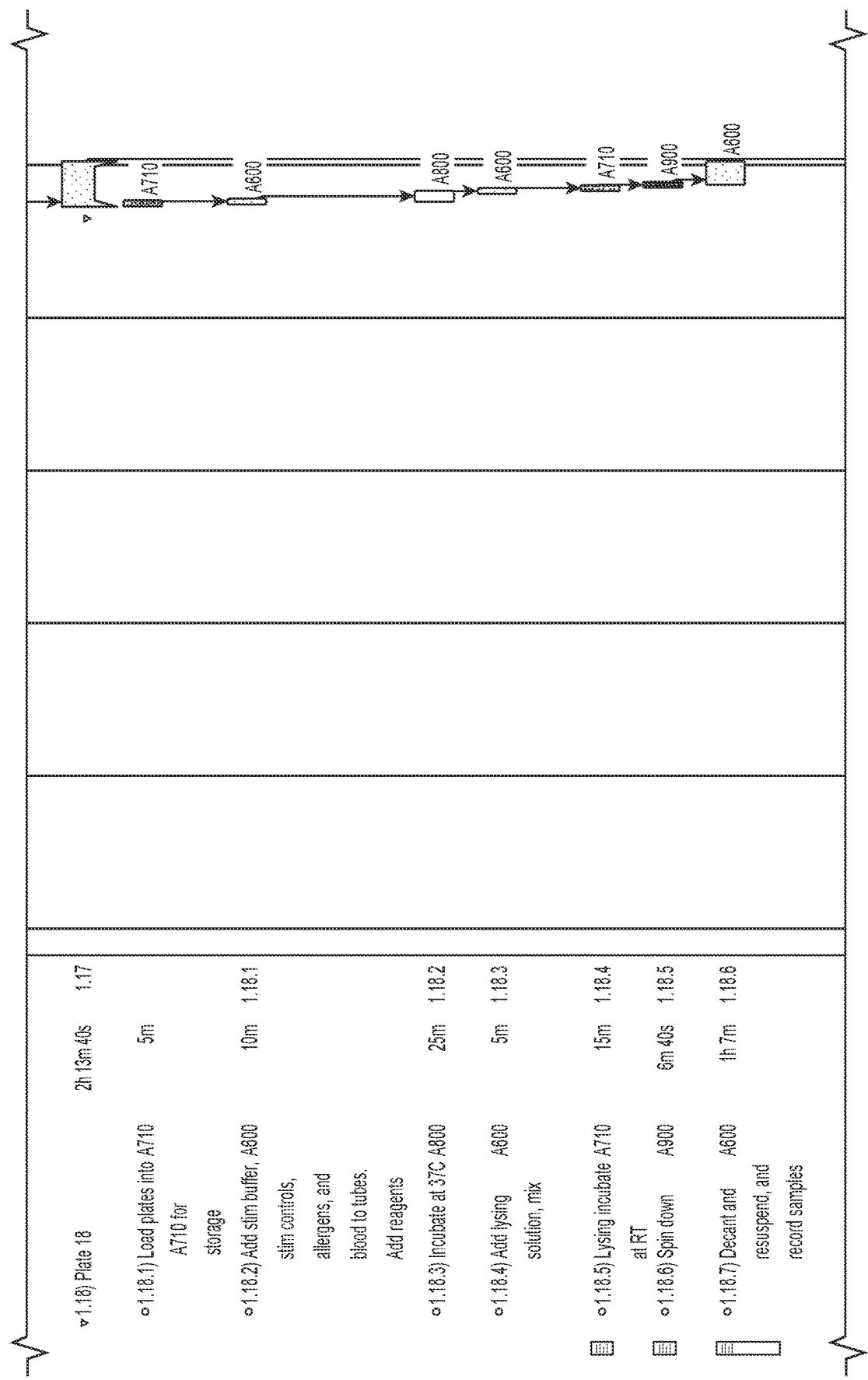
FIG. 7 (Cont. 17)

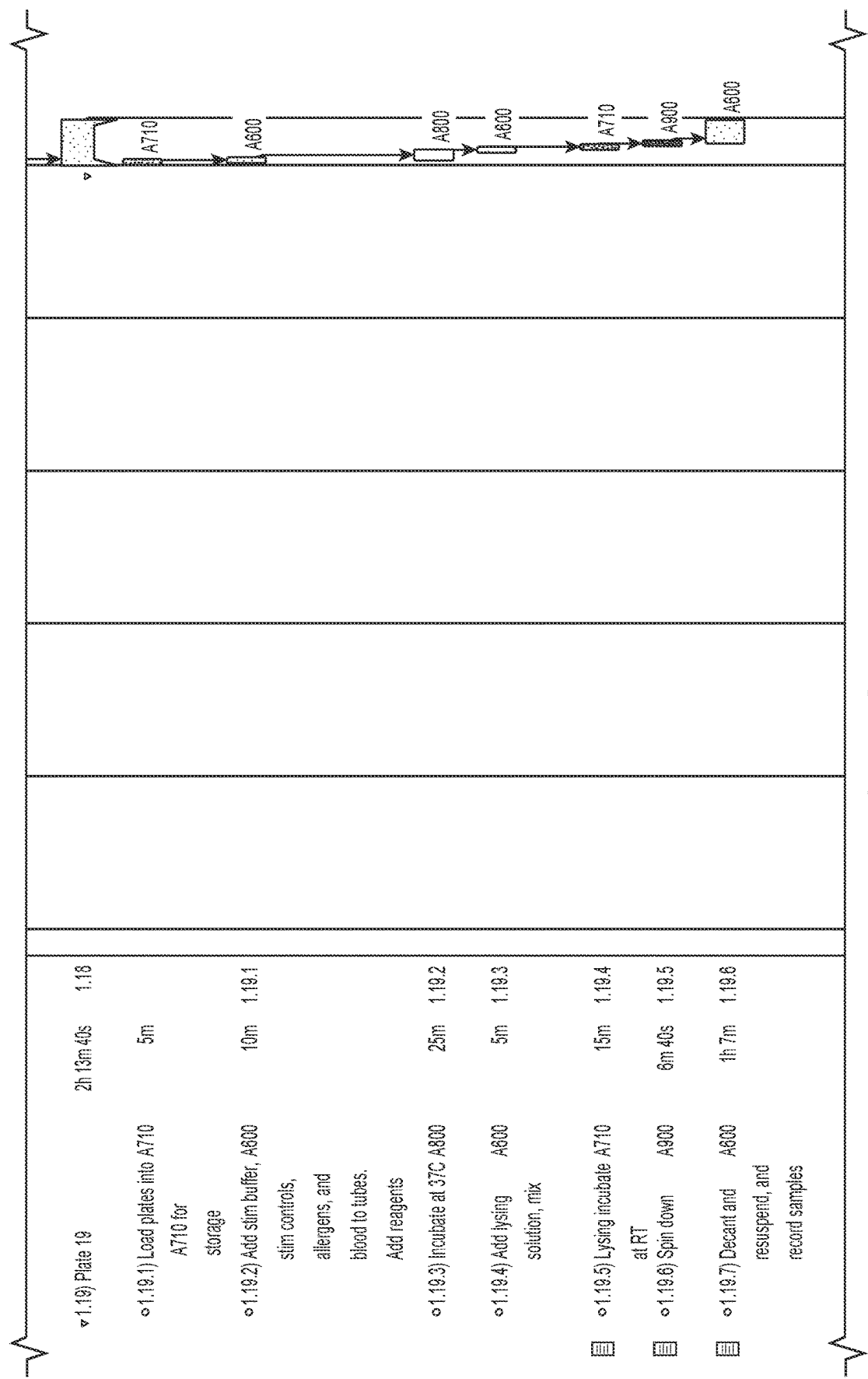
FIG. 7 (Cont. 18)

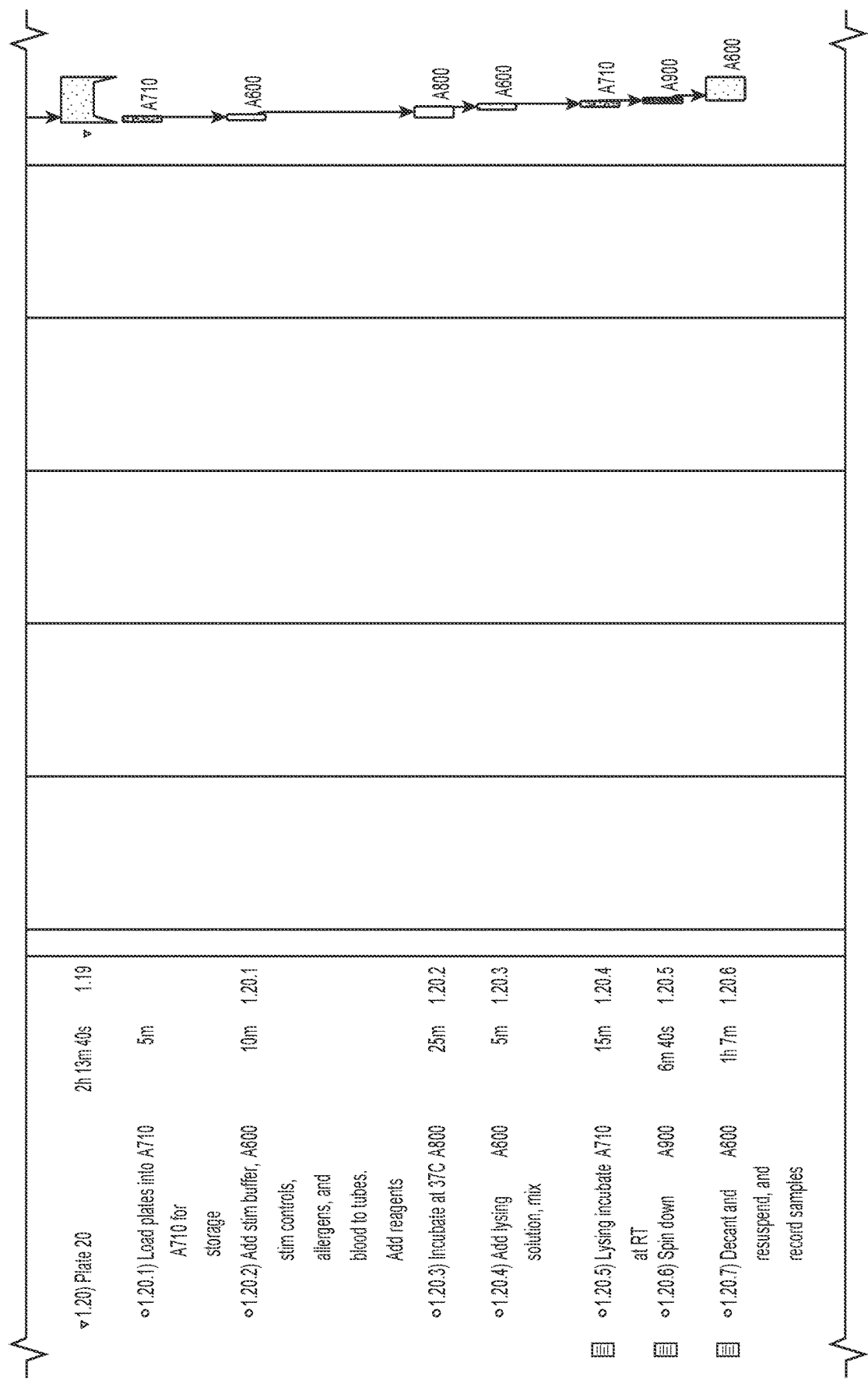
FIG. 7 (Cont. 19)

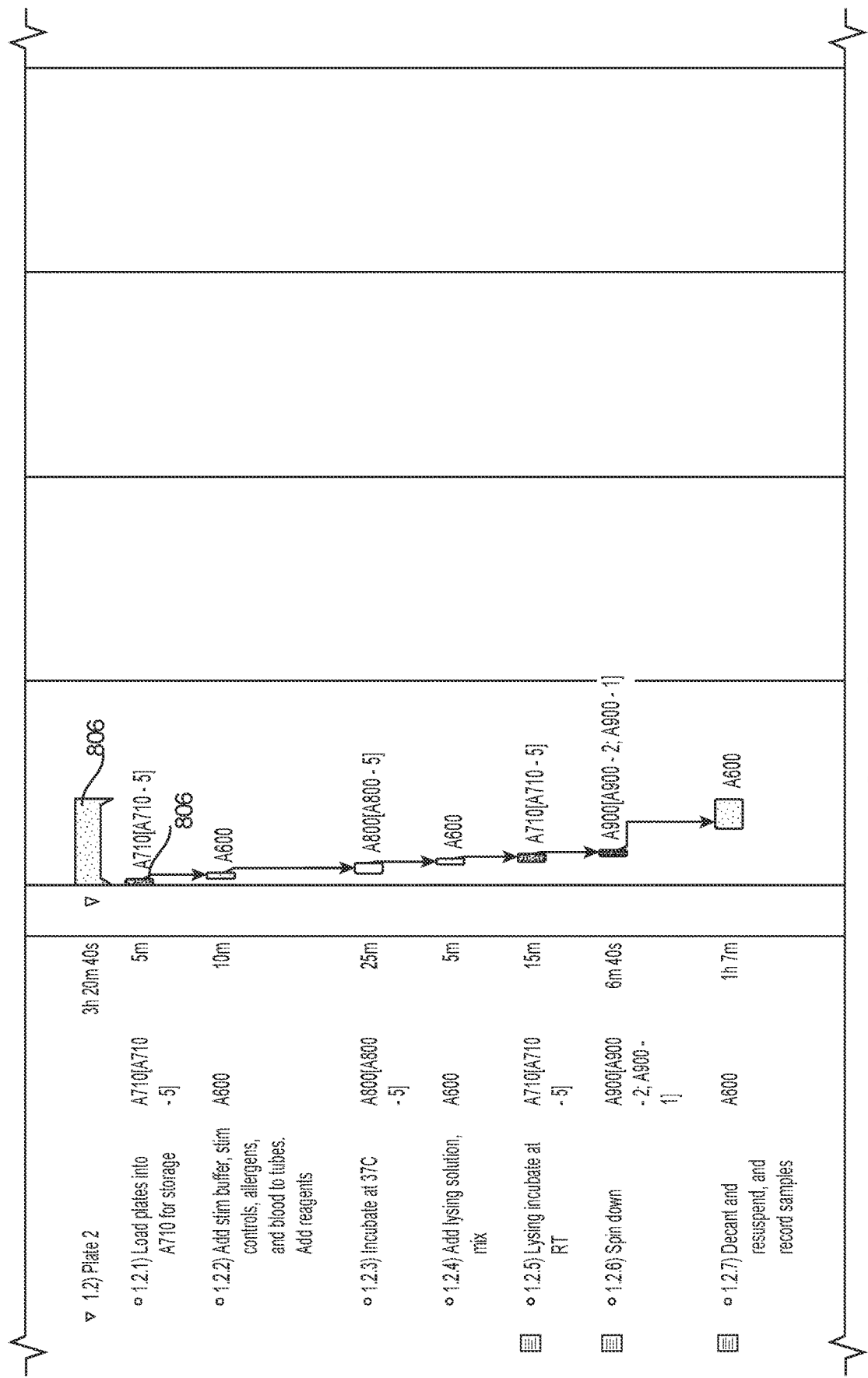
FIG. 8 (Cont. 1)

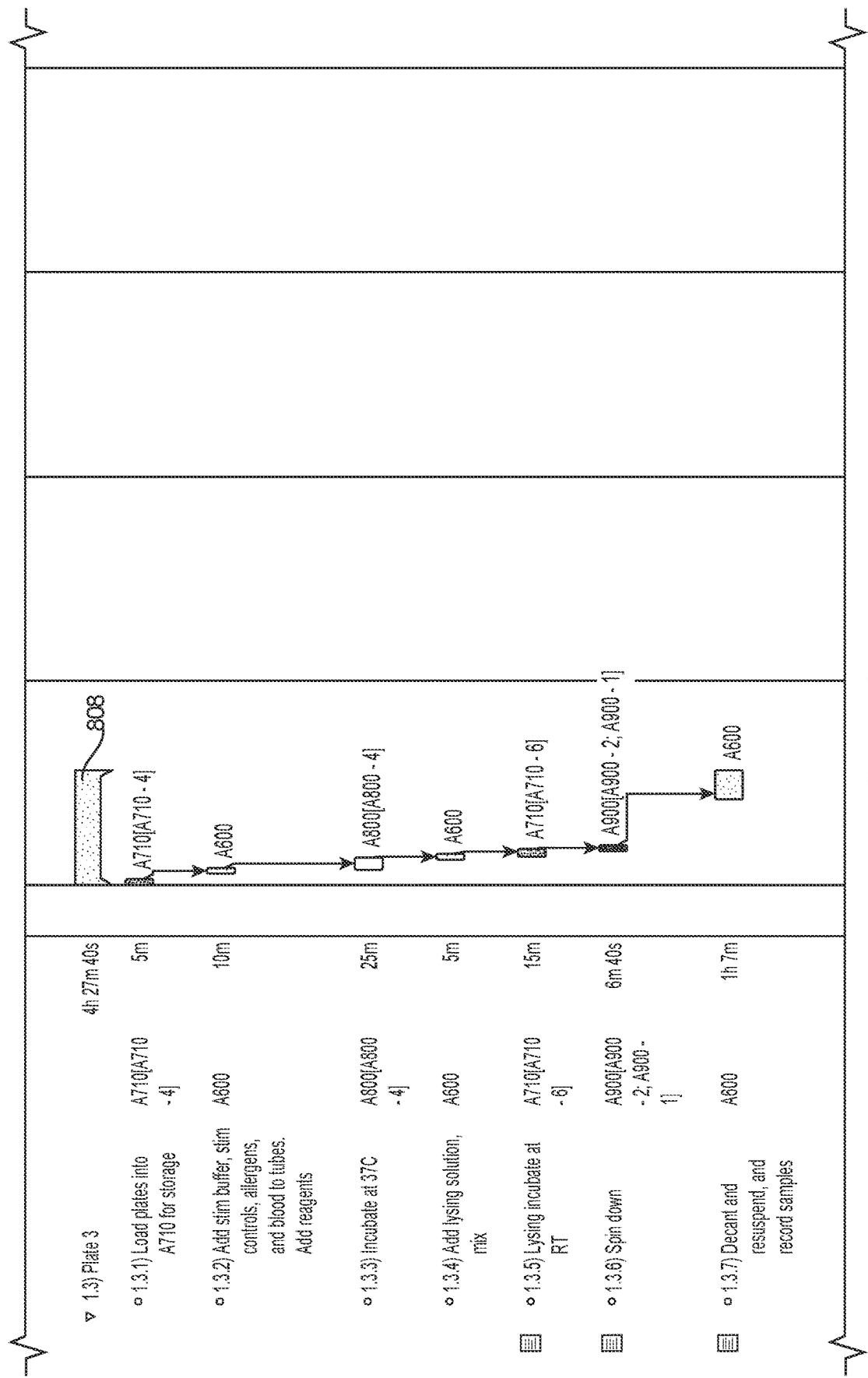
FIG. 8 (Cont. 2)

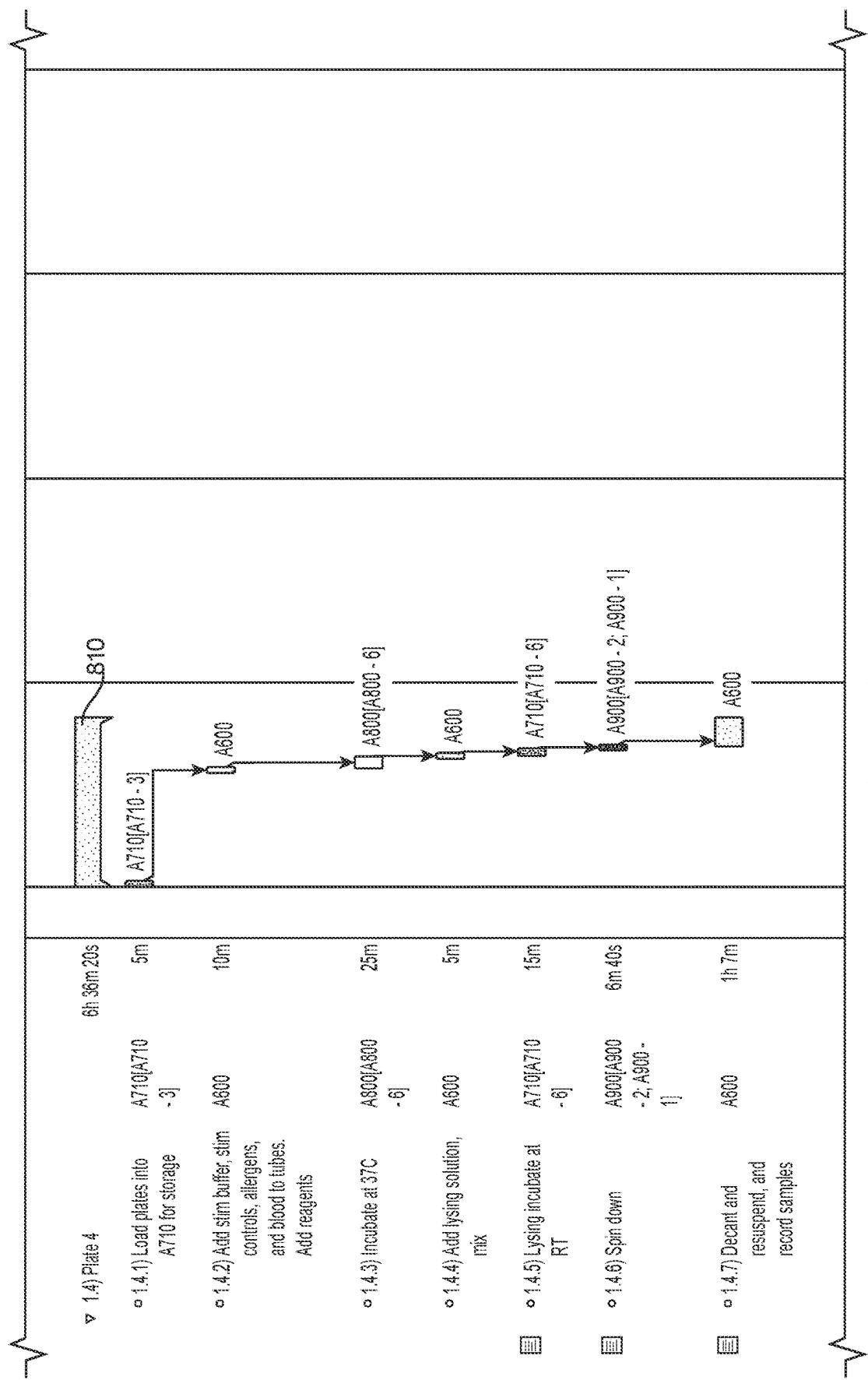
FIG. 8 (Cont. 3)

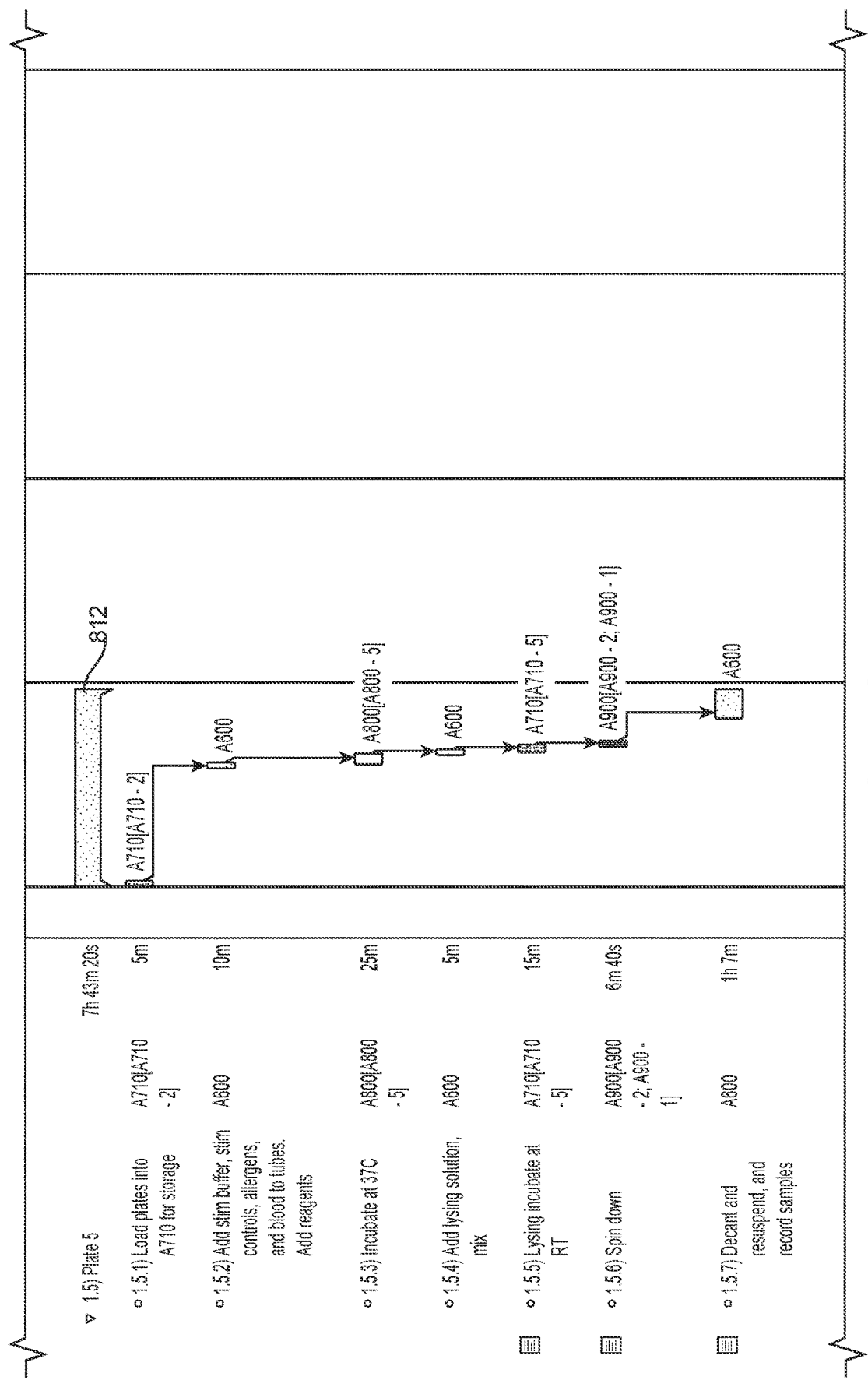
FIG. 8 (Cont. 4)

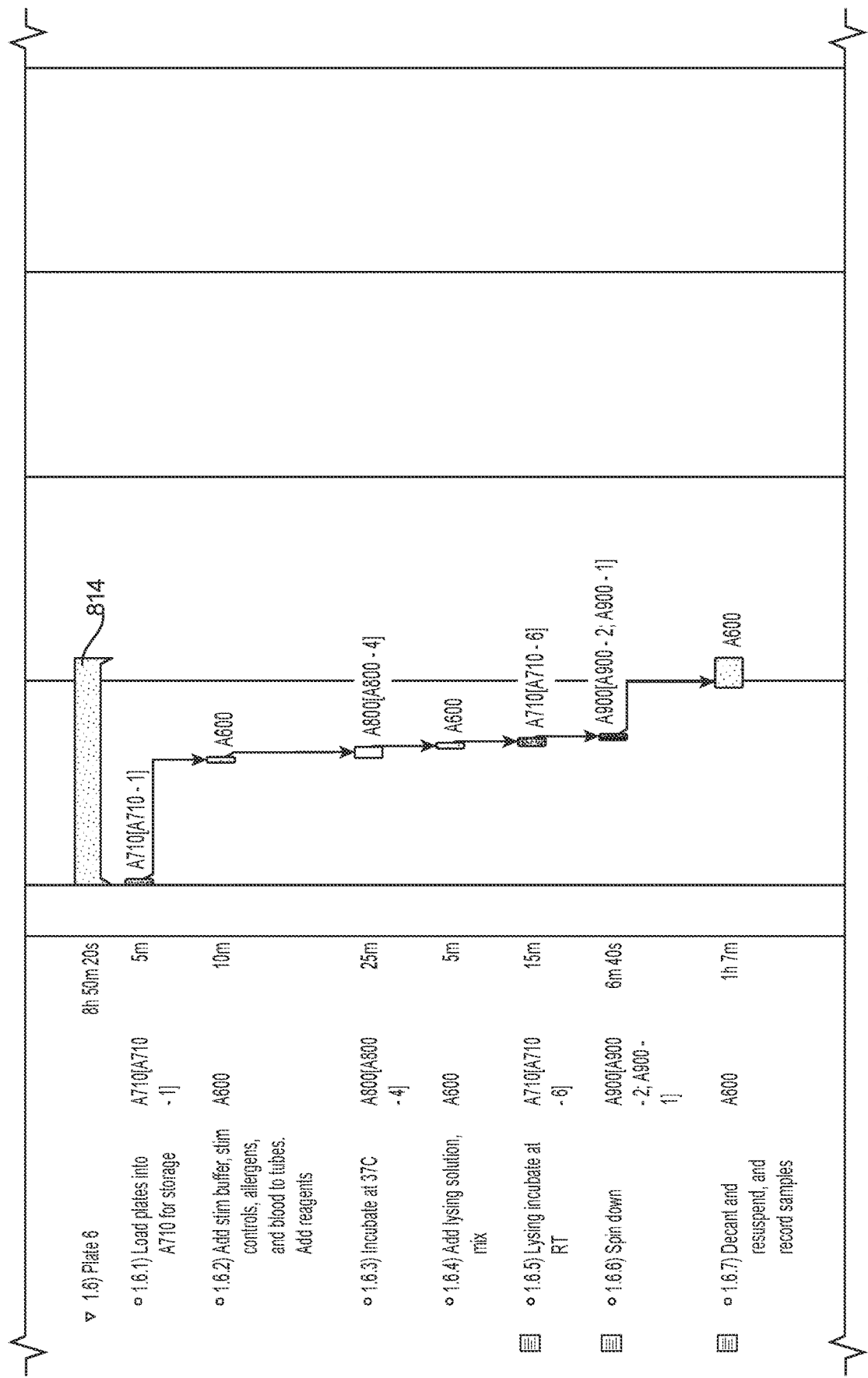
FIG. 8 (Cont. 5)

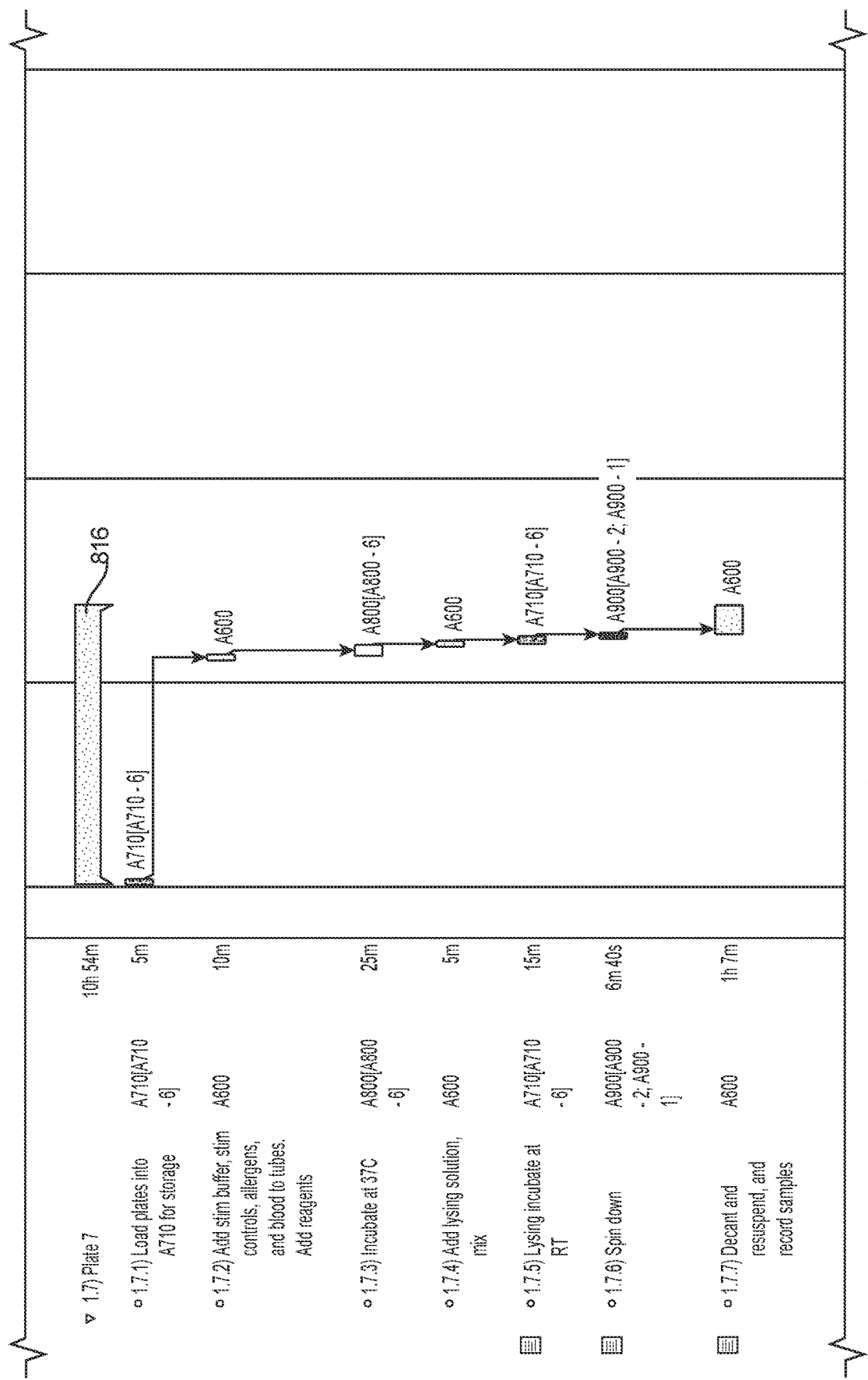
FIG. 8 (Cont. 6)

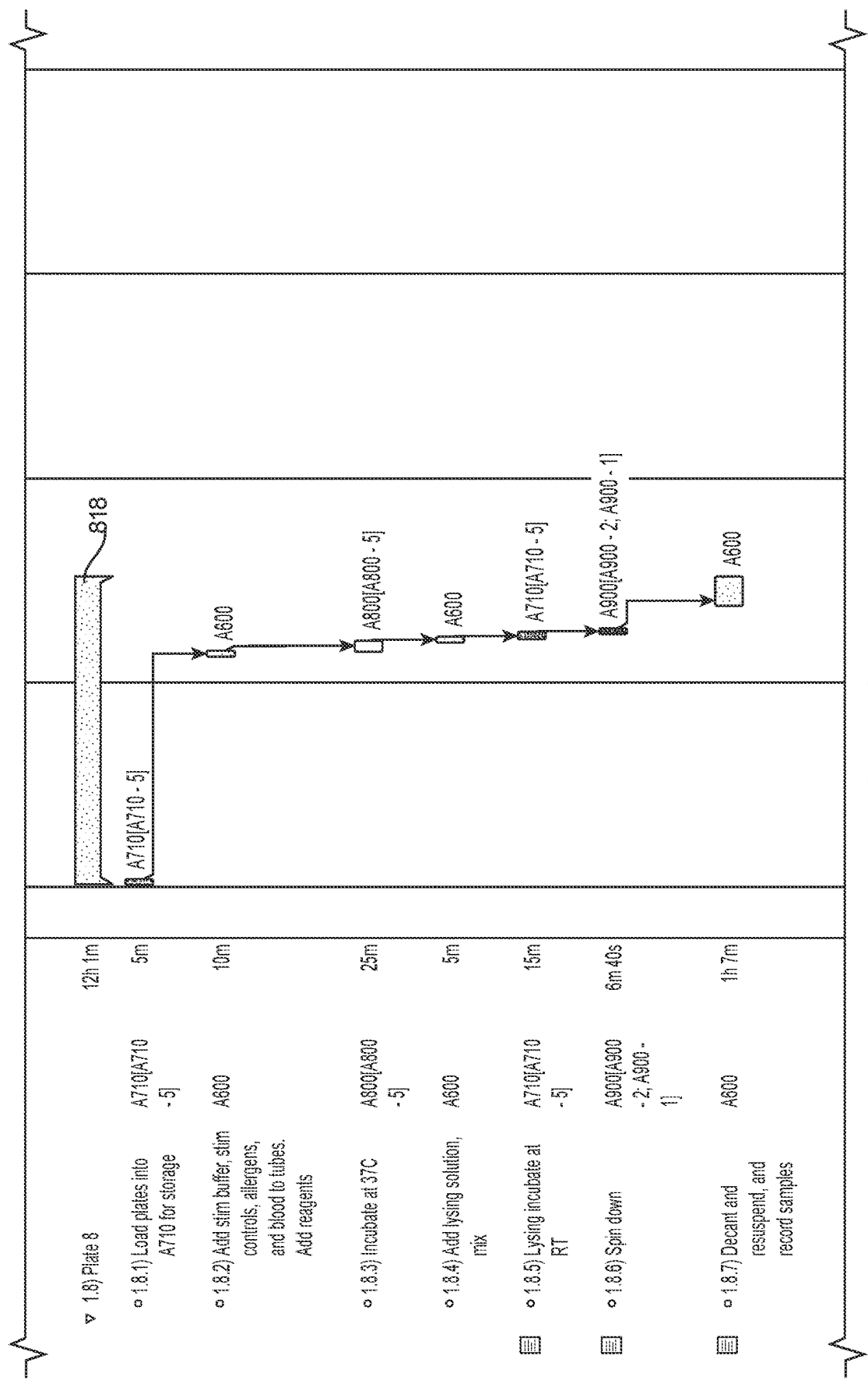
FIG. 8 (Cont. 7)

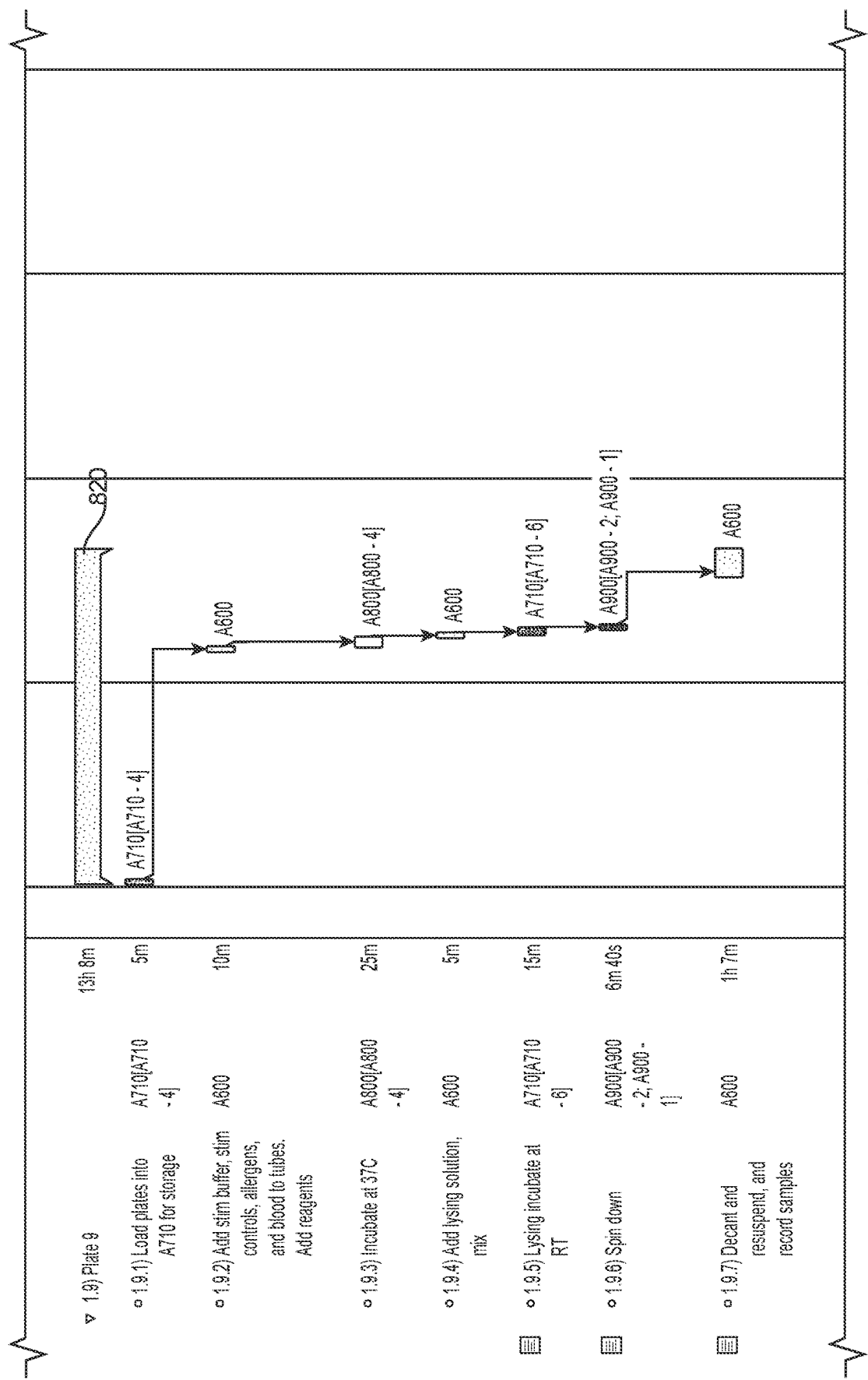
FIG. 8 (Cont. 8)

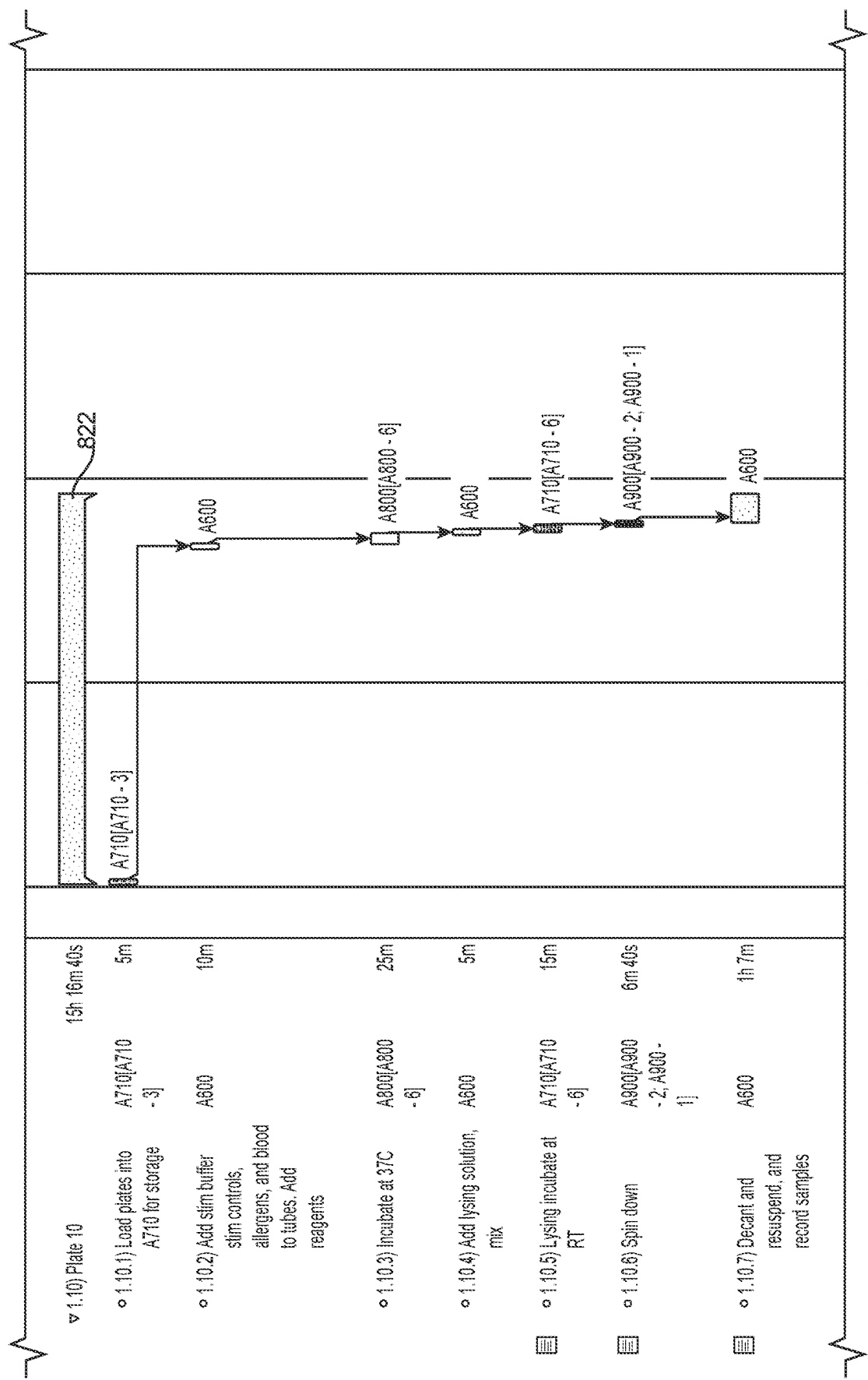
FIG. 8 (Cont. 9)

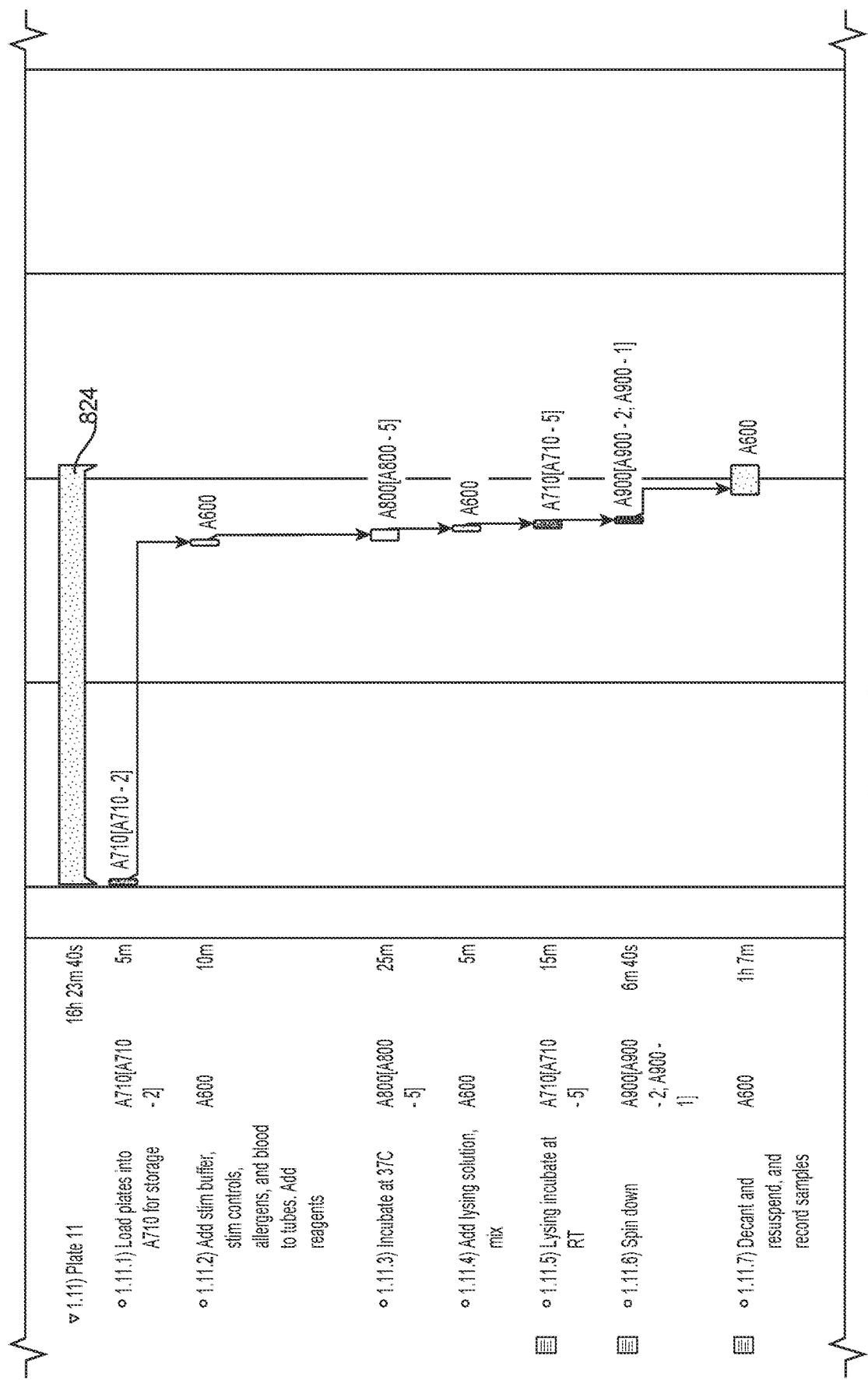
FIG. 8 (Cont. 10)

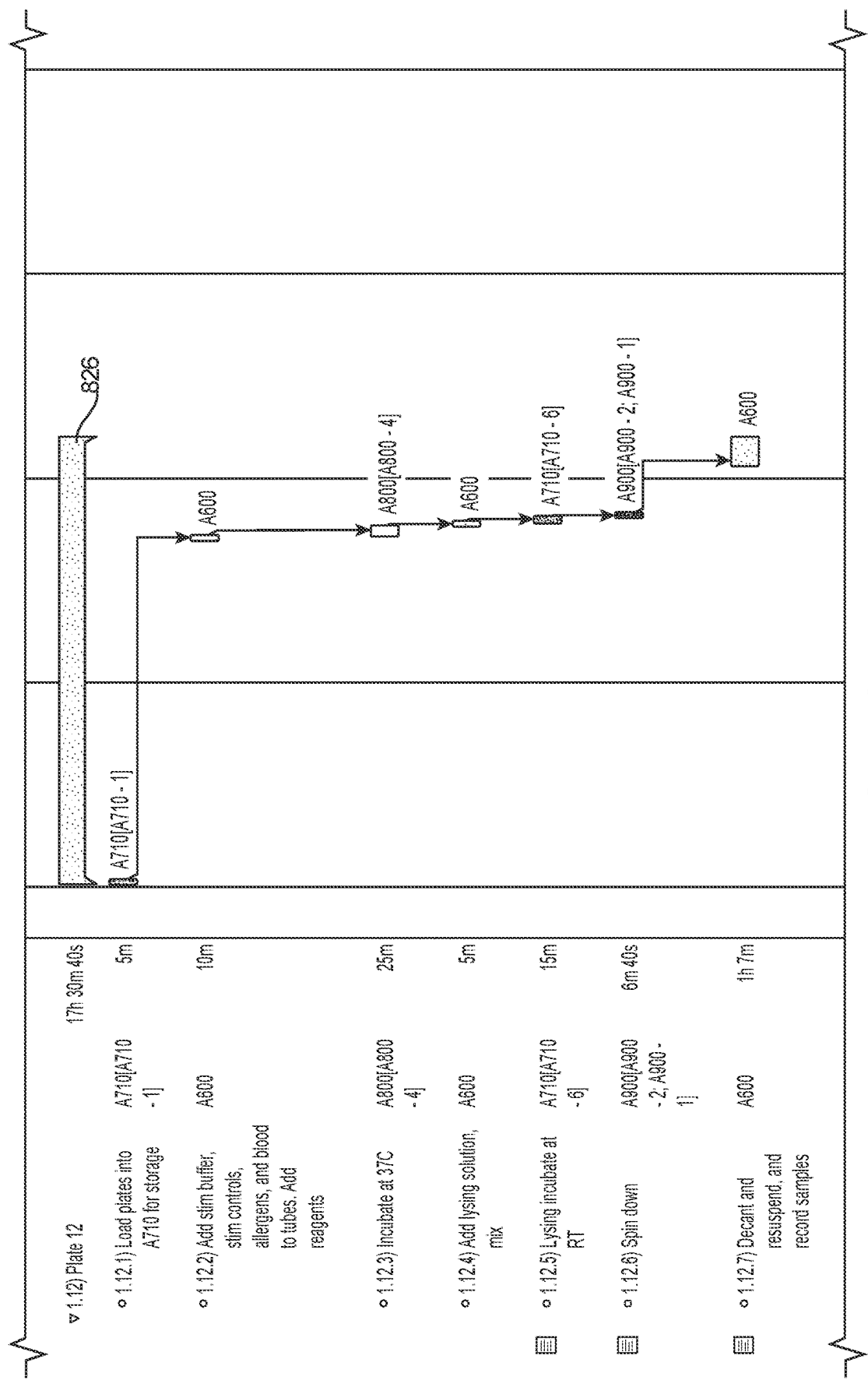
FIG. 8 (Cont. 11)

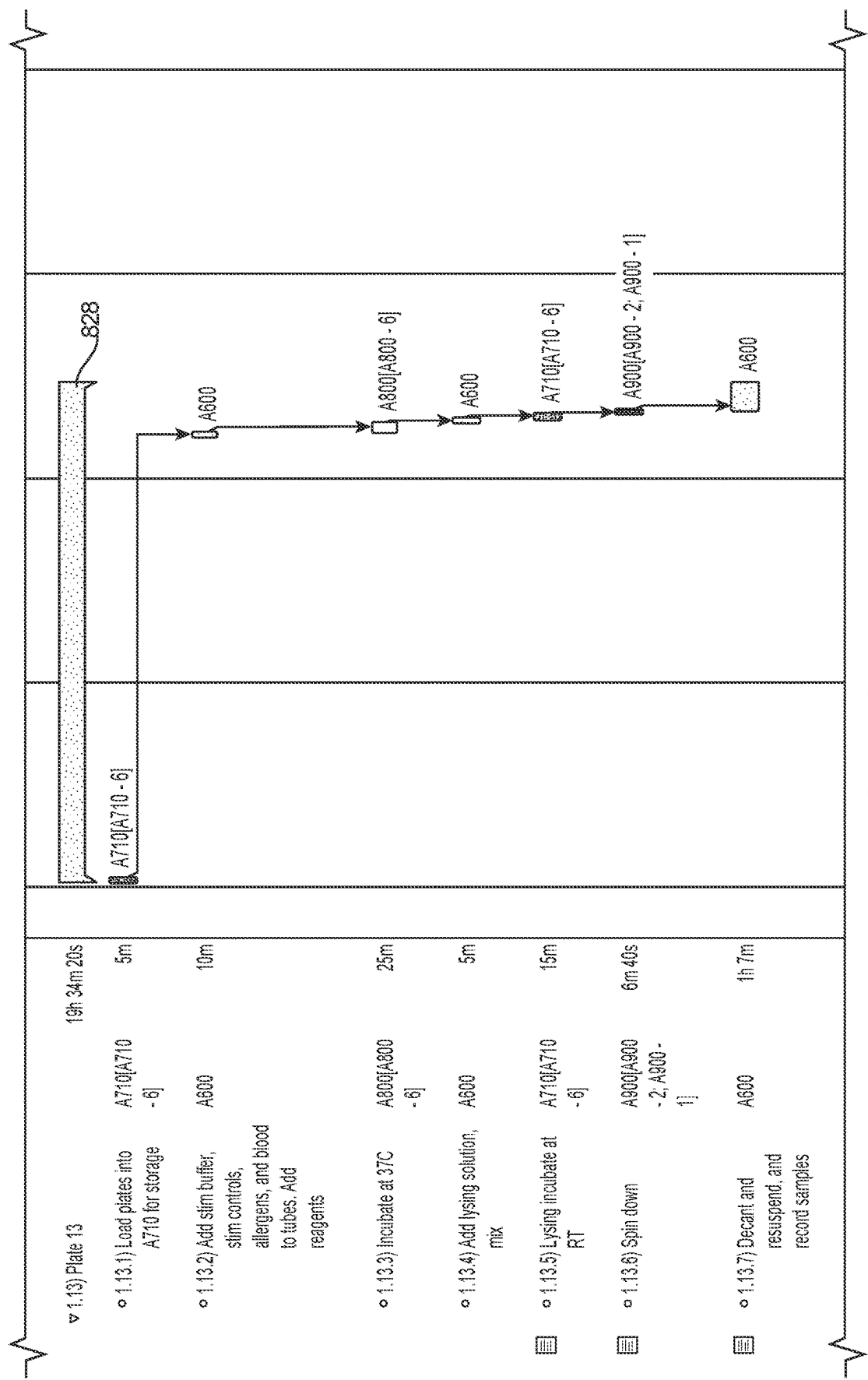
FIG. 8 (Cont. 12)

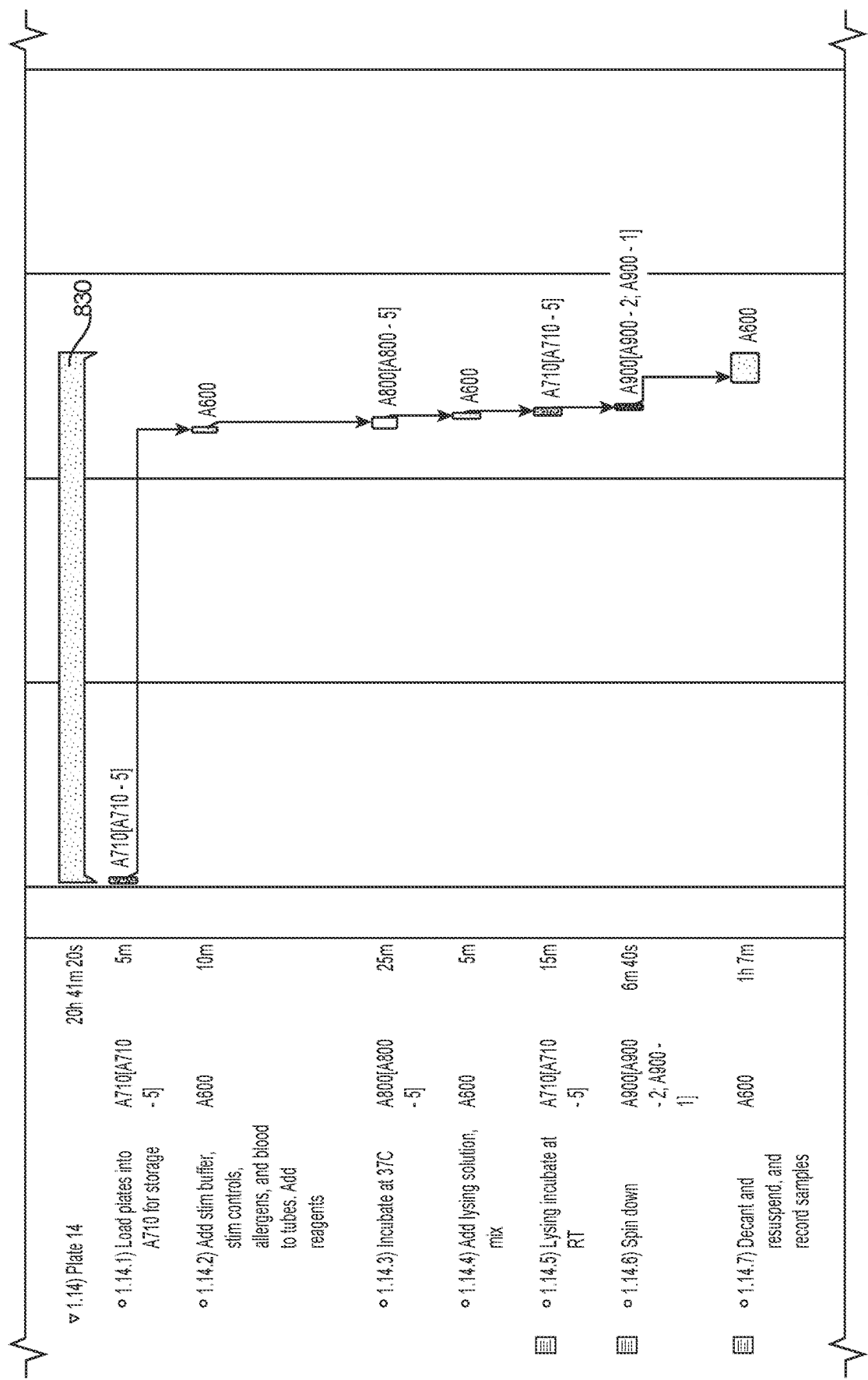
FIG. 8 (Cont. 13)

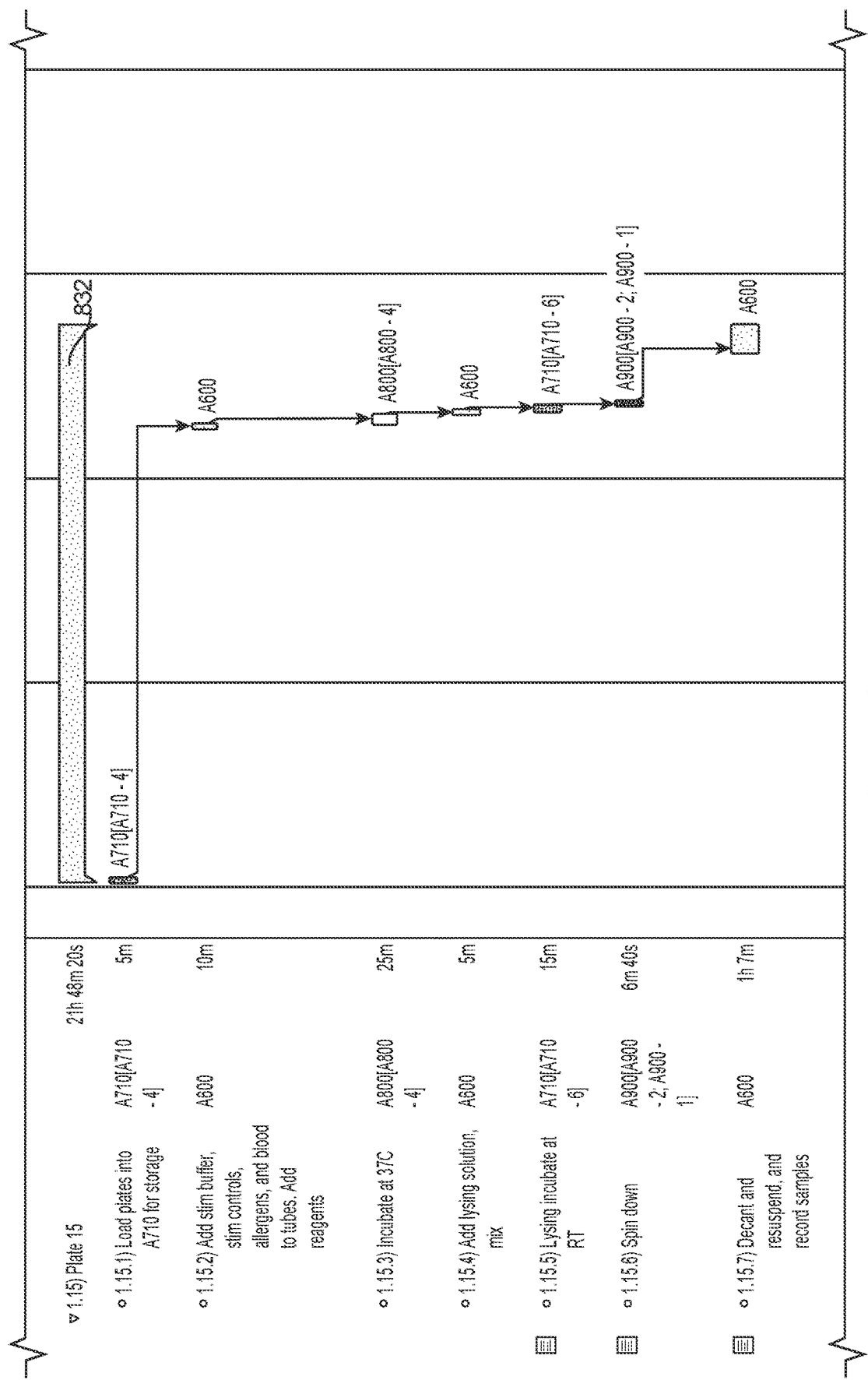
FIG. 8 (Cont. 14)

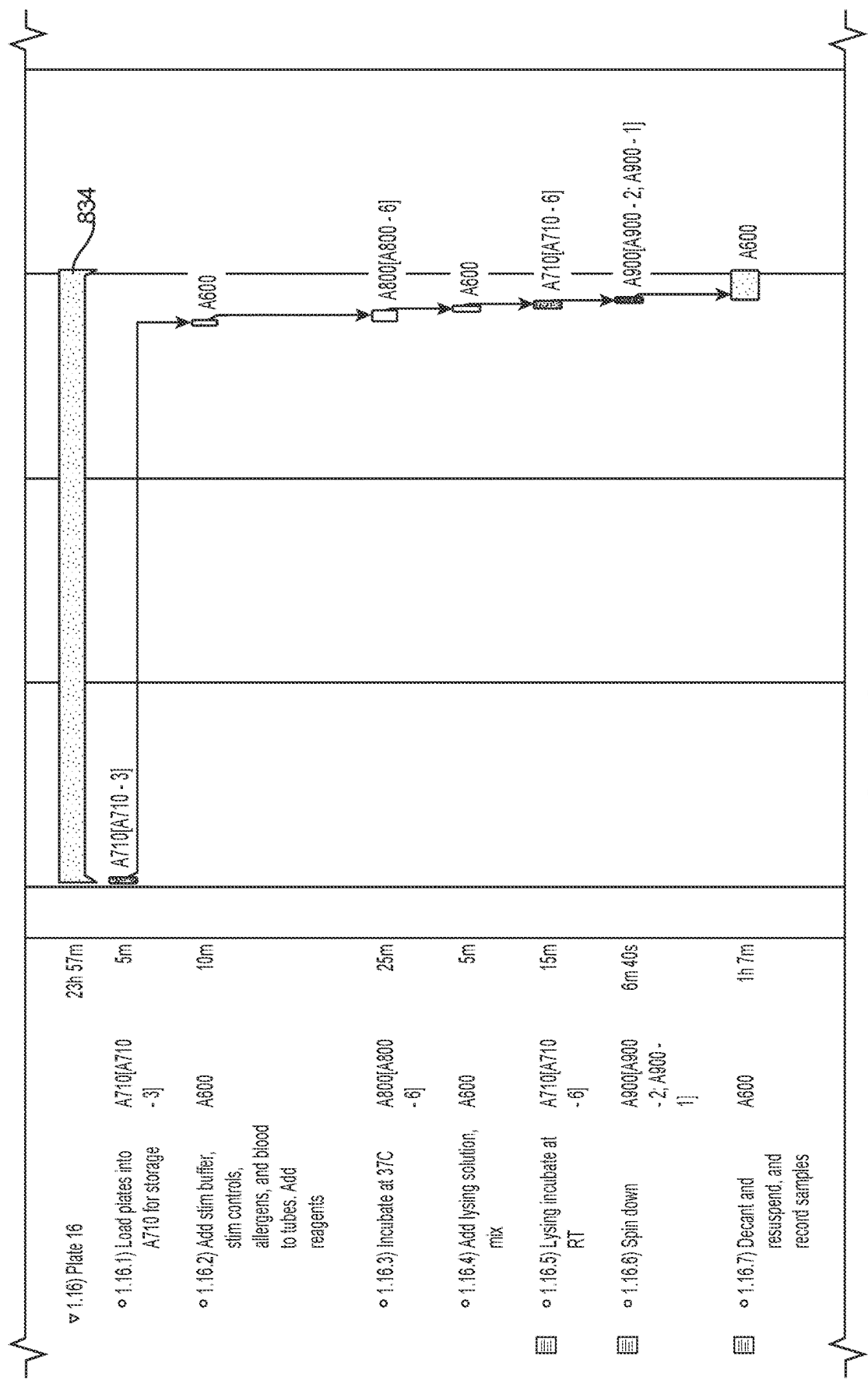
FIG. 8 (Cont. 15)

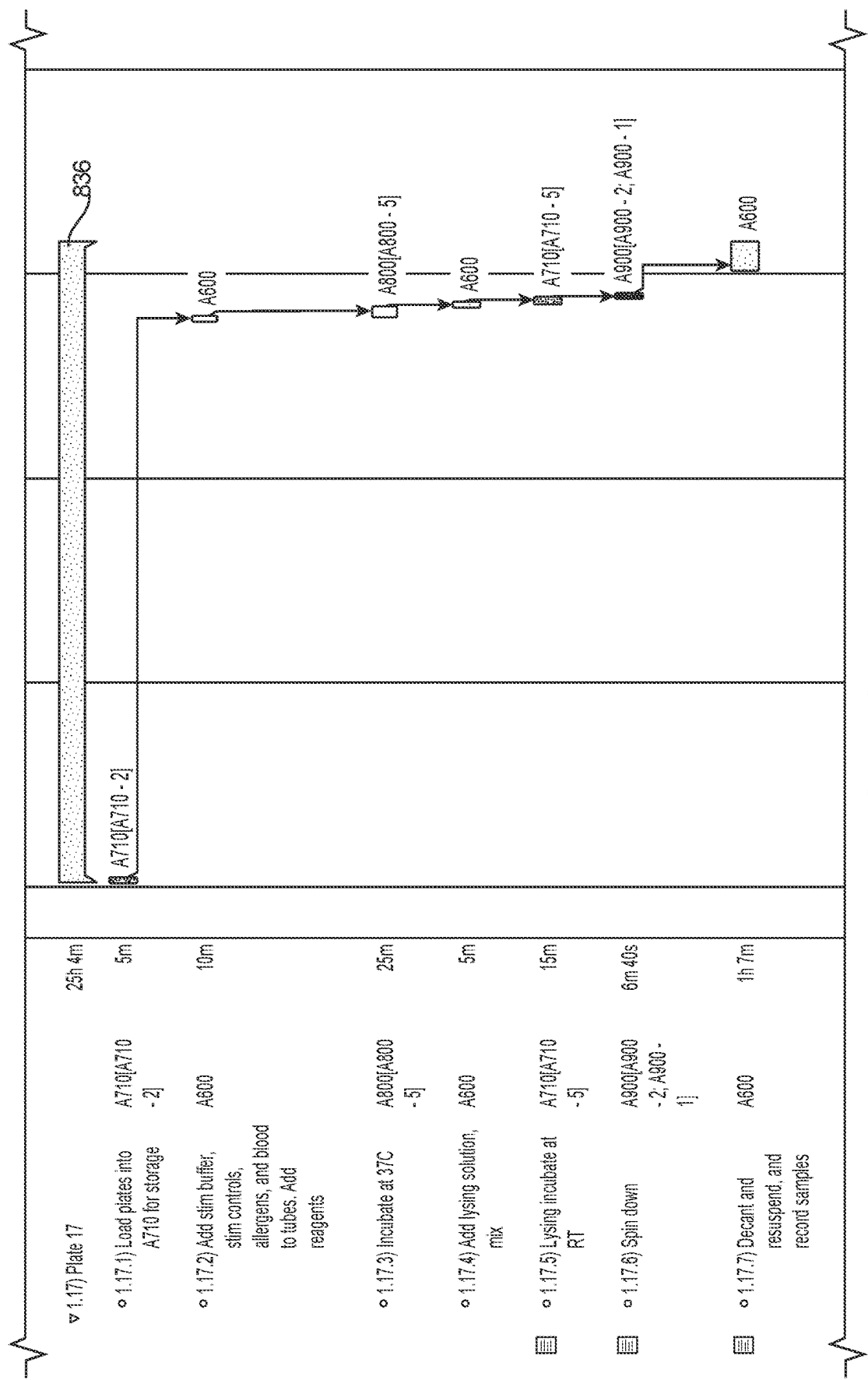
FIG. 8 (Cont. 16)

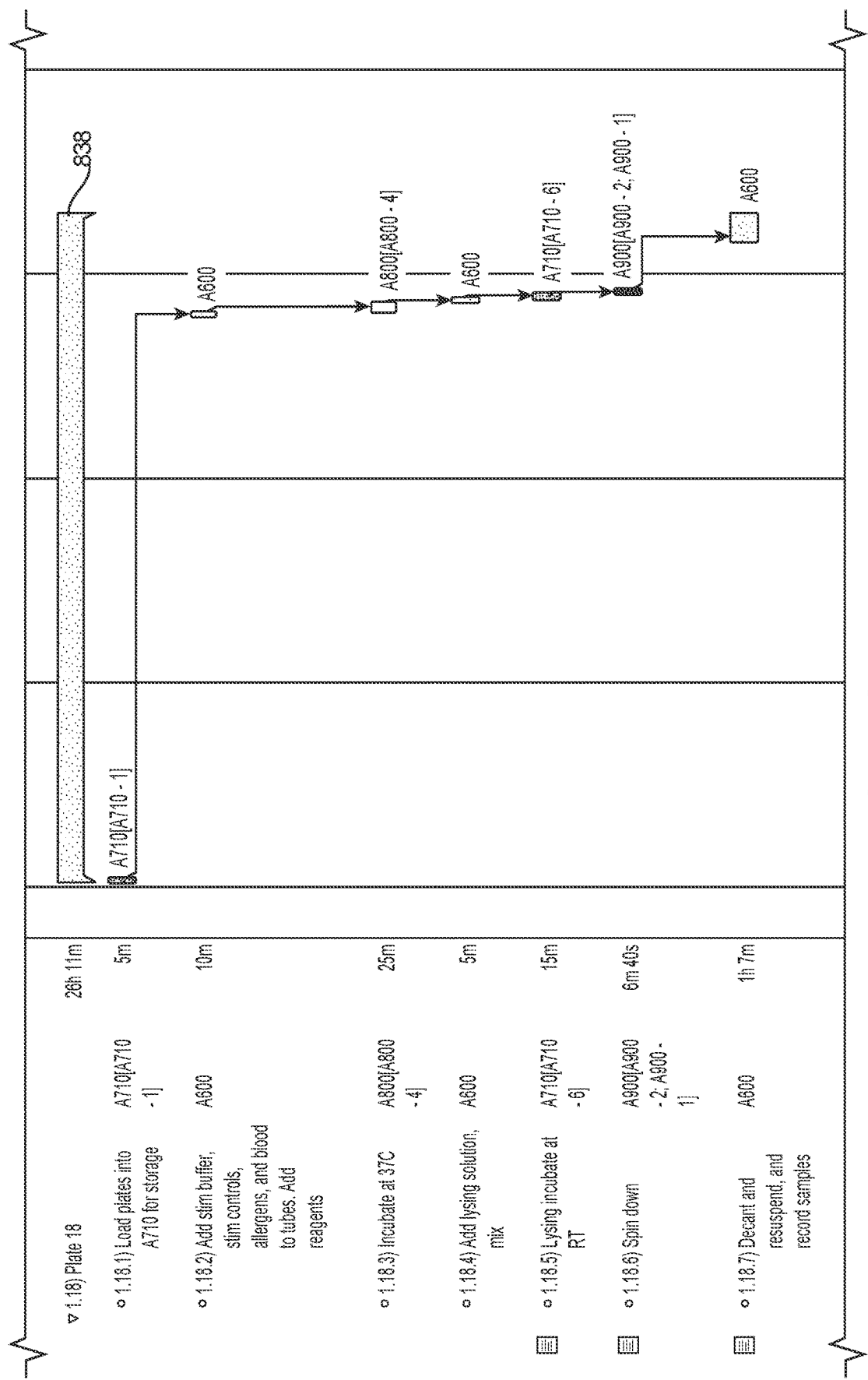
FIG. 8 (Cont. 17)

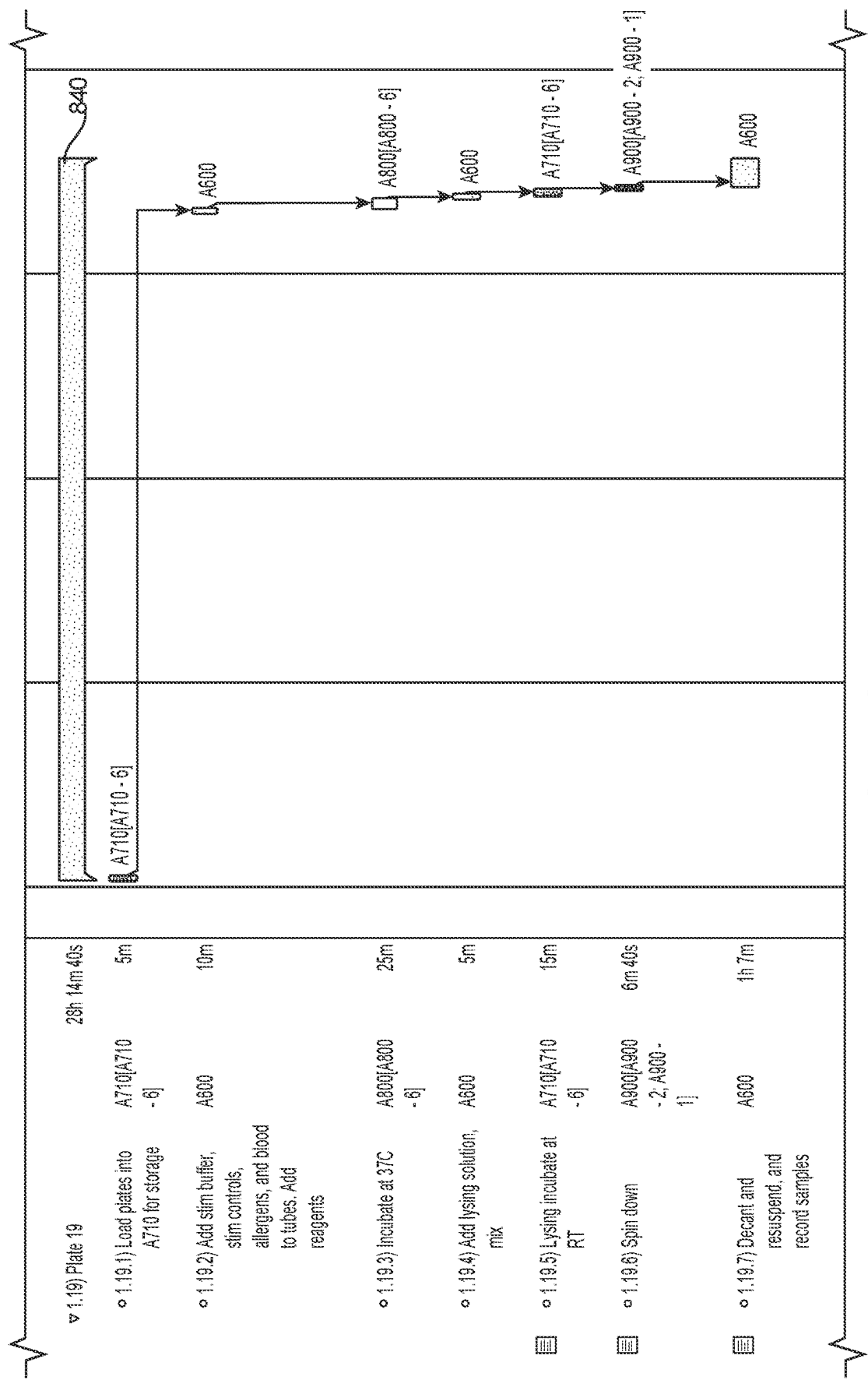
FIG. 8 (Cont. 18)

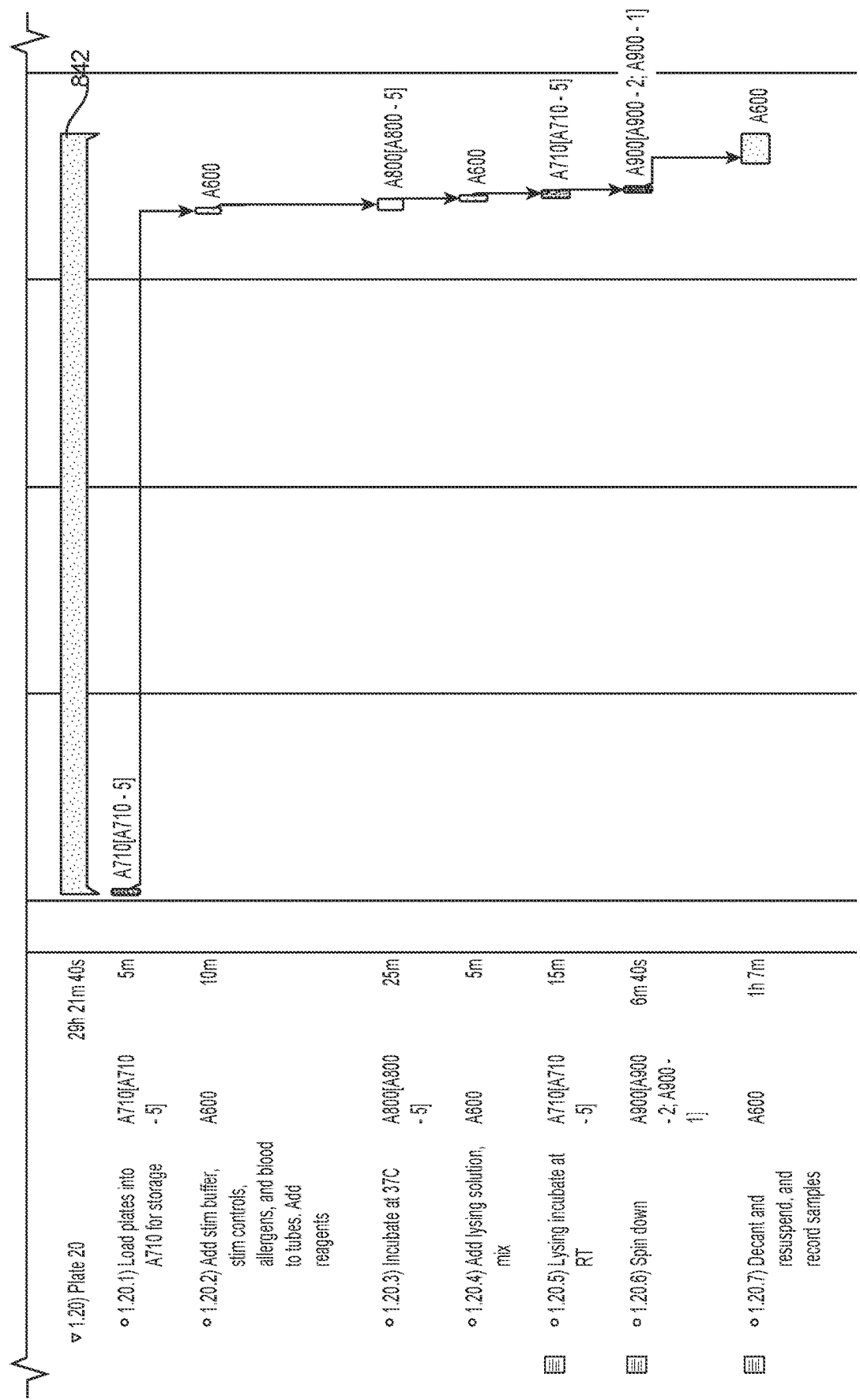
FIG. 8 (Cont. 19)

MULTIPLATE CONDUCTOR

RELATED APPLICATIONS

This application is related to U.S. application Ser. No. 15/449,833 filed on Mar. 3, 2017, entitled "Visual Protocol Designer", issued as U.S. Pat. No. 10,338,897 on Jul. 2, 2019, which is incorporated in its entirety by reference herein.

FIELD

Methods and systems disclosed herein relate generally to flow cytometry machines capable of running executable code to perform a set of instructions or procedures defined in a protocol. More specifically, a user may build a graphical model of graphical elements defining a set of instructions in a protocol without the user needing the programming knowledge to encapsulate those instructions in executable code. The graphical model may be built for executing on a single plate. The system that executes the graphical interface may generate a first execution sequence based on the graphical model and the number of plates to perform the graphical model on, and generate a second execution sequence that can be executed in a more efficient manner (e.g., faster and/or using less computing power) than the first execution sequence. The system then translates the second execution sequence into executable code, which can then be used by various flow cytometry machines to perform the protocol.

BACKGROUND

In biotechnology, flow cytometry involves the use of lasers and optics to perform cell counting, cell sorting, biomarker detection, and protein engineering. Cells are suspended in a stream of fluid and passed by an electronic detection apparatus, which can analyze the physical and chemical characteristics of the cells and/or other microscopic particles in the fluid. In some cases, fluorescent markers or labels having desired properties may be attached to target features on the cells in order to be used as a quantitative tool.

Modern flow cytometers are able to analyze several thousand particles every second in real-time in order to provide rapid quantification of parameters associated with those particles. Some flow cytometers may also be able to actively sort, separate, and isolate particles having specific properties in order to obtain particle populations of interest.

Flow cytometry is frequently used in the diagnosis of health disorders, as well as in basic research, clinical practice, and clinical trials. For instance, flow cytometry can be used to detect the presence of a specific particle (e.g., a pathogen) in a cell sample. However, in order for a flow cytometer to produce consistent and repeatable results (e.g., reliably identify that specific particle), the components of the flow cytometer may need to follow a set of rules or procedures specifically tailored to preparing samples followed by analyzing, sorting, separating, and isolating particular particles in that sample.

A set of these procedures may need to be devised, tested, and implemented into a usable form that can be followed to prepare samples to be analyzed by the flow cytometer and its peripherals in order to instruct the components of the flow cytometer to follow the set of procedures. Implementing the set of procedures may involve encapsulating the set of procedures into a programming language that can be interpreted by the flow cytometer. However, expressing the set of procedures in the programming language may be a difficult and time-consuming task, which involves having to learn the programming language to program the set of procedures. This implementation time would be in addition to the time also needed for devising and testing the set of procedures. As a result, the users of flow cytometry machines frequently do not have the time or capacity needed to create these sets of procedures and those tasks are often left to specialists.

Even when a user generates a sequence of graphical elements representing a set of procedures usable by a flow cytometry machine, the resulting sequence does not take into account a total time and/or processing power that will be required to execute the user-generated sequence.

BRIEF SUMMARY

Disclosed is a system providing a graphical user interface that allows a user to quickly build a graphical model representing the set of instructions in a protocol to be executed on a single plate without the user needing the programming knowledge to encapsulate those instructions in executable code. The graphical model may include one or more graphical elements, with each graphical element corresponding to instructions or program logic. When the user finalizes the graphical model, the system calculates an amount of time and/or computing resources required to execute the graphical model on multiple plates using a first execution sequence. The system then generates, from the first execution sequence, a second execution sequence that will require less time and/or computing resources than the first execution sequence. The system generates an executable code for the second execution sequence, and executes the code representing the second execution sequence instead of the first execution sequence using various flow cytometry machines and their corresponding peripherals. Both the first execution sequence and the second execution sequence represent the same graphical model, same protocol executed on multiple plates.

Various embodiments provide a method for generating protocols for a system of a plurality of laboratory devices. The method includes receiving, by a computing device, a graphical model of selectable graphical elements that comprise action graphical elements corresponding to program logic for causing at least one of the plurality of laboratory devices to perform an action. The graphical model represents a protocol that will be performed on one plate. The method also includes identifying a number of plates for executing the graphical model representing the protocol; and determining a first execution sequence based on the graphical model and the number of plates. The first execution sequence includes a first sequence of two or more rows for executing the protocol represented by the graphical model on a plurality of plates. Each row includes at least one action performed on one of the plurality of plates. The method also includes determining that each of the action graphical elements corresponds to an action duration for performing the corresponding action, and calculating a row duration of a row in the first execution sequence. The row duration is defined as a summation of the action durations of each action graphical element in the row. The method also includes determining a first total execution duration as a summation of the row durations for each row in the first execution sequence. The first total execution duration represents how long it takes to execute the first execution sequence representing the protocol. The method further includes generating a second execution sequence based on the first execution sequence, the graphical model and the number of plates. The second execution sequence corresponds to program logic for causing the plurality of laboratory devices to perform the actions corresponding to the selectable graphical elements of the graphical model in a second total execution duration. The second execution sequence comprises a second sequence of two or more rows of the first execution sequence for executing the protocol represented by the graphical model on the plurality of plates. The second total execution duration represents how long it takes to execute the second execution sequence representing the protocol. The second total execution duration is less than the first total execution duration. The method also includes executing the second execution sequence instead of the first execution sequence.

Embodiments further provide a system including one or more processors, and a computer-readable medium storing instructions that, when executed by the one or more processors, cause the one or more processors to perform the above-described method. The system may also include one or more flow cytometry machine components. The one or more executable instructions are usable by the one or more components of the flow cytometry machine.

These various embodiments are described in detail in conjunction with the following drawings in the paragraphs below.

DETAILED DESCRIPTION

Figure 1:
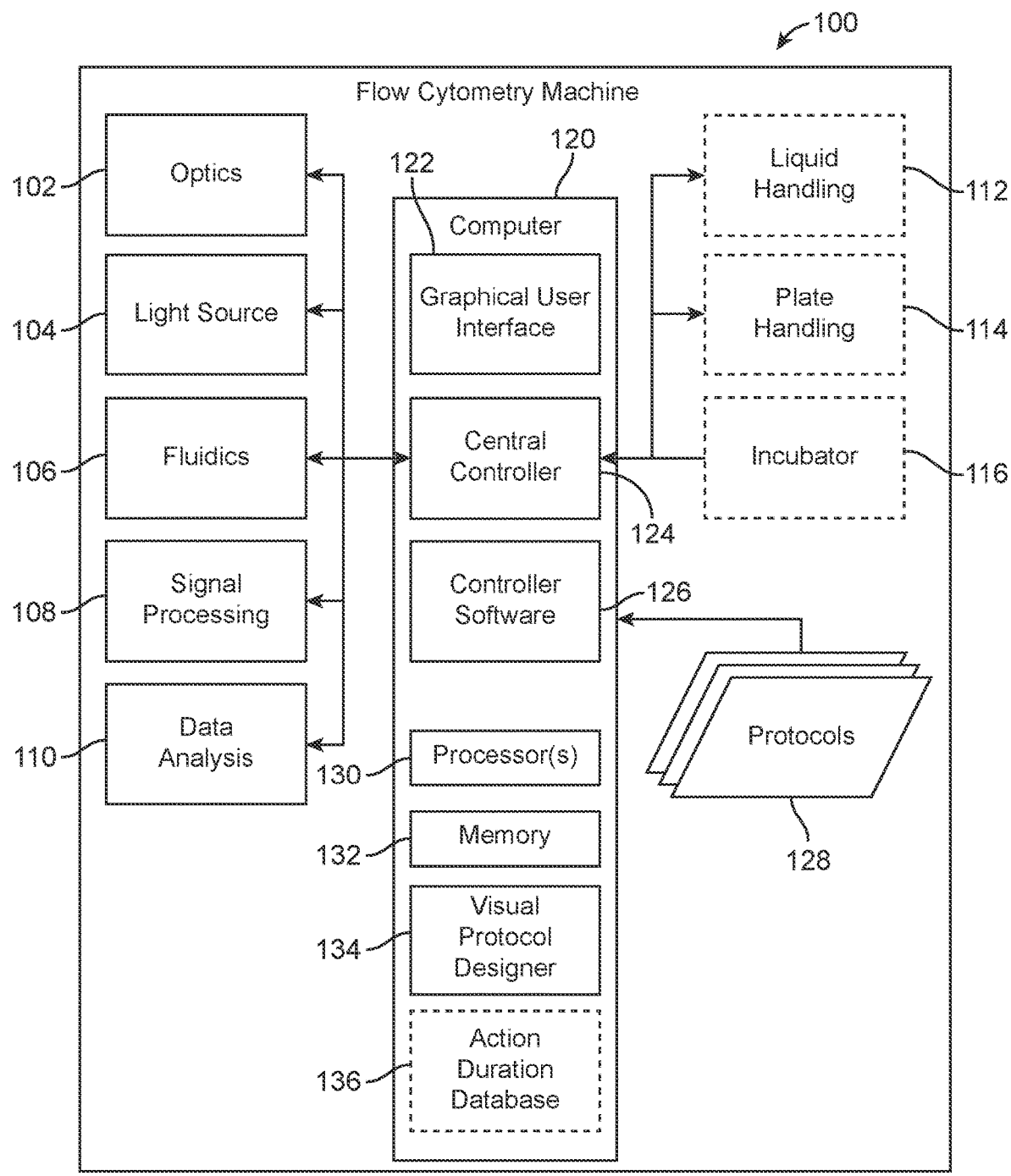
FIG. 1 is a system diagram of a flow cytometry machine that can be managed through the use of a protocol, according to various embodiments.

In the following description, for the purposes of explanation, specific details are set forth in order to provide a thorough understanding of embodiments. However, it will be apparent that various embodiments may be practiced without these specific details. The figures and description are not intended to be restrictive.

INTRODUCTION

Modern flow cytometers are able to analyze several thousand particles every second in real-time in order to provide an automated quantification of parameters associated with those particles. Some flow cytometers may also be able to actively sort, separate, and isolate particles having specific properties in order to obtain particle populations of interest. In order to perform these tasks, the flow cytometers are typically outfitted with common components that include a flow cell, a measuring system, a light detector, an analog to digital system that converts dye-specific fluorescence signals into digital signals processable by a computer, an amplification system, and a computer for analysis of the signals.

The flow cytometer may be configured for detecting, sorting, separating, and isolating particular particles based on instructions provided in a set of rules or procedures that are specifically tailored to that particular particle. This set of rules or procedures may be referred to as a "protocol". For instance, there may be a specific protocol used by flow cytometer to detect a specific kind of bacteria that could be present in a sample containing the cells of a patient. These protocols can be developed by a knowledgeable user of the flow cytometry device (such as a specialist or technician) and then widely disseminated to other flow cytometry users. For instance, the protocols can be uploaded to a server or a cloud computing network where they can be downloaded by other flow cytometry users. The other flow cytometry users can run the protocols to easily detect or quantify the desired particles without "looking under the hood" and knowing the particulars of the protocol.

In some embodiments, the flow cytometer may be configured to follow instructions laid out in programming code. In some of such embodiments, the code may be in a programming language that is mainly applicable towards instructing flow cytometry devices. A visual protocol designer, which is a tool usable for developing protocols for use in flow cytometry applications, may include graphical user interfaces, such as a drag-and-drop based interface, that allow users to build and design unique and complex protocols for flow cytometry applications without programming knowledge. Users of the visual protocol designer may build multi-line, sequential protocols with conditional operations that can be used to instruct the flow cytometry device and its peripherals to prepare and analyze samples based on various criteria and parameters specified by the user.

An exemplary system described herein may include the visual protocol designer. A user may generate a first sequence including multiple rows, each formed of a plurality of execution blocks. The system may further include a processor that is configured to calculate an execution duration of the first sequence designed by a user, and generate a second sequence (from the first sequence) that has an execution duration that is less than the execution duration of the sequence designed by the user. The system may execute the second sequence instead of the first sequence, thereby completing the execution in less time, in a more efficient manner, and/or using less computing power and resources than executing the first sequence. In some embodiments, the system may provide a graphical interface displaying an execution plan (e.g., scheduling) of the user-generated first sequence and/or system-generated second sequence with the predicted execution times. In the second sequence, two or more of the execution blocks may be executed simultaneously. In some embodiments, execution of the second sequence may utilize the computing resources in such a way that the second sequence is executed in less time compared to the first sequence.

In some embodiments, the system may allow the user to provide input in generating the second sequence. For example, the user may mark that a block must be executed immediately after the previous (e.g., a time critical process), or the user may mark a conditional block as a "default" case (e.g., that will be scheduled later). For example, the user can specify time sensitive steps which need to meet a specific range (e.g., incubation for lysing buffer which can damage the sample if the incubation time exceeds a limit). In these cases, the system may be configured to give priority to the user-identified steps even though the throughput may be reduced. Even when the second sequence is generated with user input, the resulting sequence may be executed in less time and/or using less computing resources or power than the user-generated first sequence.

Upon calculating the execution time for each block, the system may display the execution time of the blocks in the user-generated first sequence, and allow the user to benchmark one or more of the blocks, or continue with drafting. In some embodiments, the system may generate and display a graphical representation showing what plate is going through what instrument in what sequence. The graphical representation may illustrate the execution timeline for the user-generated first sequence and the system-generated second sequence, for example, for comparison purposes.

When the user generates the first sequence, the user may also specify how many plate source-of-truth iterations of the first sequence is to be executed. According to some embodiments, the user may run an actual plate and the system may record the time for each step. In other embodiments, the system may retrieve the run time of each step from a database (e.g., a built-in library). If the user runs an actual plate, the time for each step may be recorded in the database. Thus, the database maybe a dynamic database that is being incremented as additional users provide new execution time data. The system may be configured to perform resource leveling to take advantage of idle time of each module and maximize throughput.

Definitions

In order to facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Protocol: A broad term for any set of instructions, rules, or procedures. The various components of a flow cytometry machine may be controllable to perform a protocol. A protocol may be designed to be followed by a flow cytometry machine in order to produce repeatable results. A protocol may be configured to enable a flow cytometry machine to detect, sort, separate, and/or isolate a particular particle. The set of instructions in a protocol may be encapsulated in the form of executable code, which can be executed by the controller of a flow cytometry machine to automatically carry out the instructions of the protocol. The protocol may also be partially encapsulated in the form of a graphical representation, in which the set of instructions is conveyed through a set of graphical elements that correspond to the instructions and are arranged in a particular sequence.

Translation: The act of converting the graphical representation of a protocol into the form of executable code, or vice versa. The translation may be performed by the system, which may include any component of a flow cytometry machine and/or one or more separate computing devices.

Visual Protocol Designer: A tool that includes one or more user interfaces that allow a user to create a graphical representation of a protocol (e.g. a graphical model representing the protocol), which may include one or more graphical elements that are placed in an arrangement. The visual protocol designer may allow a user to select the graphical elements to add to the graphical representation, as well as manipulate those selected graphical elements into a desired arrangement.

Graphical Element: A broad term for any image or symbol that can be selected and manipulated by a user in the visual protocol designer. A graphical element may be associated with program logic that can be used to carry out one or more instructions of a protocol. The terms "graphical element", "block", or "icon" may be used interchangeably and/or synonymously in the present disclosure. An exemplary graphical element may include an action graphical element corresponding to program logic for causing a laboratory device to perform an action.

Parameter: A broad term for a user-configurable modifier associated with a graphical element that may modify the program logic associated with that graphical element. For example, a graphical element for "wait" may be associated with a time parameter that defines a wait time. If the program logic for that graphical element is to instruct a component to take a pause, the time attached to that instruction my depend on the time parameter set by the user. Each graphical element may be associated with any number of parameters, which make up a set of parameters associated with that graphical element. The terms "parameter", "property", or "option" may be used interchangeably and/or synonymously in the present disclosure.

Tool Palette: A tool palette is a graphical interface element in the visual protocol designer that displays one or more graphical elements that may be selected by the user and added to the graphical representation of a protocol. The terms "tool palette", "toolbox", and "bank" may be used interchangeably and/or synonymously in the present disclosure.

Workbench: A workbench is a graphical interface element in the visual protocol designer that displays one or more selected graphical elements that may be ordered into an arrangement for the graphical representation of a protocol. A user may be able to select graphical elements by moving the graphical element from the tool palette to the workbench. The terms "workbench" and "workspace" may be used interchangeably and/or synonymously in the present disclosure.

Plate: A plate is a container that is used for testing, holding and/or processing samples. The plates as used herein may include one or more multiple depressions or wells placed side by side in a rectangular matrix. Exemplary plates may include, among other types, immunoassay plates, microtiter plates, cytometry plates, PCR plates or other types of laboratory plates.

Exemplary Systems

Provided below is a description of an exemplary system in which embodiments provided herein may be utilized. Although some of the components may be depicted as separate, in some instances, one or more of the components may be combined into a single device or location. Similarly, although certain functionality may be described as being performed by a single component within the system, the functionality may in some instances be performed by multiple components.

Referring now to FIG. 1, various components of a flow cytometry machine are illustrated. The flow cytometry machine can be managed through the use of a protocol, in accordance with example embodiments of this application.

As shown in FIG. 1, a flow cytometry machine 100 may include an optics component 102, a light source component 104, a fluidics component 106, a signal processing module 108, and a data analysis module 110, among other components. The flow cytometry machine 100 may also have optional components, such as a liquid handling component 112, a plate handling component 114, and an incubator 116. These components may be communicatively coupled to a central controller 124 of a computer 120 of the flow cytometry machine 100. The central controller 124 may control the various components of the flow cytometry machine 100. There may be controller software 126 that runs on computer 120 and it may be executed by the central controller 124. The controller software 126 may receive input from one or more protocols 128, which provide a set of procedures or a workflow for the flow cytometry machine 100 to perform. Accordingly, the central controller 124 and the controller software 126 may be used in combined to execute the instructions in the one or more protocols 128 in order to control the various components of the flow cytometry machine 100.

Embodiments further provide a graphical user interface 122 displayed on the computer 120, which allows a user to interact with the flow cytometry machine 100. For example, the user may be able to use the graphical user interface 122 to select and configure the one or more protocols 128 or to view the analysis results produced by the flow cytometry machine 100. In addition, the graphical user interface 122 may display a user-generated graphical model representing a protocol to be performed on a single plate. The graphical model may comprise action graphical elements corresponding to program logic for causing one or more laboratory devices to perform an action. In some embodiments, the plurality of laboratory devices may include one or more of a cytometer, a plate moving device, an incubator, or a centrifuge.

The computer 120 may generate, from the graphical model, a first execution sequence for executing the protocol represented by the graphical model on multiple plates. The first execution sequence may include two or more rows. The computer 120 may determine a total execution time for the first execution sequence. The computer 120 may then generate a second execution sequence based on the graphical model, the number of plates for executing the graphical model and the first execution sequence. The second execution sequence corresponds to program logic for causing the plurality of laboratory devices to perform the same actions of the first execution sequence (e.g., actions corresponding to each of the graphical elements of the graphical model) on multiple plates in a second total sequence duration that is less than a first total sequence duration of the first execution sequence. According to various embodiments, the first execution sequence or second execution sequence may be displayed on the GUI 122 along with a graphical representation of the first or second total sequence duration, respectively, and graphical representations of the action durations corresponding to each action graphical element of each iteration of the one or more rows of the first or second execution sequence. In some embodiments, the second execution sequence may correspond to program logic for causing the plurality of laboratory devices to perform the same actions of the first execution sequence (e.g., actions corresponding to each of the graphical elements of the graphical model) using less computing power/resources than the first execution sequence.

For example, if the first execution sequence includes rows ordered according to a first order, the second execution sequence may also include the same rows ordered according to a second order. The first execution sequence may include a first row and a second row ordered according to a first order. The second execution sequence may include one or more rows ordered according to a second order. For example, the second execution sequence may merely switch the order of the first row and the second row, while keeping the actions performed in each row the same as in the first execution sequence. Alternatively, the second execution sequence may include a single row of actions ordered according to a second order. Yet according to another embodiment, the second execution sequence may include two or more rows (that were represented in the first and second rows in the first execution sequence) ordered according to a second order.

In some embodiments, the fluidics component 106 may be referred to as a flow cell. If the flow cytometry machine 100 is tasked with analyzing a sample of cells suspended in fluid, the flow cell may carry and align the cells in the sample so that they pass single file through a light beam (such as the light source component 104) for sensing. In other words, the cells may be placed into a single-file line in order to facilitate counting and analysis of the cells.

In some embodiments, the light source component 104 may be any component capable of producing light signals. For example, in some embodiments, the light source component 104 may be a laser, while in other embodiments, the light source component 104 may be a lamp or LED. The optics component 102 may be configured to focus the light signals for detection, which are amplified and processed by the signal processing module 108. The data analysis module 110 then performs analysis on the processed signals in order to produce quantified metrics that can be understood by a user. In some embodiments, the functions of the signal processing module 108 and/or the data analysis module 110 may be performed by one or more components of the computer 120.

As described above, in some embodiments, the flow cytometry machine 100 may optionally include the liquid handling component 112, the plate handling component 114, and the incubator 116, which serve to expand the functionality and operations that can be performed by the flow cytometry machine 100. Examples of such components include the Stratedigm A600 High Throughput Auto Sampler (HTAS), the Stratedigm A710 High Throughput Hotel (HTH), and the Stratedigm A800 Cell Incubator (CI). These components can be used with a Stratedigm S1000Exi/SE520EXi flow cytometer for added functionality and to implement more of the protocol instructions described herein. For example, these components may allow the flow cytometry machine 100 to automatically perform analysis using samples that are stored in the wells of a plate, which can be taken out of the incubator at a specified time.

The computer 120 of the flow cytometry machine 100 may include one more processors 130, and a memory (e.g., computer-readable medium) 132. In some embodiments, the computer 120 may also include a database 136 (e.g., action durations database). Alternatively, the database 136 may be external to, and accessible by, the computer 120.

As used herein, a "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

As used herein, a "memory" may be any suitable device or devices that can store electronic data. A suitable memory may comprise a non-transitory computer-readable medium that stores instructions that can be executed by one or more processors to implement a desired method. Examples of memories may comprise one or more memory chips, disk drives, etc. Such memories may operate using any suitable electrical, optical, and/or magnetic mode of operation.

According to various embodiments, a user may use a flow cytometry machine 100 that configured to provide a visual protocol designer 134. The user can use the visual protocol designer 134 to create a graphical representation of a protocol (e.g. a graphical model representing a protocol). In some embodiments, the system may translate the graphical representation of the protocol into executable code for the protocol.

In some embodiments, the visual protocol designer 134 may be a tool that includes one or more user interfaces that allow the first user to build the graphical representation of a protocol, which will be converted into executable code for the protocol that is usable to control the various components of a flow cytometry machine. Thus, the user can effectively create a program to instruct a flow cytometry machine to perform a protocol. Each of the selected graphical elements may correspond to an aspect of the desired, underlying protocol. For instance, some of the selected graphical elements (e.g. action graphical elements) may be associated with program logic or instructions for a step, task, or action to be performed in the protocol. Some selected graphical elements may be associated with an attribute or parameter for the protocol. Some selected graphical elements may be associated with rules to be followed in the protocol, such as conditional logic for selecting the appropriate step or task to be performed in the protocol. In some embodiments, the user may continue to select graphical elements corresponding to the different aspects of the desired protocol until the entire protocol has been represented among the set of selected graphical elements.

In some embodiments, the flow cytometry machine 100 may send the protocol (either as a graphical model, execution sequence or executable code form) to a server via the Internet. The server may further convert the protocol into executable code form if the protocol is not already in executable code form. The flow cytometry machine 100 may retrieve the executable code from the server. Alternatively, the flow cytometry machine 100 may use the local computational resources (e.g., the computer 120) to convert the protocol into executable code. The flow cytometry machine 100 may run the executable code and perform the protocol without the user having to input any instructions for the protocol.

Figure 2:
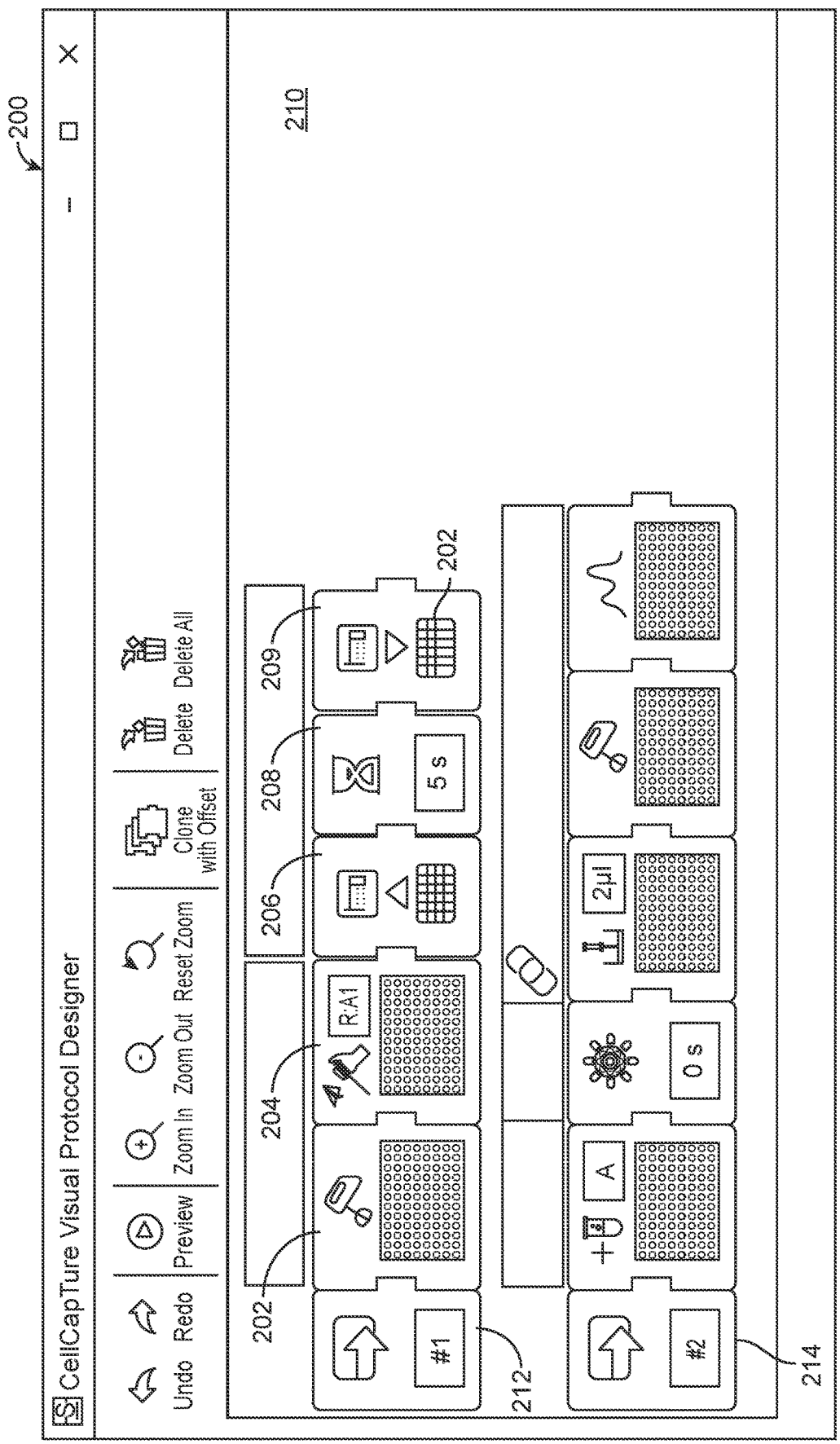
FIG. 2 illustrates an exemplary graphical representation of a protocol, according to various embodiments.

FIG. 2 illustrates an exemplary graphical representation of a protocol, in accordance with some embodiments of the disclosure. A user may create a graphical model 210 representing a protocol using a visual protocol designer 200. The creation of this graphical model 210 may involve multiple rows 212, 214, each row including one or more blocks (e.g., execution blocks or action graphical elements) or tasks. For example, row 1 includes blocks 202, 204, 206, 208, 209.

Using the visual protocol designer 200, the user may set various parameters associated with each of the graphical elements that were selected in the visual protocol designer. In some embodiments, each graphical element may be associated with a set of parameters, which collectively affect how the instructions associated with the graphical element is carried out. For example, one particular selected graphical element 208 may correspond to a pause or a wait time in the workflow of the protocol during which the components of the flow cytometry machine are instructed to wait for a specified time period before performing another operation in the protocol. Accordingly, the duration of that specified time period could be one of the parameters associated with that particular graphical element that affects how the wait instruction is performed when the protocol is executed.

According to various embodiments, the user may customize the graphical representation. For example, the user may name the execution blocks, split an execution block into multiple execution blocks, merge multiple execution blocks into a single execution block, mark that a first block is to be executed immediately after a second block (e.g., for time critical processes), or the user may mark a block as a "default" block for conditional blocks.

Once the user finalizes the graphical model 210, the computer 120 may generate an execution sequence, and retrieve execution times for the blocks of the graphical model, as organized by the user. An execution plan (e.g., execution flow) may be displayed to the user on the graphical user interface 122. Once the user approves the graphical representation of the protocol 210, the visual protocol designer 200, for example in combination with the one or more processors 130 of the computer 120 illustrated in FIG. 1, generates an executable code representing the protocol. That is, the computer 120 may translate the graphical representation of the protocol 210 into executable code for the protocol (e.g., a form of the protocol that the controller or controller software of the flow cytometry machine can interpret in order to implement the protocol).

In some embodiments, this translation may be performed by a component of a flow cytometry machine itself, such as by the controller, controller software, or the software providing the graphical user interface of the visual protocol designer. For example, a user could design a protocol and create a graphical model of the protocol on the computer of the flow cytometry machine, which would then translate the graphical representation of the protocol into executable code.

Alternatively, in some other embodiments, the translation may be performed by a remote server. The flow cytometry machine can send the graphical representation of the protocol or a file that preserves the graphical representation of the protocol, including how the various graphical elements are arranged. The remote server can then take the graphical model of the protocol and translate it into executable code.

Figure 3:
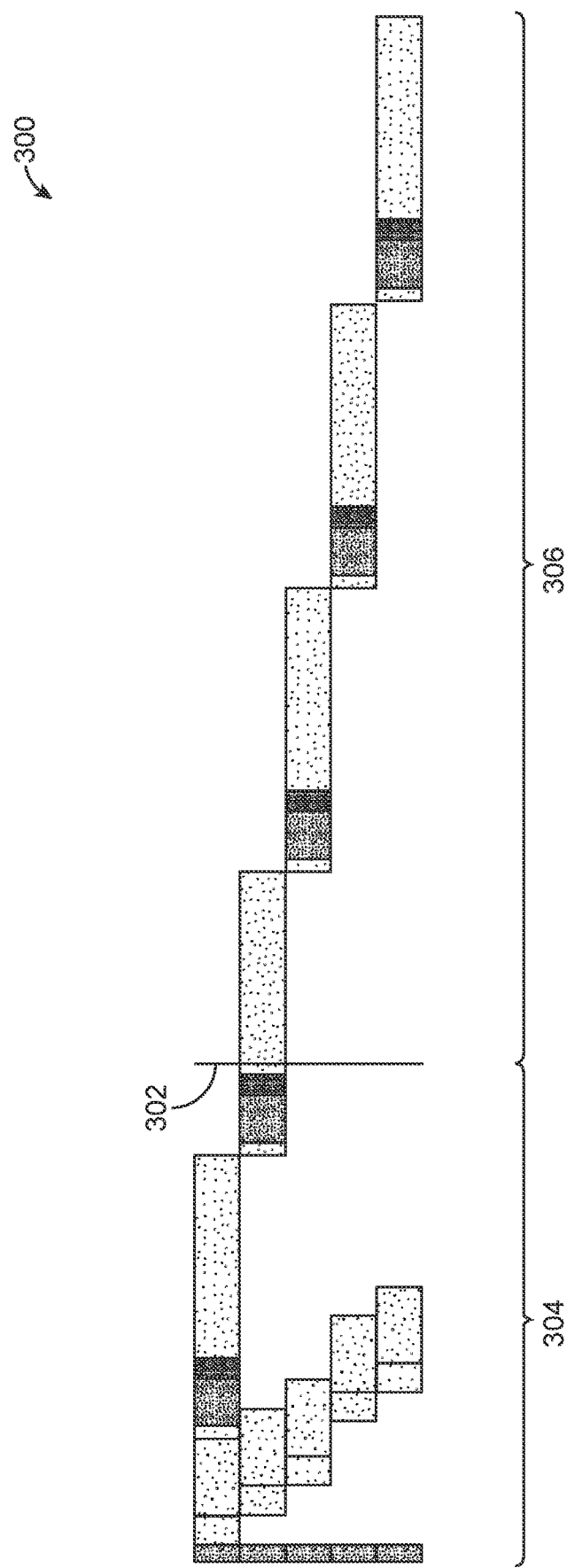
FIG. 3 illustrates an example embodiment of the user interface displaying an execution plan/schedule with estimated time left, according to various embodiments.

Once translated into executable code, the protocol may be executed by the computer. During the execution of the protocol, the execution plan (e.g., execution sequence) may be displayed on the graphical user interface 122 illustrating the estimated time left. FIG. 3 illustrates an exemplary execution sequence 300, according to various embodiments. The current time may be illustrated using a graphical element 302. Therefore, the execution sequence 300 may show the elapsed execution time 304 and remaining estimated execution time 306 on the graphical user interface 122. According to various embodiments, the exemplary execution sequence 300 may be a dynamic representation which is updated as blocks are rescheduled and/or execute in a different time than the estimated time (e.g., the block completes execution is less or more time than the estimated time for that block).

Figure 4:
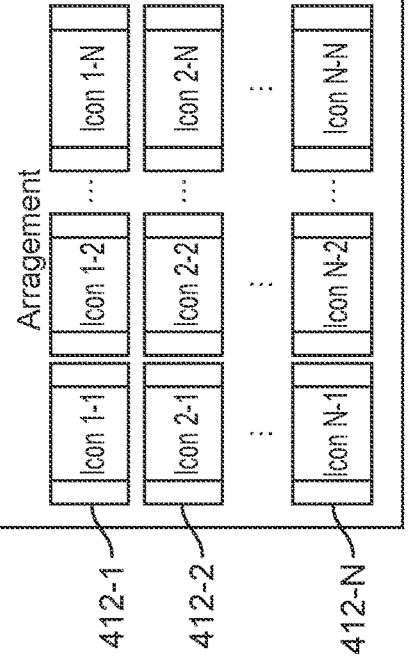
FIG. 4 illustrates how a graphical representation of a protocol may be translate into executable code, according to various embodiments.

FIG. 4 illustrates how a graphical representation of a protocol may be translated into executable code, in accordance with an example embodiment.

As provided above, the graphical model 410 of a protocol may have an arrangement of blocks or icons. In some embodiments, the arrangement is displayed to the user through a user interface and the user may be able to change the arrangement by manipulating the blocks displayed in the user interface. In some embodiments, the graphical model 410 of the protocol may be translated into executable code 420 for the protocol, which may take into consideration the specific icons in the graphical model 410, the sets of parameters associated with each of those icons, and the arrangement of those icons in the graphical model 410 of the protocol.

In some embodiments, the arrangement in the graphical model 410 of a protocol may include one or more rows of blocks or icons, such as a first row 412-1, a second row 412-2, and a nth row 412-N. In some embodiments, the instructions associated with each of the icons in a row may be interpreted sequentially from left to right during the translation process. For example, the first row 412-1 is shown including, from left to right, icon 1-1, icon 1-2, all the way up to icon 1-N. During the translation process for the first row 412-1, the instructions and set of parameters associated with icon 1-1 may be considered first and mapped into executable code 420 for the protocol. Then the instructions and set of parameters associated with icon 1-2 may be added to the executable code, and so forth until the instructions and set of parameters associated with icon 1-N have been added to the executable code.

In some embodiments, the rows may be considered in the translation process in a manner such that the instructions corresponding to each of the rows of the arrangement may be performed sequentially. For example, the executable code 420 for the protocol may be structured so that after all the instructions corresponding to the icons in row 412-1 have been performed by the flow cytometry machine, the instructions corresponding to the icons in row 412-2 are performed (e.g., the instructions for icon 2-1, then for icon 2-2, until the instructions for icon 2-N have been performed). Thus, the translation may be analogous to reading the words on a page of the book, with rows mapped sequentially (with the icons in each row mapped left-to-right) until the nth row 412-N has been mapped into executable code.

In other embodiments, the rows may be considered in the translation process in a manner such that the instructions corresponding to each of the rows of the arrangement may be performed in parallel. For example, the executable code 420 for the protocol may be structured so that the instructions corresponding to the icons in the first row 412-1 are performed as before (e.g., left to right). However, while the instructions for the first row 412-1 are being performed, the instructions for the second row 412-2 are also performed in parallel if possible.

In yet other embodiments, the system may recommend rearranging the execution of the graphical model 410 that may result in a faster total execution time of the same protocol represented by the graphical model 410. The generation of the second execution sequence based on the first execution sequence and the graphical model is discussed below in greater detail.

Each icon on the graphical model 410 may correspond to program logic or instructions for the flow cytometry machine, and the translation process may be used to convert each icon into its corresponding program logic (further modified by the position of that icon in the arrangement and its associated set of parameters), which is then added to the executable code 420. The executable code 420 for the protocol will be different as a result of the translation depending on the specific graphical model 410, which will change based on what icons the user chooses to add to the arrangement, how the user arranges those icons, and what sets of parameters are associated with each of those icons, or whether the user accepts a rearrangement of execution order generated by a multiplate conductor (e.g., the computer 120).

In some embodiments, the executable code 420 of the protocol may be translated back into the graphical model 410 of the protocol. In other words, the translation process may not necessarily have to be a one-way function. An executable code for a protocol (e.g., the alternative sequence recommended/generated by the multiplate conductor) may be converted back into a graphical representation by sequentially parsing out each of the instructions in the executable code, determining the icon associated with each of those instructions, and generating an arrangement of all of those icons based on their sequence.

According to various embodiments, the action graphical elements illustrated in the graphical model 410 of the protocol arrangement may include plate-specific graphical elements. These graphical elements may correspond to program logic for actions to be performed by one of the plurality of laboratory devices to one or more specific plates of a plurality of plates. In addition, the plate-specific graphical elements may include well-specific graphical elements. As shown in the executable code 420 corresponding to the graphical model 410, the well-specific graphical elements may correspond to program logic for actions to be performed by one of the plurality of laboratory devices to one or more specific wells of the specific plate of the plate-specific graphical element.

Figure 5:
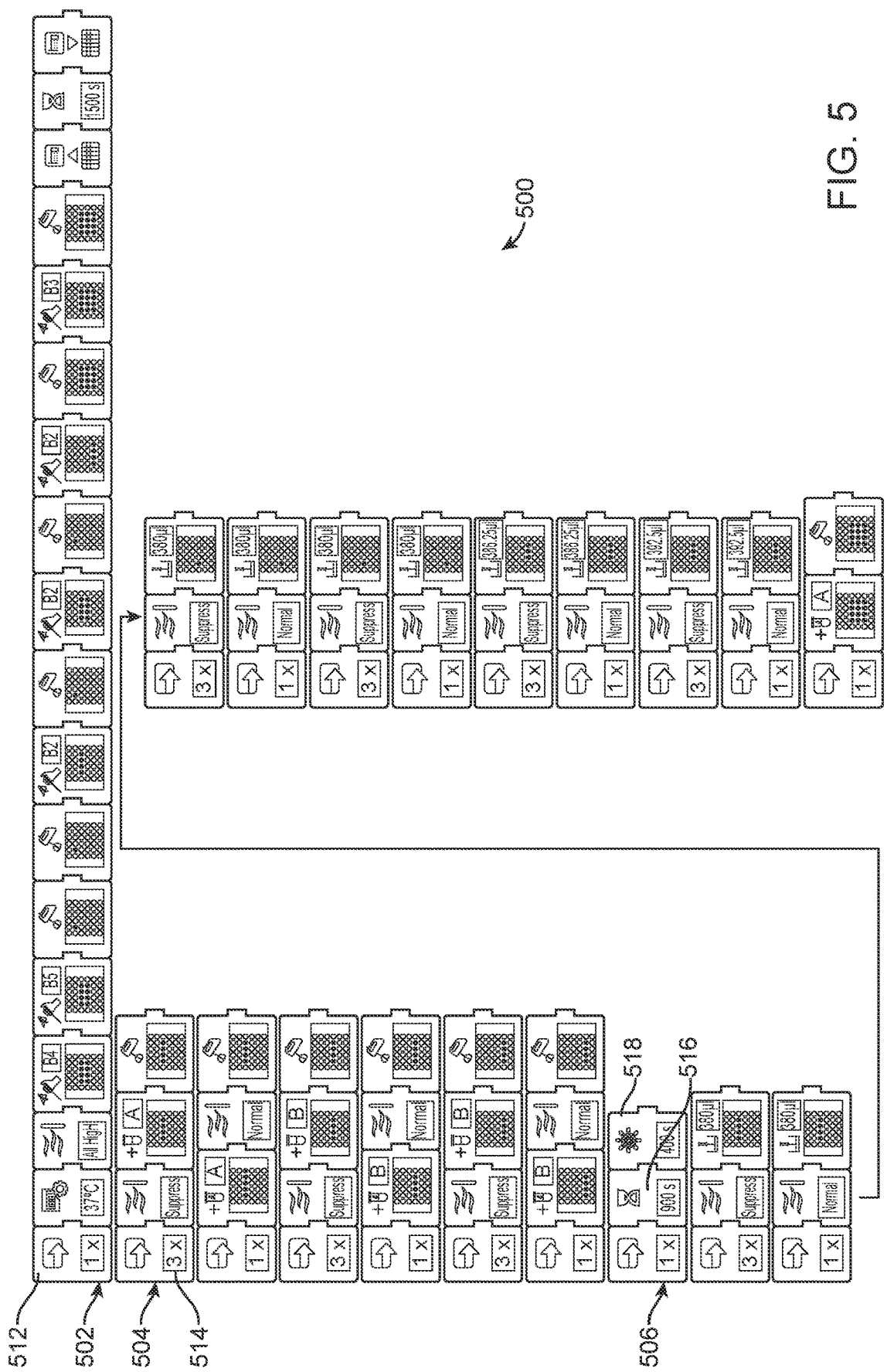
FIG. 5 illustrates an example embodiment of an exemplary graphical representation (e.g. a graphical model) of a protocol according to various embodiments.

FIG. 5 illustrates an example embodiment of an exemplary graphical model of a protocol according to various embodiments.

Figure 7:
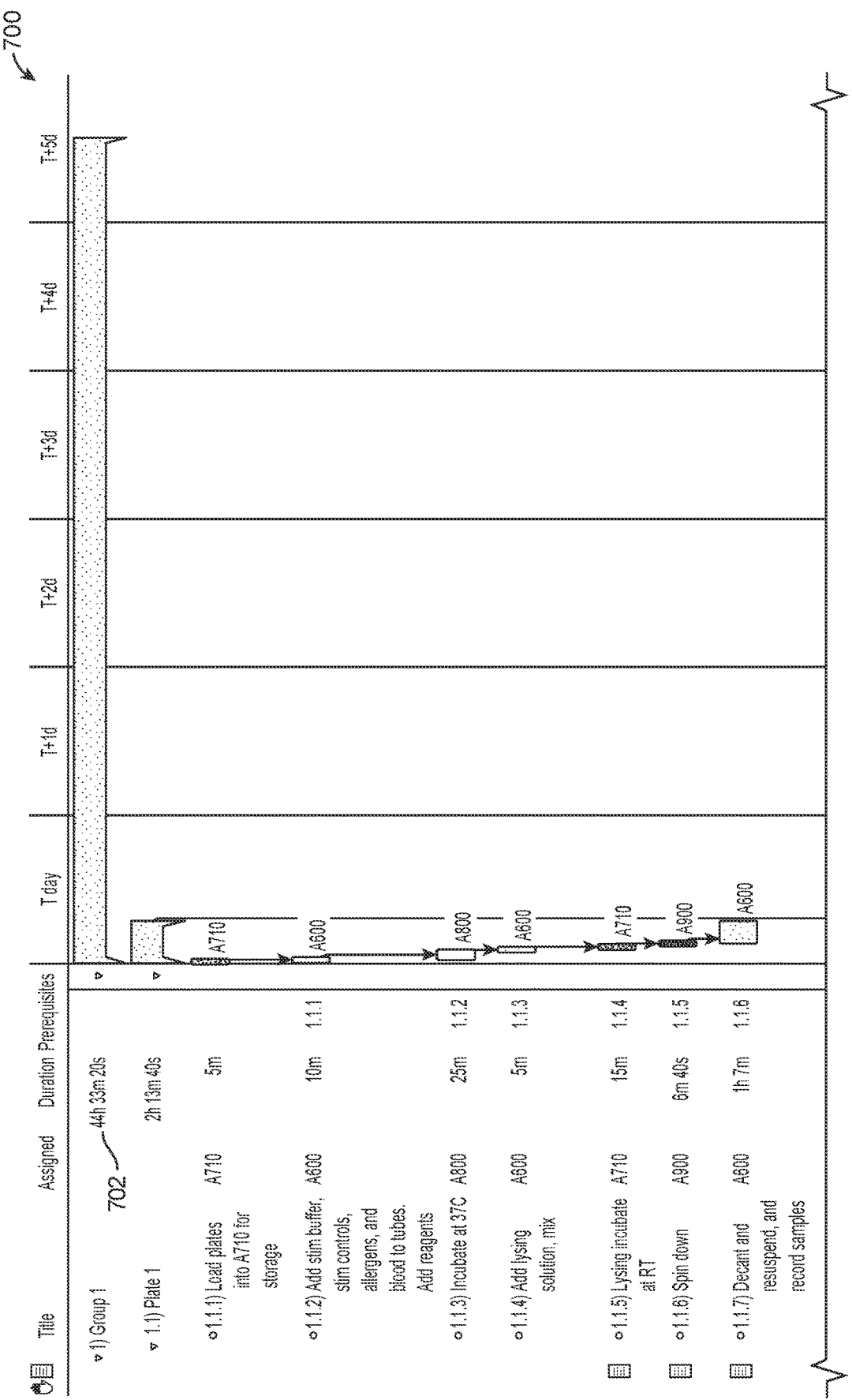
FIG. 7 illustrates an exemplary representation of total sequence duration of a first execution sequence corresponding to the user-generated protocol shown in FIG. 5, according to various embodiments.

The visual protocol designer may allow for graphical elements (e.g. blocks) to be arranged and be part of the graphical model representing the protocol. The exemplary graphical model 500 shown in FIG. 5 includes nineteen rows. There is no limitation on the number of rows, and the number of blocks on each row that can be generated using the embodiments described herein. The structure of that arrangement is preserved when the graphical model is translated into executable code for the protocol. This is true even when the system may implement multi-tasking and/or certain instructions to be performed in parallel. Once an execution sequence is generated (as illustrated in FIG. 7), the system may determine that the instructions corresponding to two rows of the execution sequence may be performed concurrently. In other embodiments, the instructions corresponding to the rows of the execution sequence may be executed sequentially (e.g., the instructions for the first row of the execution sequence may be performed first, and then the instructions for the second row of the execution sequence may be performed afterward). In some embodiments, the instructions within one row of the execution sequence may be executed sequentially, in an order such as left-to-right.

Figure 8:
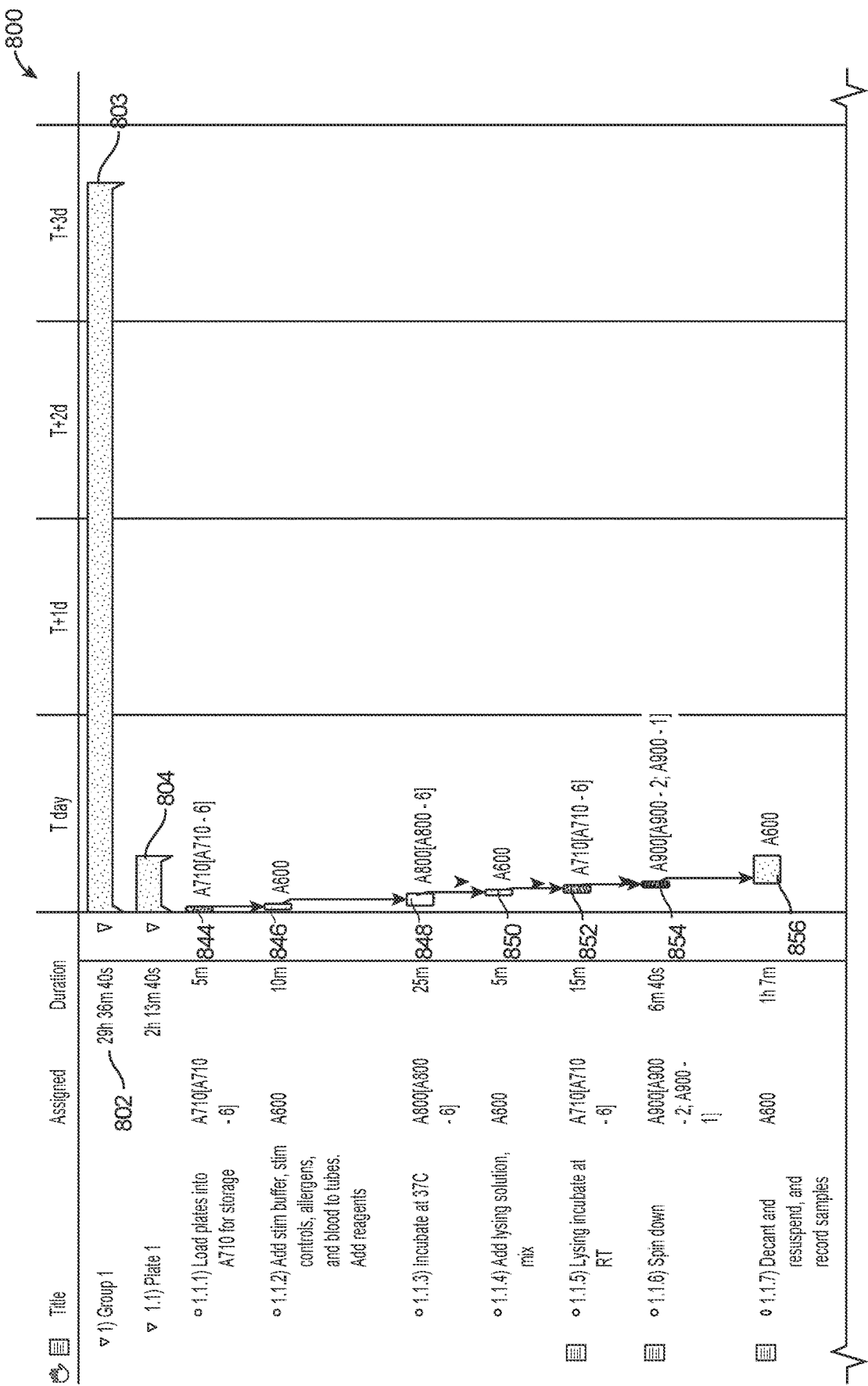
FIG. 8 illustrates an exemplary representation of total sequence duration of a second execution sequence corresponding to the user-generated protocol shown in FIG. 5, according to various embodiments.

In some embodiments, a multiplate conductor may generate a different sequence (e.g. as shown in FIG. 8) from the execution sequence generated based on the graphical model

500. The multiplate conductor may include the computer 120 or similar elements to the computer 120. The multiplate conductor may receive a user-generated graphical model and a number of plates that the graphical model is to be executed on, and calculate a total sequence duration for the graphical model. The multiplate conductor may then generate a second execution sequence based on the first execution sequence, the graphical model, and the number of plates. The second execution sequence comprises program logic corresponding to the executing some action graphical elements prior to or simultaneously with other action graphical elements so that the second total sequence duration is less than the first total sequence duration. While the graphical model may be envisioned to be executed on a single plate, the second execution sequence may provide a faster and more efficient manner of executing the protocol represented by the graphical model on multiple plates.

According to various embodiments, the total sequence duration of a graphical model may be calculated by first determining an action duration for each of the action graphical elements (e.g., blocks) of the graphical model. A row duration of a row is then calculated as a summation of the action durations of each action graphical element in the row. For rows comprising an iteration block, the summation of the action durations of each action graphical element in the row is multiplied by the number of iterations defined by the iteration block. The total sequence duration is then defined as a summation of the row durations for each row in the execution sequence.

The system may identify, from the graphical representation of the protocol, the arrangement of the graphical elements or icons. For example, if the arrangement includes multiple rows, the system may identify each of the rows in the arrangement, as well as identify the sequence of the graphical elements within each of those rows.

In some embodiments, the arrangement of blocks within each row may dictate how instructions corresponding to that arrangement are translated into executable code. For example, in the first row 502 the first block 512 corresponds to instructions that the row is to be executed only once, which can be translated into executable code and/or a structure for that code (e.g., no loops). In the second row 504, the first block 514 corresponds to instructions that the row is to be executed three times, which can be translated into executable code and/or a structure for that code (e.g., three iterations or loops).

The system may determine the corresponding program logic for each of the graphical elements (and the sets of parameters associated with those graphical elements) in the graphical model. For example, the row 506 of the arrangement may begin with a graphical element 516 for "wait" that is associated with a user-configured wait time parameter of 900 seconds. Similarly, block 518 indicates that the plate is to be sent to a centrifuge where the plate will be processed for 400 seconds. The system may identify the wait graphical element (e.g., icon) 516 and/or the centrifuge graphical element 518 and look-up the corresponding program logic for these icons, which could be to pause execution of the protocol by issuing a wait instruction to one or more components of the flow cytometry machine.

The system may read the arrangement in some logical order or sequence to map out executable code from the corresponding program logic associated with each graphical element in the arrangement. For example, the system may map out executable code by first taking the program logic corresponding to the first graphical element of the first row, then the program logic corresponding to the second graphical element of the first row, and so forth until all program logic corresponding to the graphical elements of the first row have been put into the executable code. The system may then move onto the second row and repeat the process for all of the graphical elements in the second row. Then the system would move onto the third row, and so forth, until all of the rows of the arrangement have been mapped into executable code.

As provided above, the system may identify the "wait" graphical element 516 and/or the "centrifuge" graphical element 518 and pause execution of the protocol by issuing a wait instruction to one or more components of the flow cytometry machine. In some embodiments, the system may determine that additional operations (e.g., actions) may be performed during the wait time or downtime of row 506. As such, the system may generate an alternative execution sequence that has a faster execution time than the execution time of the initial execution sequence corresponding to the user generated graphical model.

Figure 6:
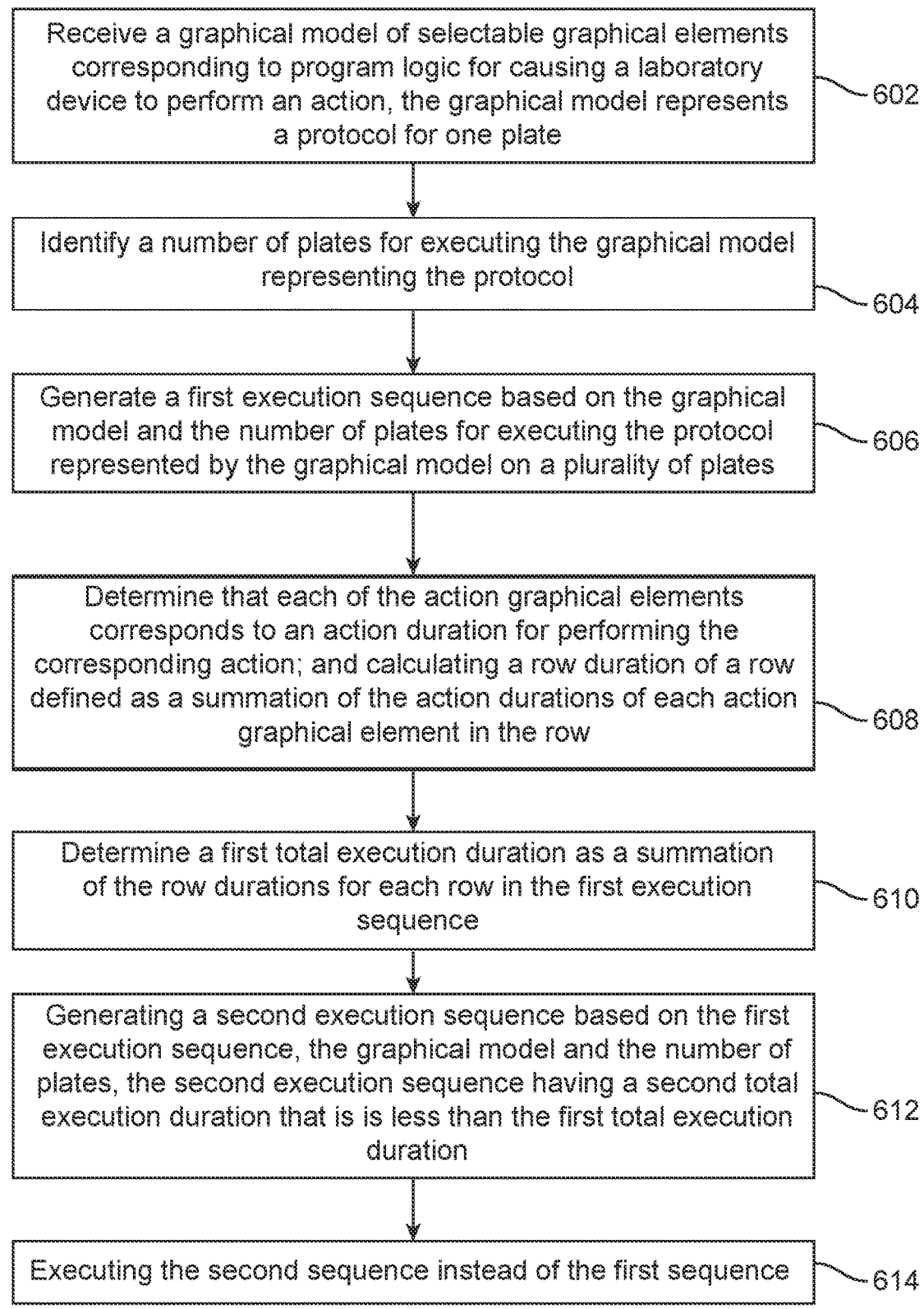
FIG. 6 is a flow diagram that illustrates a method for generating protocols for a system of a plurality of laboratory devices, according to various embodiments.

FIG. 6 is a flow diagram that illustrates a method for generating protocols for a system of a plurality of laboratory devices, according to various embodiments. In some embodiments, the plurality of laboratory devices may include one or more of a cytometer, a plate moving device, an incubator, or a centrifuge.

At step 602, the system receives a graphical model generated, for example, by a user using the visual protocol designer 134. The graphical model may include selectable graphical elements. In some embodiments, the graphical model is generated by moving and placing the selectable graphical elements from a bank of a graphical user interface (GUI) into the graphical model on the GUI. The GUI may be generated or otherwise provided by the visual protocol designer 134.

The selectable graphical elements (e.g., blocks) may include action graphical elements (e.g., action blocks) corresponding to program logic for causing one or more laboratory devices to perform an action. The graphical model represents a protocol for one plate. However, it may be desirable to perform/execute the graphical model on multiple plates. For example, the user may provide (or the system may otherwise receive/determine) a number of plates to perform/execute the graphical model on. That is, the protocol is to be repeated on multiple plates.

At step 604, the system may identify a number of plates for executing the graphical model representing the protocol.

At step 606, the system may generate a first execution sequence based on the graphical model and the number of plates. The first execution sequence includes a first sequence of two or more rows for executing the protocol represented by the graphical model on a plurality of plates. Each row includes at least one action performed on one of the plurality of plates. FIG. 7 illustrates an exemplary first execution sequence 700 generated from the graphical model 500 illustrated in FIG. 5. The first execution sequence 700 illustrates the actions to be performed when executing the protocol represented by the graphical model 500 in 20 plates.

At step 608, the system may determine that each of the action graphical elements corresponds to an action duration for performing the corresponding action, and calculates a row duration of a row in the first execution sequence, the row duration defined as a summation of the action durations of each action graphical element in the row. For rows comprising an iteration block, the summation of the action durations of each action graphical element in the row is multiplied by the number of iterations defined by the iteration block.

At step 610, the system determines a first total execution duration as a summation of the row durations for each row in the first execution sequence. The first total execution duration represents how long it takes to execute the first execution sequence representing the protocol on the plurality of plates. For example, FIG. 7 illustrates the first total execution duration 702 of the first execution sequence 700 generated based on the graphical model 500.

At step 612, the system generates a second execution sequence based on the first execution sequence, the graphical model and the number of plates. The second execution sequence corresponds to program logic for causing the plurality of laboratory devices to perform the actions corresponding to the selectable graphical elements of the graphical model in a second total execution duration. The second execution sequence comprises a second sequence of two or more rows of the first execution sequence for executing the protocol represented by the graphical model on the plurality of plates. The second total execution duration represents how long it takes to execute the second execution sequence representing the protocol on the plurality of plates. The second total execution duration is less than the first total execution duration.

FIG. 8 illustrates an exemplary second execution sequence 800 generated from the graphical model 500 illustrated in FIG. 5. The second execution sequence 800 illustrates the actions to be performed when executing the protocol represented by the graphical model 500 in 20 plates. FIG. 8 illustrates the second total execution duration 802 of the second execution sequence 800 generated based on the graphical model 500 and the first execution sequence 700.

At step 614, the system executes the second execution sequence instead of the first execution sequence.

According to various embodiments, the user (or another controller) may increase or decrease the number of plates on which to execute the graphical model. For example, while the system is executing the graphical model according to the second execution sequence, the user may provide an input to increase or decrease the number of plates. In such instances, the system may dynamically respond to the user input by generating a third execution sequence based on at least the graphical model and the second plurality of plates. The third execution sequence corresponds to program logic for causing the plurality of laboratory devices to perform the actions corresponding to the selectable graphical elements of the graphical model on the second number of plates. The system may then then dynamically switch to executing the third execution sequence instead of the first or second execution sequence.

In some embodiments, the system may display the first execution sequence (e.g. 700 in FIG. 7) and/or the second execution sequence (e.g. 800 in FIG. 8) on a graphical user interface (GUI). The displayed first sequence or second sequence may include a graphical representation of the first or second total sequence duration, respectively, and graphical representations of the action durations corresponding to each action graphical element of each iteration of the first row and the second row.

FIG. 7 illustrates an exemplary representation of total sequence duration of a first execution sequence corresponding to the user-generated protocol shown in FIG. 5, according to various embodiments.

FIG. 8 illustrates an exemplary representation of total sequence duration of a second execution sequence corresponding to the user-generated protocol shown in FIG. 5, according to various embodiments. As can be seen by the total duration times 702 and 802, the second execution sequence 800 is more than 27 hours faster than the first execution sequence 700.

As shown in FIG. 8, the second execution sequence may be displayed in a graphical user interface (GUI). The second execution sequence may include a graphical representation of the second total sequence duration 803, a graphical representation of a total sequence duration for each plate 804, 806, 808, 810, 812, 814, 816, 818, 820, 822, 824, 826, 828, 830, 832, 834, 836, 838, 840, 842 of the plurality of plates, and graphical representations of the action durations 844, 846, 848, 850, 852, 854, 856 corresponding to each action graphical element to be performed to each plate (e.g., action durations 844, 846, 848, 850, 852, 854, 856 shown in FIG. 8 are for first plate 804).

In some embodiments, the first row may include a first plate-specific graphical element corresponding to a first plate. The second row may include a second plate-specific graphical element corresponding to a second plate. In such embodiments, the second execution sequence (e.g., sequence illustrated in FIG. 8) comprises program logic 860 corresponding to actions of the second plate-specific graphical element performed to the second plate ordered prior to or simultaneously with program logic corresponding to actions of the first plate-specific graphical element performed to the first plate so that the second total sequence duration 802 is less than the first total sequence duration 702.

According to various embodiments, the second execution sequence may include program logic corresponding to actions of the second plate-specific graphical element performed to the second plate and actions of the first plate-specific graphical element performed to the first plate performed simultaneously with a same or different device of the plurality of laboratory devices so that the second total sequence duration is less than the first total sequence duration. Yet in other embodiments, the second execution sequence may include program logic corresponding to actions of the second plate-specific graphical element performed to the second plate with a first laboratory device prior to program logic corresponding to actions of the first plate-specific graphical element performed to the first plate with the first laboratory device.

In some embodiments, the action graphical elements include one or more device-specific graphical elements corresponding to program logic for actions to be performed by one of the laboratory devices not specific to a plate. For example, the actions to be performed by one of the laboratory devices corresponding to the one or more device-specific graphical elements may include cleaning actions. In some embodiments, the graphical model may include a first device-specific graphical element corresponding to a first laboratory device and a second device-specific graphical element corresponding to a second laboratory device. The second sequence may include program logic corresponding to actions performed by the second laboratory device corresponding to the second device-specific graphical element ordered prior to or simultaneously with program logic corresponding to actions performed by the first laboratory device corresponding to the first device-specific graphical element so that the second total sequence duration is less than the first total sequence duration.

According to various embodiments, the selectable graphical elements may include one or more conditional blocks corresponding to program logic for causing program logic of subsequent selectable graphical elements in a row to be performed in response to a pre-defined condition being met. For example, the pre-defined condition may correspond to a measurement of contents of a specific plate.

In some embodiments, the graphical model may include a first conditional block. In such embodiments, the step of generating the second execution sequence may include determining a first alternative second execution sequence in cases when a condition of the first conditional block is met and a second alternative execution second sequence in cases when the condition of the first conditional block is not met.

As described above, the graphical model row may include a first conditional block. In such embodiments, the step of generating the second execution sequence is performed in real time as the program logic for causing the plurality of laboratory devices to perform the actions corresponding to each of the selectable graphical elements in a second total sequence duration based one whether a condition of the first conditional block is met.

According to various embodiments, the action graphical elements may include one or more order-specific graphical elements corresponding to program logic for actions to be performed by one of the laboratory devices at a predetermined order relative to the program logic for actions corresponding to an action graphical element defined by the order-specific graphical element. The step of generating the second execution sequence may include ordering a first order-specific graphical element in the predetermined order relative to a first graphical element defined by the first order-specific graphical element.

Embodiments may provide a system including one or more processors 130, and a computer-readable medium (e.g., memory 132) storing instructions that, when executed by the one or more processors, cause the one or more processors to perform a method. The method may include receiving, by a computing device, a graphical model of selectable graphical elements that comprise action graphical elements corresponding to program logic for causing at least one of the plurality of laboratory devices to perform an action. The graphical model represents a protocol that will be performed on one plate. The method also includes identifying a number of plates for executing the graphical model representing the protocol; and determining a first execution sequence based on the graphical model and the number of plates. The first execution sequence includes a first sequence of two or more rows for executing the protocol represented by the graphical model on a plurality of plates. Each row includes at least one action performed on one of the plurality of plates. The method also includes determining that each of the action graphical elements corresponds to an action duration for performing the corresponding action, and calculating a row duration of a row in the first execution sequence. The row duration is defined as a summation of the action durations of each action graphical element in the row. The method also includes determining a first total execution duration as a summation of the row durations for each row in the first execution sequence. The first total execution duration represents how long it takes to execute the first execution sequence representing the protocol. The method further includes generating a second execution sequence based on the first execution sequence, the graphical model and the number of plates. The second execution sequence corresponds to program logic for causing the plurality of laboratory devices to perform the actions corresponding to the selectable graphical elements of the graphical model in a second total execution duration. The second execution sequence comprises a second sequence of two or more rows of the first execution sequence for executing the protocol represented by the graphical model on the plurality of plates. The second total execution duration represents how long it takes to execute the second execution sequence representing the protocol. The second total execution duration is less than the first total execution duration. The method also includes executing the second execution sequence instead of the first execution sequence.

In some embodiments, the system may further include one or more components of a flow cytometry machine (e.g., an optics component 102, a light source component 104, a fluidics component 106, a signal processing module 108, a data analysis module 110, among others). The method may further include translating the second sequence into one or more executable instructions for performing a protocol represented by the second sequence. The one or more executable instructions are usable by the one or more components of the flow cytometry machine. In some embodiments, the method may also include generating graphical user interface (GUI) data for a user to build the first sequence of selectable graphical elements in a GUI; and displaying the GUI on a display device.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. Embodiments illustratively disclosed herein suitably may be practiced in the absence of any element which is not specifically disclosed herein. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments.

The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, embodiments can be practiced in many ways. As is also stated above, it should be noted that the use of particular terminology when describing certain features or aspects should not be taken to imply that the terminology is being re-defined herein to be restricted to including any specific characteristics of the features or aspects with which that terminology is associated. The scope of the invention should therefore be construed in accordance with the appended claims and any equivalents thereof.

What is claimed is:

1. A method for generating protocols for a system of a plurality of laboratory devices, the method comprising:
   receiving, by a computing device, a graphical model of selectable graphical elements that comprise action graphical elements corresponding to program logic for causing at least one of the plurality of laboratory devices to perform an action, wherein the graphical model represents a protocol for one plate;
   identifying a number of plates for executing the graphical model representing the protocol;
   generating a first execution sequence based on the graphical model and the number of plates, the first execution sequence including a first sequence of two or more rows for executing the protocol represented by the graphical model on a plurality of plates, wherein each row includes at least one action performed on one of the plurality of plates;
   determining that each of the action graphical elements corresponds to an action duration for performing the corresponding action;
   calculating a row duration of a row in the first execution sequence, the row duration defined as a summation of the action durations of each action graphical element in the row;
   determining a first total execution duration as a summation of the row durations for each row in the first execution sequence, wherein the first total execution duration represents how long it takes to execute the first execution sequence representing the protocol on the plurality of plates;
   generating a second execution sequence based on the first execution sequence, the graphical model and the number of plates, the second execution sequence corresponding to program logic for causing the plurality of laboratory devices to perform the actions corresponding to the selectable graphical elements of the graphical model in a second total execution duration,
   wherein the second execution sequence comprises a second sequence of two or more rows of the first execution sequence for executing the protocol represented by the graphical model on the plurality of plates, wherein the second total execution duration represents how long it takes to execute the second execution sequence representing the protocol on the plurality of plates, and wherein the second total execution duration is less than the first total execution duration; and
   executing the second execution sequence instead of the first execution sequence.

2. The method of claim 1, further comprising:
   displaying the first execution sequence or the second execution sequence in a graphical user interface (GUI), wherein the displayed first execution sequence or the second execution sequence comprises a graphical representation of the first or second total execution duration, respectively, and graphical representations of the action durations corresponding to each action graphical element.

3. The method of claim 1, wherein the action graphical elements comprise plate-specific graphical elements corresponding to program logic for actions to be performed by one of the plurality of laboratory devices to one or more specific plates of the plurality of plates.

4. The method of claim 3, wherein the plate-specific graphical elements comprise well-specific graphical elements corresponding to program logic for actions to be performed by one of the plurality of laboratory devices to one or more specific wells of the specific plate of the plate-specific graphical element.

5. The method of claim 3, further comprising:
   displaying the second execution sequence in a graphical user interface (GUI), wherein the displayed second execution sequence comprises a graphical representation of the second total execution duration, a graphical representation of a total execution duration for each plate of the plurality of plates, and graphical representations of the action durations corresponding to each action graphical element to be performed to each plate.

6. The method of claim 3, wherein the two or more rows comprises at least a first row and a second row,
   wherein the first row comprises a first plate-specific graphical element, of the plate-specific graphical elements, corresponding to a first plate of the plurality of plates, and the second row comprises a second plate-specific graphical element, of the plate-specific graphical elements, corresponding to a second plate of the plurality of plates, and
   wherein the second execution sequence comprises program logic corresponding to actions of the second plate-specific graphical element performed to the second plate ordered prior to or simultaneously with program logic corresponding to actions of the first plate-specific graphical element performed to the first plate so that the second total execution duration is less than the first total execution duration.

7. The method of claim 6, wherein the second execution sequence comprises program logic corresponding to actions of the second plate-specific graphical element performed to the second plate and actions of the first plate-specific graphical element performed to the first plate performed simultaneously with a same device of the plurality of laboratory devices so that the second total execution duration is less than the first total execution duration.

8. The method of claim 6, wherein the second execution sequence comprises program logic corresponding to actions of the second plate-specific graphical element performed to the second plate with a first laboratory device of the plurality of laboratory devices, prior to program logic corresponding to actions of the first plate-specific graphical element performed to the first plate with the first laboratory device.

9. The method of claim 3, wherein the action graphical elements comprise one or more device-specific graphical elements corresponding to program logic for actions to be performed by one of the plurality of laboratory devices not specific to a plate of the plurality of plates.

10. The method of claim 9, wherein the actions to be performed by one of the plurality of laboratory devices corresponding to the one or more device-specific graphical elements are cleaning actions.

11. The method of claim 9, wherein the two or more rows comprises at least a first row and a second row,
wherein the first row comprises a first device-specific graphical element corresponding to a first laboratory device of the plurality of laboratory devices and the second row comprises a second device-specific graphical element corresponding to a second laboratory device of the plurality of laboratory devices, and
wherein the second execution sequence comprises program logic corresponding to actions performed by the second laboratory device corresponding to the second device-specific graphical element ordered prior to or simultaneously with program logic corresponding to actions performed by the first laboratory device corresponding to the first device-specific graphical element so that the second total execution duration is less than the first total execution duration.

12. The method of claim 3, wherein the selectable graphical elements comprise one or more conditional blocks corresponding to program logic for causing program logic of subsequent selectable graphical elements in a row to be performed in response to a pre-defined condition being met,
wherein the pre-defined condition corresponds to a measurement of contents of a specific plate.

13. The method of claim 12, wherein the graphical model comprises a first conditional block of the one or more conditional blocks, and
wherein generating the second execution sequence comprises determining a first alternative second execution sequence in cases when a condition of the first conditional block is met and a second alternative second execution sequence in cases when the condition of the first conditional block is not met.

14. The method of claim 12, wherein the graphical model comprises a first conditional block of the one or more conditional blocks, and
wherein generating the second execution sequence is performed in real time as the program logic for causing the plurality of laboratory devices to perform the actions corresponding to each of the selectable graphical elements of the graphical model in the second total execution duration based one whether a condition of the first conditional block is met.

15. The method of claim 1, wherein the action graphical elements comprise one or more order-specific graphical elements corresponding to program logic for actions to be performed by one of the plurality of laboratory devices at a predetermined order relative to the program logic for actions corresponding to an action graphical element, of the action graphical elements, defined by the order-specific graphical element, and
wherein generating the second execution sequence comprises ordering a first order-specific graphical element, of the one or more order-specific graphical elements, in the predetermined order relative to a first graphical element defined by the first order-specific graphical element.

16. The method of claim 1, wherein the plurality of laboratory devices comprises:
a cytometer;
a plate moving device;
an incubator; and
a centrifuge.

17. The method of claim 1, wherein the first execution sequence is generated by:
moving and placing the selectable graphical elements from a bank of a graphical user interface (GUI) into the graphical model the GUI.

18. The method of claim 1, wherein the two or more rows comprises at least a first row of and a second row,
in the first execution sequence the second row is ordered subsequent to the first row,
in the second execution sequence the second row is ordered prior to or simultaneously with the first row so that the second total execution duration is less than the first total execution duration.

19. The method of claim 1, further comprising:
receiving, by the computing device, a user input indicating the number of plates.

20. The method of claim 1, further comprising:
receiving, by the computing device, a user input changing the number of plates to a second number of plates;
generating, by the computing device, a third execution sequence based on at least the graphical model and the second plurality of plates, wherein the third execution sequence corresponds to program logic for causing the plurality of laboratory devices to perform the actions corresponding to the selectable graphical elements of the graphical model on the second number of plates; and
dynamically executing the third execution sequence instead of the first or second execution sequence.

21. A system comprising:
one or more processors, and
a computer-readable medium storing instructions that, when executed by the one or more processors, cause the one or more processors to:
receive a graphical model of selectable graphical elements that comprise action graphical elements corresponding to program logic for causing at least one of a plurality of laboratory devices to perform an action, wherein the graphical model represents a protocol for one plate;
identify a number of plates for executing the graphical model representing the protocol;
generate a first execution sequence based on the graphical model and the number of plates, the first execution sequence including a first sequence of two or more rows for executing the protocol represented by the graphical model on a plurality of plates, wherein each row includes at least one action performed on one of the plurality of plates;
determine that each of the action graphical elements corresponds to an action duration for performing the corresponding action;

calculate a row duration of a row in the first execution sequence, the row duration defined as a summation of the action durations of each action graphical element in the row;

determine a first total execution duration as a summation of the row durations for each row in the first execution sequence, wherein the first total execution duration represents how long it takes to execute the first execution sequence representing the protocol on the plurality of plates;

generate a second execution sequence based on the first execution sequence, the graphical model and the number of plates, the second execution sequence corresponding to program logic for causing the plurality of laboratory devices to perform the actions corresponding to the selectable graphical elements of the graphical model in a second total execution duration, wherein the second execution sequence comprises a second sequence of the two or more rows of the first execution sequence for executing the protocol represented by the graphical model on the plurality of plates, wherein the second total execution duration represents how long it takes to execute the second execution sequence representing the protocol on the plurality of plates, and wherein the second total execution duration is less than the first total execution duration; and execute the second execution sequence instead of the first execution sequence.

22. The system of claim 21, further comprising:
one or more components of a flow cytometry machine, wherein the instructions, when executed by the one or more processors, cause the one or more processors to:
translate the second sequence into one or more executable instructions for performing a protocol represented by the second execution sequence, wherein the one or more executable instructions are usable by the one or more components of the flow cytometry machine.

23. The system of claim 21, wherein the instructions, when executed by the one or more processors, cause the one or more processors to:
generate graphical user interface (GUI) data for a user to build graphical model in a GUI; and
display the graphical model and the GUI on a display device.

* * * * *